(12) United States Patent
Chernin

(10) Patent No.: US 6,643,694 B1
(45) Date of Patent: Nov. 4, 2003

(54) SYSTEM AND METHOD FOR INTEGRATING A PROXY SERVER, AN E-MAIL SERVER, AND A DHCP SERVER, WITH A GRAPHIC INTERFACE

(76) Inventor: Michael A. Chernin, 8206 W. River Chase Dr., Temple Terrace, FL (US) 33637

( * ) Notice: Subject to any disclaimer, the term of this patent is extended or adjusted under 35 U.S.C. 154(b) by 0 days.

(21) Appl. No.: 09/500,693

(22) Filed: Feb. 9, 2000

(51) Int. Cl.[7] .............................................. G06F 15/173
(52) U.S. Cl. ...................... 709/223; 709/220; 709/217; 709/203
(58) Field of Search ................................ 709/223, 220, 709/217

(56) References Cited

U.S. PATENT DOCUMENTS

| | | |
|---|---|---|
| 5,557,748 A | 9/1996 | Norris |
| 5,708,654 A | 1/1998 | Arndt et al. |
| 5,717,913 A | 2/1998 | Driscoll |
| 5,734,831 A | 3/1998 | Sanders |
| 5,796,948 A | 8/1998 | Cohen |
| 5,799,307 A | 8/1998 | Buitron |
| 5,812,819 A | 9/1998 | Rodwin et al. |
| 5,822,526 A | 10/1998 | Waskiewicz |
| 5,835,722 A | 11/1998 | Bradshaw et al. |
| 5,835,723 A | 11/1998 | Andrews et al. |
| 5,835,727 A | 11/1998 | Wong et al. |
| 5,850,386 A | 12/1998 | Anderson et al. |
| 5,884,024 A | 3/1999 | Lim et al. |
| 5,892,451 A | 4/1999 | May et al. |
| 5,917,808 A | 6/1999 | Kosbab |
| 5,922,049 A | 7/1999 | Radia et al. |
| 5,956,483 A | 9/1999 | Grate et al. |
| 5,963,207 A | 10/1999 | Brewer et al. |
| 6,012,088 A * | 1/2000 | Li et al. ..................... 709/219 |
| 6,065,055 A * | 5/2000 | Hughes et al. .............. 709/229 |
| 6,067,568 A * | 5/2000 | Li et al. ...................... 709/223 |
| 6,185,551 B1 * | 2/2001 | Birrell et al. ............... 707/102 |
| 6,260,061 B1 * | 7/2001 | Krishnan et al. ........... 709/213 |
| 6,286,038 B1 * | 9/2001 | Reichmeyer et al. ....... 709/220 |
| 6,393,484 B1 * | 5/2002 | Massarani .................. 709/225 |
| 6,427,170 B1 * | 7/2002 | Sitaraman et al. .......... 709/226 |

OTHER PUBLICATIONS

"Now the Boss Knows Where You're Clicking", The Wall Street Journal, Oct. 21, 1999.

\* cited by examiner

*Primary Examiner*—David Wiley
*Assistant Examiner*—Phuoc H. Nguyen
(74) *Attorney, Agent, or Firm*—Liniak, Berenato & White, LLC

(57) ABSTRACT

A system and method are provided for integrating a proxy server, an e-mail server, and a DHCP (Dynamic Host Configuration Protocol) server, with a graphic interface. The system and method also can be practiced so that a DNS server is supported or integrated therewith. Also provided are subsystems of the system, such as a subsystem adapted to provide e-mail searching via a graphic user interface, a subsystem adapted to provide internet access monitoring via a graphic interface, a subsystem adapted to provide internet access control via a graphic interface, and/or a subsystem adapted to configure a DHCP server via a graphic user interface. Also provided are a method of searching e-mail, a method of providing internet access monitoring and/or control, and/or a method of configuring a DHCP server via a graphic user interface. The internet monitoring can be based on IP addresses assigned by a DHCP server or can be based on a text string of interest. The subsystems and submethods can be selectively combined to meet a network managers needs.

19 Claims, 38 Drawing Sheets

Microfiche Appendix Included
(1 Microfiche, 62 Pages)

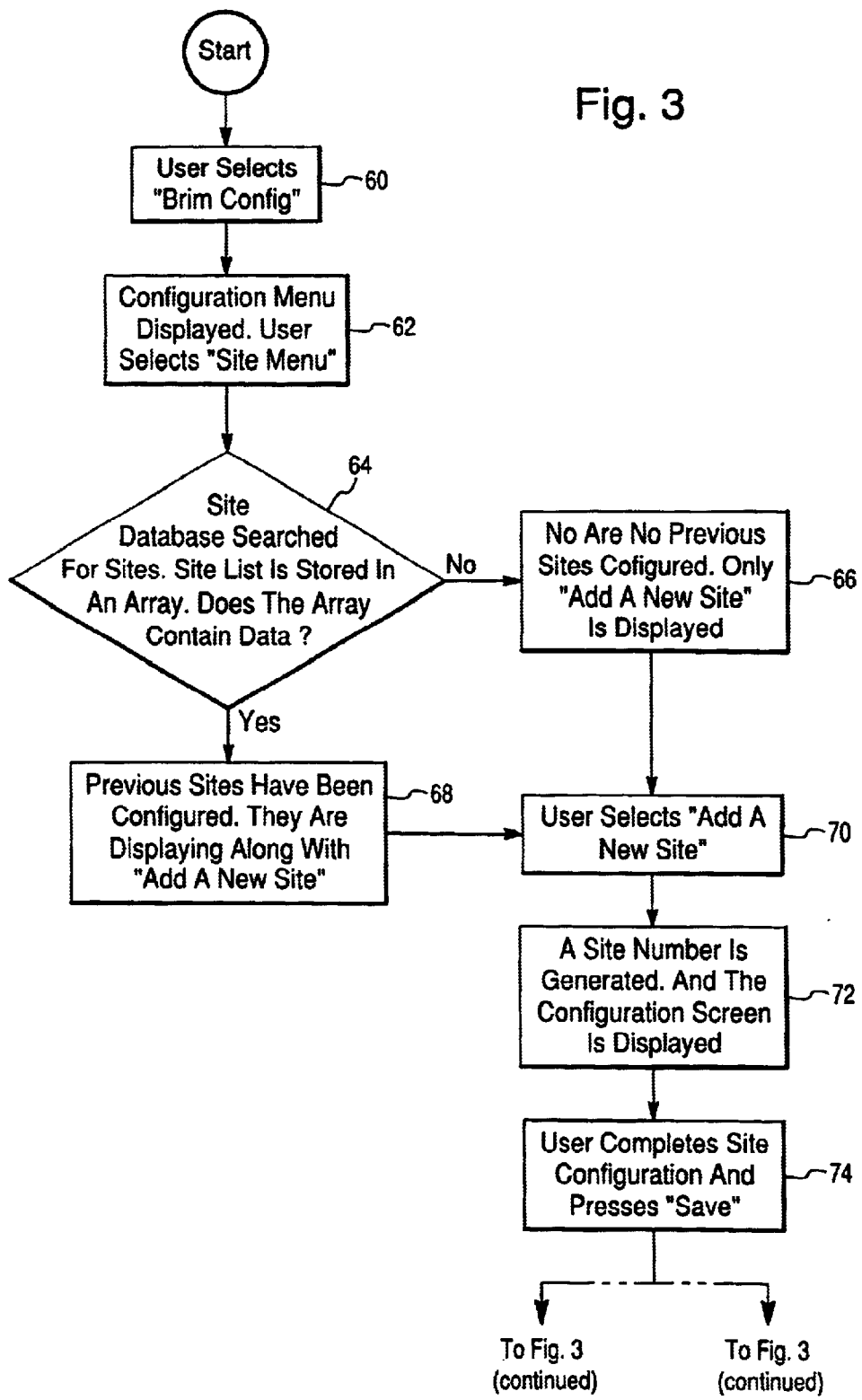

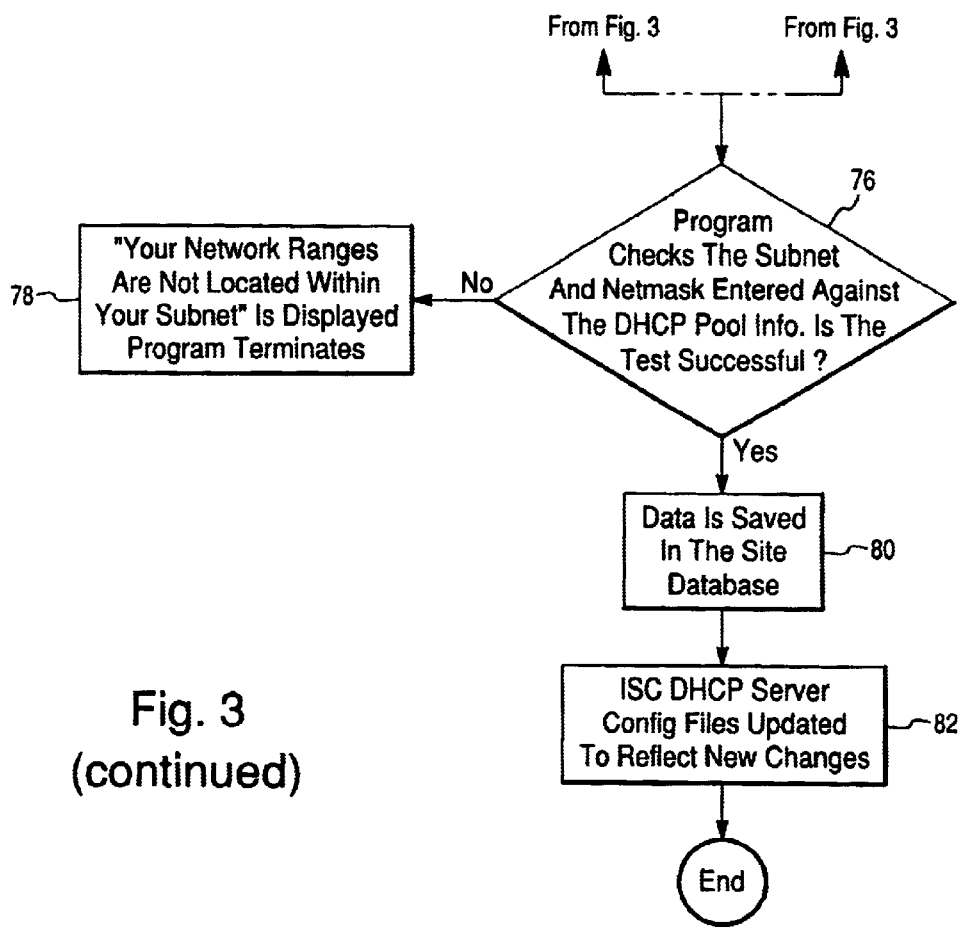

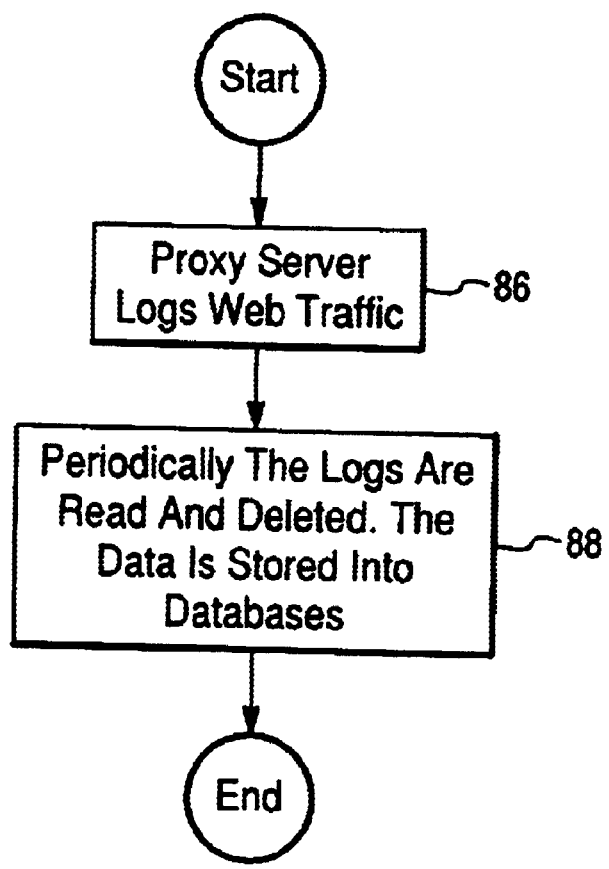

Fig. 12

File and Path Configuration

Unless specified with "(DIR)" I am expecting the path and filename

| File Name | Path\Location |
|---|---|
| dhcpd.conf | /etc/dhcpd.conf |
| dhcpd.leases | /var/state/dhcp/dhcpd.leases |
| Apache cgi-bin directory (REQ) (DIR) | /home/httpd/cgi-bin |
| Apache access_log | /var/log/httpd/access_log |
| Apache config_files (DIR) | /etc/httpd/conf |
| File containing static IP's | /etc/hosts.dg |
| Temp Directory | /tmp |
| BIND DNS named.conf | |
| BIND DNS zone files | |
| Path and script name to restart Apache | /etc/rc.d/init.d/httpd restart |
| Path and script name to restart ISC DHCP | /etc/rc.d/init.d/dhcpd restart |
| Path and script name to restart BIND DNS | /etc/rc.d/init.d/named restart |

*The static file should be in the format IP space NAME.
Kind of like the /etc/hosts file. This is not required, but fun.

[ Save ] ~232

Fig. 16

DHCP services are currently up and running on ns1.premdor.com - VER .98.2
Return to DHCP main page

Modify a Site - #25

| OPTION | VALUE |
| --- | --- |
| Delete Site | ☐ |
| Add to DNS | ☐ |
| Enable Dynamic DNS | ☐ |

| OPTION | VALUE |
| --- | --- |
| Site Name | Atlanta |

| OPTION | VALUE |
| --- | --- |
| Subnet | 172.16.229.0 |
| Netmask | 255.255.255.0 |

| DHCP Pool Start | DHCP Pool End |
| --- | --- |
| 172.16.229.150 | 172.16.229.250 |
|  |  |
|  |  |
|  |  |
|  |  |
|  |  |
|  |  |
|  |  |
|  |  |
|  |  |
|  |  |
|  |  |

Fig. 25

| RANK | IP ADDRESS | RANK |
|---|---|---|
| 1) | 172.16.202.2010 | 738254865 |
| 2) | 172.16.202.2210 | 325492082 |
| 3) | 172.16.202.2450 | 251401924 |
| 4) | 172.16.202.2860 | 245045503 |
| 5) | 172.16.202.2150 | 209658291 |
| 6) | 172.16.202.1620 | 206865235 |
| 7) | 172.16.202.1950 | 190134465 |
| 8) | 172.16.202.1610 | 188567876 |
| 9) | 172.16.221.1680 | 176375722 |
| 10) | 172.16.162.1530 | 165950115 |
| 11) | 172.16.217.1820 | 158576018 |
| 12) | 172.16.214.1620 | 158102882 |
| 13) | 172.16.217.1840 | 144833853 |
| 14) | 172.16.202.1470 | 144481988 |
| 15) | 172.16.202.1750 | 137091871 |
| 16) | 172.16.202.2060 | 127133402 |
| 17) | 172.16.218.2130 | 125579370 |
| 18) | 172.16.202.1660 | 116987467 |
| 19) | 172.16.214.1590 | 114237914 |

Fig. 33

| | | | | |
|---|---|---|---|---|
| 172.16.202.244 00:00:86:1e:ea:1b Max | 02/15/2000 Track | 11794639 bytes 245 URLs | Ping | ☐ |
| 172.16.202.245 00:50:04:26:7c:aa ReneeGoodwin | 02/07/2000 Track | 251401924 bytes 33457 URLs | Ping | ☐ |

Save —540

*This is used to save your deny changes

Possible other static IP's

| | IP ADDRESS | NAME | I TRACK | PING |
|---|---|---|---|---|
| 539 | 172.16.202.1 | tampa-cisco-1 3640-1 | None | Ping |
| | 172.16.202.3 | tpacrp3_irm | None | Ping |
| | 172.16.202.4 | tampa-vtc2 | None | Ping |
| | 172.16.202.6 | tampa-lslk | None | Ping |
| | 172.16.202.7 | 100switch | None | Ping |
| | 172.16.202.15 | tampa-vtc3 vtc3 | None | Ping |
| | ... | ... | ... | ... |
| | 172.16.202.100 | tampa-nt2 | None | Ping |
| | 172.16.202.101 | tampa-nt1 | None | Ping |
| | 172.16.202.102 | tampa_data | None | Ping |

Tampa_Corp Bootp Devices

| Device Name | MAC Address | IP Address |
|---|---|---|
| NPIJFD50B | 00:60:B0:5F:D5:0B | 172.16.202.72 |
| NPIBF0EE7 | 00:60:b0:bf:0e:e7 | 172.16.202.75 |

Big Brother 2000

| Search type: | Search params: | Search info: |
|---|---|---|
| Author ▼ | Stuff ▼ | Enter search string : [     ] |
| | | Submit |

SYSTEM AND METHOD FOR INTEGRATING A PROXY SERVER, AN E-MAIL SERVER, AND A DHCP SERVER, WITH A GRAPHIC INTERFACE

A portion of the disclosure of this patent application contains material which is subject to copyright protection. The copyright owner has no objection to the reproduction by anyone of the patent document as it appears in the Patent and Trademark Office files or records, but otherwise reserves all copyrights whatsoever. Software for carrying out some of the methods and systems described herein has been filed with the United States Patent and Trademark Office herewith in the form of a microfiche appendix including numerous frames, one of which being a title frame. This software may be included as part of a chip, disc, or other machine-readable memory according to certain embodiments of this invention. The microfiche appendix is entitled A SYSTEM AND METHOD FOR INTEGRATING A PROXY SERVER, AN E-MAIL SERVER, AND A DHCP SERVER, WITH A GRAPHIC INTERFACE and includes one (1) microfiche and sixty two (62) total frames.

BACKGROUND OF THE INVENTION

The present invention relates to a system and method for integrating a proxy server, an e-mail server, and a DHCP (Dynamic Host Configuration Protocol) server, with a graphic interface. The present invention also relates to subsystems thereof, such as a subsystem adapted to provide e-mail searching via a graphic user interface, a subsystem adapted to provide internet access monitoring via a graphic interface, a subsystem adapted to provide internet access control via a graphic interface, and/or a subsystem adapted to configure a DHCP server via a graphic user interface. The present invention also relates to a method of searching e-mail, a method of providing internet access monitoring and/or control, and/or a method of configuring a DHCP server via a graphic user interface.

DHCP servers are generally known, as are proxy servers and e-mail servers. These servers can be implemented via software or firmware that is programmed into one computer or a distributed group of computers in a network.

Typical computer networks use TCP/IP (transmission control protocol/internet protocol) as the basic communications protocol. In the context of a local area network (LAN) or a wide area network (WAN), it is common for the computer IP addressing scheme to be static. When a static IP addressing scheme is used, an IP address is assigned to each of the various computers throughout the network. This address remains associated with that computer regardless of how often the computer is used. The static IP addresses then are used to designate the source and/or origin of data transmissions between computers on the network.

Static IP addressing, however, is not always the most practical addressing scheme. When network renumbering becomes desirable or necessary, for example, someone typically must enter configuration changes at every computer on the network. This is daunting task and usually requires a highly skilled network administrator.

Some of the problems associated with static addressing were alleviated by DHCP servers. DHCP servers advantageously are not limited to use of static IP addresses only. Instead, they are able to assign IP addresses randomly. A previously assigned IP address, for example, becomes available for reassignment when the IP address has remained inactive for a predetermined period of time. IP addresses typically are distributed randomly as client computers on the network are turned on and connected to the network.

DHCP servers, however, are not without their disadvantages. Most conventional DHCP servers are provided with few, if any, tools. It therefore is usually difficult to determine which IP address has been assigned (or leased) to a computer on the network. It is especially difficult for those who are not highly skilled in the art of reading a DHCP configuration database. Such databases can be rather cryptic, as demonstrated by Frames 9–1 1 of the attached Microfiche Appendix. Frames 9–11 are hard-copies of an exemplary DHCP configuration database. Because of the difficulty in visually interpreting the information in DHCP databases (and knowing where such databases are stored), there is no convenient way for anyone who is not highly skilled in the art of network management to determine the availability of IP addresses on a network, much less which IP addresses have been assigned to which client computers.

In addition, the initial configuration of the DHCP server on a network typically requires a network manager that is highly skilled in the art of generating configuration files. An exemplary DHCP server program is available from ISC (Internet Software Consortium). The ISC DHCP server program can be downloaded at www.isc.org. Once downloaded, a network manager typically must generate a configuration file for the DHCP server. This typically must be done from scratch because the program arrives with no configuration file (or one that is empty). Configuration files, however, can be rather complicated to create from scratch. An exemplary excerpt from a DHCP configuration file is shown in Frames 12 to 20 of the attached Microfiche Appendix. Generating such a file is a daunting, if not impossible, task for one who is not highly skilled in the art of writing configuration files. Thus, a highly skilled network manager typically is required.

The need for a highly skilled network manager, however, does not end when the initial configuration file is generated. To the contrary, similar needs arise when the network is reconfigured or additional subnetworks are added or reconfigured. Again, the configuration file must be modified to accommodate the changes. Since it may be excessively expensive, especially for small businesses, to consult a highly skilled network manager every time a network is reconfigured, there is a need in the art for a convenient and user-friendly way of facilitating the creation and modification of DHCP configuration files and/or databases.

Likewise, it can be damaging to the reputation of a business or other organization to have e-mail messages sent from its network with objectionable, rude, or otherwise inappropriate content. There is consequently a need for a way of monitoring e-mail messages that have been sent out via the network. Since some incoming messages may contain objectionable, rude or otherwise inappropriate language, a need also exists for a convenient way of monitoring the content of e-mail messages that have been received by a network. Examples include inappropriate jokes or comments that might be circulated through an office if not detected by management, or language associated with corporate espionage, bribery and the like.

Typically, there is no convenient way for a network manager to search e-mail messages for certain text strings of interest. Even the e-mail server programs that do create an archive of e-mail messages (e.g., the SEND MAIL e-mail server program available from www.sendmail.com) do not arrange the contents in such a way that they can be searched manually in a convenient manner. Nor are there any readily available tools that can be used by a network manager to limit a search through e-mail archives to desired text strings, fields of the e-mail, time periods, or the like.

There also is a need for a way of controlling (e.g., selectively denying and allowing) and/or monitoring internet usage by clients of a network. Heretofore there was no convenient way to monitor internet usage, especially in a DHCP server environment and on a per-IP address basis. While the Apache web/proxy server (available from www.Apache.org) does create proxy logs, there is no convenient way to search or access such proxy logs for desired information (e.g, by text string, by IP address, and the like). Monitoring of internet usage, however, can be very useful in determining the demand for internet resources, determining whether certain users of the network are accessing inappropriate web sites, determining whether too much time is being spent on non-work-related web sites, and the like. There is consequently a need for a user-friendly graphic user interface that facilitates such monitoring of internet usage.

Along with the need to be able to monitor internet usage, there is a need for a way to selectively deny internet access to those who have abused their access to the internet, to those who do not need internet access, and/or the like.

There is also a need for a convenient way of satisfying combinations of one or more of the foregoing needs in a convenient and user-friendly manner. This need extends to networks that are equipped with a combination of an e-mail server, a DHCP server, a web/proxy server, and/or a DNS server.

SUMMARY OF THE INVENTION

A primary object of the present invention is to overcome at least one of the foregoing problems and/or satisfy at least one of the foregoing needs.

In order to achieve this object the present invention provides a system for facilitating creation of a configuration file for a DHCP server of a computer network. The system comprises a graphic user interface and a configuration file generator. The graphic user interface is adapted to present indications of information from which a configuration file of a DHCP server can be derived. The configuration file generator is adapted to generate a DHCP server configuration file in response to information entered by a user in response to the presented indications of information.

The present invention also can provide a system for monitoring internet access in a computer network operating under a DHCP server. This monitoring system comprises a proxy server tracker and a graphic user interface. The proxy server tracker is adapted to track information collected by a proxy server regarding internet URL addresses accessed by the proxy server for each of several IP addresses assigned by the DHCP server. The graphic user interface is adapted to provide a visual display of each IP address along with an indication of whether any internet URL addresses were accessed by that IP address.

Also provided by the present invention is a system for selectively controlling internet access in a computer network operating under a DHCP server. The internet access controlling system comprises an internet access control element and a graphic user interface. The internet access control element is adapted to selectively deny internet access through a proxy server, for each of several IP addresses assigned by the DHCP server. The graphic user interface is adapted to provide a visual display of each IP address along with an indication of whether internet access is being denied to that IP address.

The present invention also provides a system for searching e-mail text. The e-mail text searching system includes an e-mail text searcher and a graphic user interface. The graphic user interface is adapted to present an e-mail search display including information indicating that a text string to be searched can be entered. The e-mail text searcher is adapted to receive the text string to be searched when the text string to be searched is entered by a user in response to the displayed information, and also is adapted to search for the text string through e-mail archives maintained by an e-mail server.

Also provided by the present invention is a system for searching information collected by a proxy server for URL content. The system comprises a graphic user interface and a proxy server searcher. The graphic user interface is adapted to present a proxy server search display including information indicating that a text string to be searched can be entered. The proxy server searcher is adapted to receive the text string to be searched when the text string to be searched is entered by a user in response to the proxy server search display, and also is adapted to search for the text string through information collected by the proxy server regarding internet URL addresses accessed by at least one IP address.

The present invention also provides a system for integrating a DHCP server of a computer network, an e-mail server, and a proxy server. The system comprises a graphic user interface, a configuration file generator, a proxy server tracker, a proxy server searcher, an internet access control element, and an e-mail text searcher. The graphic user interface is adapted to present indications of information from which a configuration file of a DHCP server can be derived, and also is adapted to provide a visual display of IP addresses assigned by the DHCP server and additional information associated with each IP address. The configuration file generator is adapted to generate a DHCP server configuration file in response to information entered by a user in response to the presented indications of information. The proxy server tracker is adapted to track information collected by the proxy server regarding internet URL addresses accessed by the proxy server for each IP address. The internet access control element is adapted selectively deny internet access through the proxy server. The e-mail text searcher is accessible via the graphic user interface. The e-mail text searcher is adapted to receive at least a text string to be searched and also is adapted to search through e-mail archives maintained by an e-mail server for the text string. The proxy server searcher is adapted to receive a URL text string to be searched when said URL text string to be searched is entered by a user in response to a proxy server search display, and also is adapted to search for the URL text string through information collected by the proxy server regarding internet URL addresses accessed by the IP addresses.

Also provided by the present invention is a method of creating a configuration file for a DHCP server of a computer network. The method comprises the steps of presenting, via a graphic user interface, indications of information from which a configuration file of a DHCP server can be derived, and generating a DHCP server configuration file in response to information entered by a user in response to the presented indications of information.

The present invention also provides a method for monitoring internet access in a computer network operating under a DHCP server. The method comprises the steps of tracking information collected by a proxy server regarding internet URL addresses accessed by the proxy server for each of several IP addresses assigned by the DHCP server, and providing, via a graphic user interface, a visual display of each IP address along with an indication of whether any internet URL addresses were accessed by that IP address.

According to another aspect of the present invention, a method is provided for selectively controlling internet access in a computer network operating under a DHCP server. The method comprises the steps of providing, via a graphic user interface, a visual display of IP addresses assigned by the DHCP server, selectively denying internet access through a proxy server, for at least one of the IP addresses, and providing along with the visual display an indication of which, if any, of the IP addresses has been denied internet access.

The present invention also provides a method for searching e-mail text. The method comprises the steps of presenting, via a graphic user interface, an e-mail search display including information indicating that a text string to be searched can be entered, receiving at least the text string to be searched when the text string to be searched is entered by a user in response to the presented information, and searching for the text string through e-mail archives maintained by an e-mail server.

Also provided by the present invention is a method of searching information collected by a proxy server for URL content. The method comprises the steps of receiving a text string to be searched, and searching for the text string through information collected by the proxy server regarding internet URL addresses accessed by at least one IP address.

According to another aspect of the present invention, a method is provided for integrating a DHCP server of a computer network, an e-mail server, and a proxy server. The method comprises the steps of presenting, via a graphic user interface, indications of information from which a configuration file of a DHCP server can be derived, providing a visual display of IP addresses assigned by the DHCP server and additional information associated with each IP address, generating a DHCP server configuration file in response to information entered by a user in response to the presented indications of information, tracking information collected by the proxy server regarding internet URL addresses accessed by the proxy server for each IP address, selectively denying internet access through the proxy server, receiving at least a text string to be searched, and searching through e-mail archives maintained by an e-mail server for the text string.

Any of the foregoing systems or methods can be combined with one another. In addition, any of the foregoing systems and methods can be combined with a DNS updating element or method that is adapted to send indications of changes in IP address assignments to a DNS server program whenever an IP address assignment is made or modified by a DHCP server.

The above and other objects and advantages will become more readily apparent when reference is made to the following description taken in conjunction with the accompanying drawings.

BRIEF DESCRIPTION OF THE DRAWINGS

FIG. 3 is a flow chart illustrating a DHCP configuration method according to a preferred implementation of the present invention.

FIG. 4 is a flow chart illustrating a proxy log archival method.

FIG. 12 is a more complete view of the "File and Path Configuration" menu of FIG. 11.

FIGS. 16 and 17 illustrate top and bottom portions, respectively, of the "Modify a Site" menu shown in FIG. 15.

FIG. 25 illustrates a "Top Internet Users" report that can be generated, according to a preferred implementation of the present invention.

FIG. 33 illustrates a display of information for a site, that includes information regarding static IP addresses and Bootp devices at that site, according to a preferred implementation of the present invention.

FIG 34 illustrates an e-mail text search display that can be generated according to a preferred implementation of the present invention.

DESCRIPTION OF PREFERRED EMBODIMENTS

In the following description of preferred embodiments, some elements will be described as being "adapted" to perform certain functions. It is understood that such elements can be adapted to perform such functions by suitably programming them or by otherwise providing a computer program that, when executed by a computer or other processor, causes the computer or other processor to perform the indicated functions.

Figure 1:
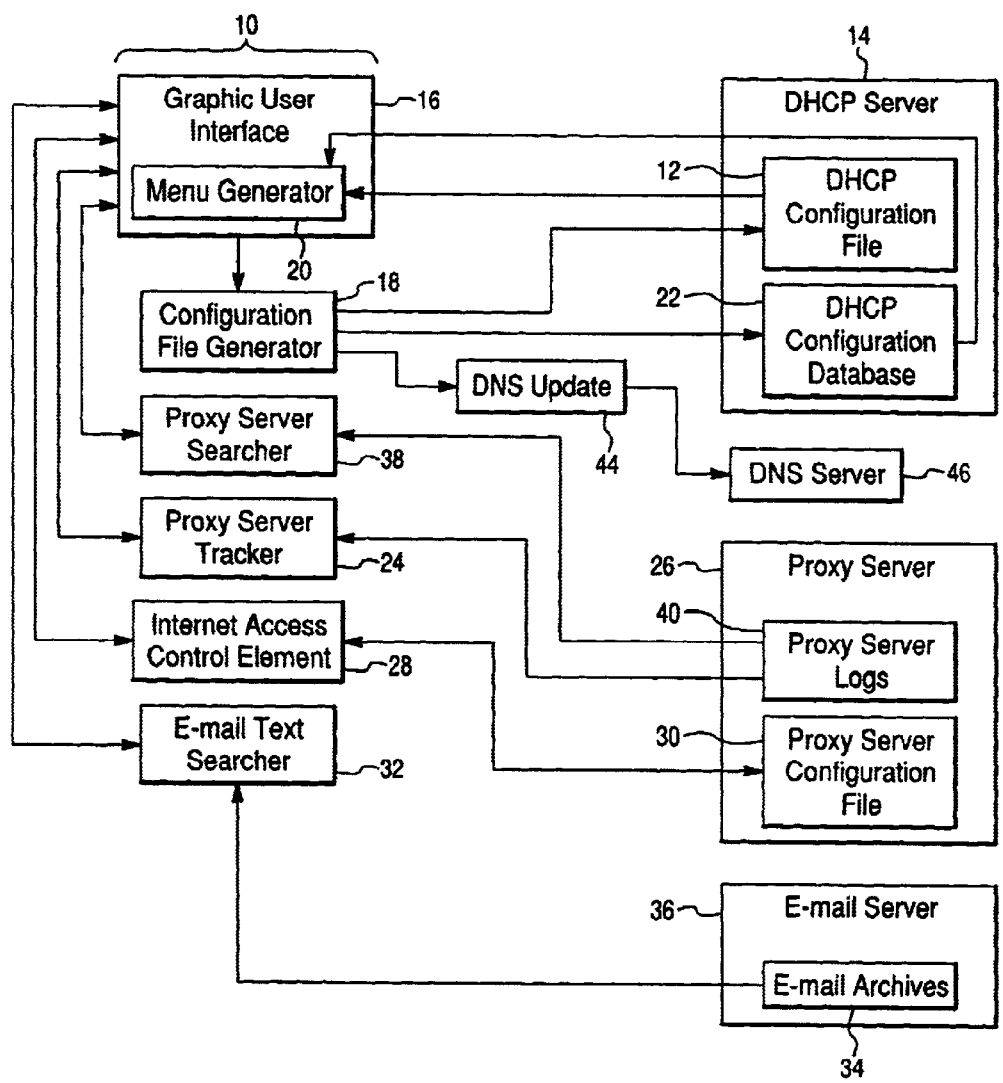
FIG. 1 is a block diagram illustrating a system 10 for facilitating creation of a configuration file for a DHCP server, according to a preferred embodiment of the present invention.

FIG. 1 illustrates a system 10 for facilitating creation of a configuration file 12 for a DHCP server 14 of a computer network, according to a preferred embodiment of the present invention. The system 10 includes a graphic user interface 16 and a configuration file generator 18.

The graphic user interface 16 is adapted to present indications of information from which the configuration file 12 of the DHCP server 14 can be derived. These indications can be expressed in the form of inquiries, or alternatively, can be provided using a fill-in-the-blank type of format. Examples of the information that can be indicated include the ranges of IP addresses that will be designated for dynamic use by the DHCP server 14, the ranges that will be dedicated to static IP addressing and devices operating under the well-known Bootp protocol, the locations of configuration-related files on the network, and the like. A user then can enter the relevant information in response to the indication(s) on the graphic user interface 16.

The configuration file generator 18 is adapted to generate the configuration file 12 of the DHCP server 14. It does this using the information entered by the user. In particular, it generates the configuration file 12 of the DHCP server 14 using the ranges of IP addresses that will be designated for dynamic use by the DHCP server 14, the ranges that will be dedicated to static IP addressing and devices operating under the well-known Bootp protocol, the locations of configuration-related files on the network, and the like, as entered by the user.

Preferably, the graphic user interface 16 includes at least one menu generator 20. The menu generator(s) 20 is (are) adapted to generate a menu of configuration-related options and text fields associated with each option. Values for each such option then can be inserted by the user. The configuration file generator 18 preferably is adapted to generate the DHCP server configuration file 12 in accordance with the entered options. Preferably, the graphic user interface 16 is a web-based graphic user interface that is accessible via a web browser.

The configuration file generator 18, in addition to generating the configuration file 12, also can be adapted to generate a configuration file database 22. Once the configuration file database 22 is generated, IP addressing information can be stored by the DHCP server 14 in the configuration file database 22. At least some of this IP addressing information is stored by the DHCP server 14 as it operates in accordance with the configuration file 12 generated by the configuration file generator 18.

The graphic user interface 16 also can be adapted to provide a visual display of IP addresses assigned by the DHCP server 14 and additional information associated with each IP address. The additional information for each IP address can include a machine identification that identifies a network card at the IP address, a network name that identifies a user of the IP address, and/or a date when assignment of the IP address will expire if the IP address is not utilized before that date. The graphic user interface 16 preferably is adapted to present the indications of information and/or the visual display of IP addresses on a per-site basis, wherein each site corresponds to a subnetwork of the overall computer network.

The system 10 preferably also includes a system (or subsystem) for monitoring internet usage (though the system 10 and the internet usage monitoring system (or subsystem) can be provided separately, or one without the other). The internet usage monitoring system (or subsystem) includes a proxy server tracker 24 and can also include the aforementioned graphic user interface 16. Alternatively, the internet usage monitoring system can be provided with its own graphic user interface.

The proxy server tracker 24 is adapted to track information collected by a proxy server 26 regarding internet URL addresses accessed by the proxy server 26 for each IP address. The proxy server 26 then can cause the aforementioned graphic user interface 16 (or another graphic user interface dedicated to the proxy server tracker 24) to display, based on the information tracked by the proxy server tracker 24, an indication of whether any internet URL addresses were accessed by any IP address on the network. Preferably, this indication is correlated to the IP address when it is presented. In this regard, a listing can be provided by IP address of all internet URL addresses accessed by that IP address.

The indication of whether any internet URL addresses were accessed, when provided as part of the graphic user interface 16 described above, can be included in the additional information for each IP address that appears in the aforementioned visual display. This adds to the comprehensiveness of the visual display. Preferably, the graphic user interface 16 is adapted to provide the aformentioned visual display on a per-site basis, wherein each site corresponds to a subnetwork of the computer network.

Preferably, each indication of whether any internet URL addresses were accessed, is provided with a selectable display element (e.g., in hypertext form, as a selectable icon, a pop-up menu, and the like) whenever at least one internet URL address was accessed. The selectable display can be provided as the indication itself, or along with the indication. The proxy server tracker 24 (or the system 10) is adapted to respond to selection of the selectable display element by parsing through the information collected by the proxy server 26 in search of portions of that collected information that pertain to an IP address of interest, and then displaying in a user-readable format those portions of the information collected by the proxy server 26 that, in fact, pertain to the IP address of interest. The user-readable format can include a list of URL addresses accessed by the IP address of interest.

The system 10 preferably also includes a system (or subsystem) for selectively controlling internet usage (though the system 10 and the internet usage control system (or subsystem) can be provided separately, or one without the other). Likewise, the internet usage control system can be provided with the internet usage monitoring system, or both can be provided separately, or one can be provided without the other.

The internet usage control system (or subsystem) includes an internet access control element 28 and can also include the aformentioned graphic user interface 16 or one pertaining to one of the other subsystems. The internet access control element 26 preferably is accessible via the graphic user interface 16. Alternatively, the internet usage control system can be provided with its own graphic user interface.

The internet access control element 28 is adapted to selectively deny internet access through the proxy server 26. The selective denial of internet access preferably is performed on the basis of IP addresses assigned by the DHCP server 14. The internet access control element 28, in this regard, can be adapted to selectively deny internet access through the proxy server 26, for each IP address assigned by the DHCP server 14. Preferably, the internet access control element 28 achieves each denial by selectively modifying a configuration file 30 of the proxy server 26. The configuration file 30 of the proxy server 26, for example, can be augmented to include a "deny" command for each IP address that is to be denied access.

In addition, or alternatively, the internet access control element 28 can be adapted to selectively deny internet access through the proxy server 26, on a per-site basis, wherein each site corresponds to a subnetwork of the computer network. This provides a quick and convenient way of denying internet access to those who are associated with a particular site but are not entitled (or do not need) internet access.

Regardless of which graphic user interface is used, it preferably is adapted to provide a visual display of each IP address along with an indication of whether internet access is being denied to that IP address.

The system 10 preferably also includes a system (or subsystem) for searching e-mail text (though the system 10 and e-mail text searching system (or subsystem) can be provided separately, or one without the other). Likewise, the e-mail text searching system, the internet usage monitoring system, internet usage control system, or any combination of one or more thereof can be provided separately, or one or more can be provided without the others.

The e-mail text searching system (or subsystem) includes an e-mail text searcher 32 and can also include the aforementioned graphic user interface 16 or one pertaining to one of the other subsystems. The e-mail text searcher 32 preferably is accessible via the graphic user interface 16. Alternatively, the e-mail text searcher 32 can be provided with its own graphic user interface.

The e-mail text searcher 32 is adapted to receive at least a text string to be searched and also is adapted to search through e-mail archives 34 maintained by an e-mail server 36 for the entered text string(s) (e.g., the e-mail archives maintained by SENDMAIL software when it is placed in a debug mode).

Preferably, the e-mail text searcher 32 is adapted to provide an e-mail search results display via the graphic user interface 16. The e-mail search results display indicates which, if any, e-mail messages in the e-mail archives 34 includes a match for the entered text string.

Preferably, the e-mail search results display includes a user-selectable portion for each match. The aforementioned graphic user interface 16 (or one dedicated to the e-mail text searching system) can be adapted to display an entire e-mail message in which a match occurred when the user-selectable portion for that match is selected. This provides a quick and convenient way of listing matches and allowing a user to review the entire text of messages that are of interest.

Preferably, the information indicating that a text string to be searched can be entered, further includes limit information indicating that at least one limit can be entered in connection with the scope of e-mail searching. The e-mail text searcher 32, in this regard, can be adapted to receive the limit(s) when they are (it is) entered by a user in response to the limit information, and also can be adapted to restrict, in accordance with the limit(s), searching for the entered text string through the e-mail archives 34.

The limit(s) can correspond to one or more time periods of interest such that searching is limited to e-mail messages that were sent or received within the time period(s) of interest. In addition, or alternatively, the limit(s) can correspond to one or more fields of interest such that searching is limited to the field(s) of interest in each e-mail message. The fields of interest can include, for example, an author field in each e-mail message, a recipient field in each e-mail message, and/or the entire content of each e-mail message.

The system 10 preferably also includes a system (or subsystem) for searching information collected by the proxy server 26 for URL content (though the system 10 and URL content searching system (or subsystem) can be provided separately, or one without the other). Likewise, the URL content searching system, the e-mail searching system, the internet usage monitoring system, internet usage control system, or any combination of one or more thereof can be provided separately, or one or more can be provided without the others.

The URL content searching system (or subsystem) includes a proxy server searcher 38 and also can include the aforementioned graphic user interface 16 or one pertaining to one of the other subsystems. The proxy server searcher 38 preferably is accessible via the graphic user interface 16. Alternatively, the proxy server searcher 38 can be provided with its own graphic user interface.

The proxy server searcher 38 is adapted to receive a text string to be searched and also is adapted to search for the text string through information collected by the proxy server 26 regarding internet URL addresses accessed by the IP addresses. Searching of this information can be accomplished through the proxy logs 40 of the proxy server 26. Alternatively, the contents of the proxy logs 40 can be periodically accessed and saved in a readily accessible database of proxy tracking information. Searching then can be accomplished through the database of proxy tracking information.

The proxy server searcher 26 can be adapted to provide a proxy search results display via the graphic user interface 16. The proxy search results display can indicate which, if any, URLs accessed via the proxy server 26 includes a match for the received text string. The proxy search results display preferably includes a list of all URLs that include a match for the received text string along with the IP address that was used to access each such URL.

Preferably, the proxy search results display includes a user-selectable portion for each match. The system 10 can be adapted to automatically access a website identified by the URL in each match when the corresponding user-selectable portion is selected. This provides a quick and convenient way for a network manager to review the web-site identified by the URL in each match.

The system 10 also can include a DNS updating element 44 that is adapted to send indications of changes in IP address assignments to a DNS server 46 whenever an IP address assignment is made or modified by the DHCP server 14.

When the system 10 is provided with all of the foregoing subsystems, it provides a convenient and user-friendly system for integrating a DHCP server 14 of a computer network, an e-mail server 36, a proxy server 26, and a DNS server.

Any of the foregoing systems or subsystems can be provided in the form of a computer program product comprising a computer-usable medium having computer-readable program code embodied thereon.

The aforementioned system 10 can be used to implement a preferred method of creating, in accordance with the present invention, a configuration file 12 for a DHCP server 14 of a computer network. The preferred method includes the steps of presenting, via a graphic user interface 16, indications of information from which the configuration file 12 of the DHCP server 14 can be derived, and generating a DHCP server configuration file 12 in response to information entered by a user in response to the indications of information.

Preferably, the step of presenting the indications includes generating a menu of configuration-related options and text fields associated with each option, into which values for such options can be inserted. The step of generating the DHCP server configuration file 12 then can be performed in accordance with the entered options.

The graphic user interface 16, like in the preferred system 10, preferably is a web-based graphic user interface. A web browser therefore can be used to present the aforementioned indications.

According to a more preferred method, the step of generating the DHCP server configuration file 12 includes generating a configuration file database 22. IP addressing information then can be stored in the configuration file database 22 by the DHCP server 14 when it operates in accordance with the generated DHCP configuration file 12. Preferably, a visual display is provided of IP addresses assigned by the DHCP server 14 and additional information associated with each IP address. The additional information for each IP address can include, for example, a machine identification that identifies a network card at the IP address, a network name that identifies a user of the IP address, and a date when assignment of the IP address will expire if the IP address is not utilized before that date.

Figure 2:
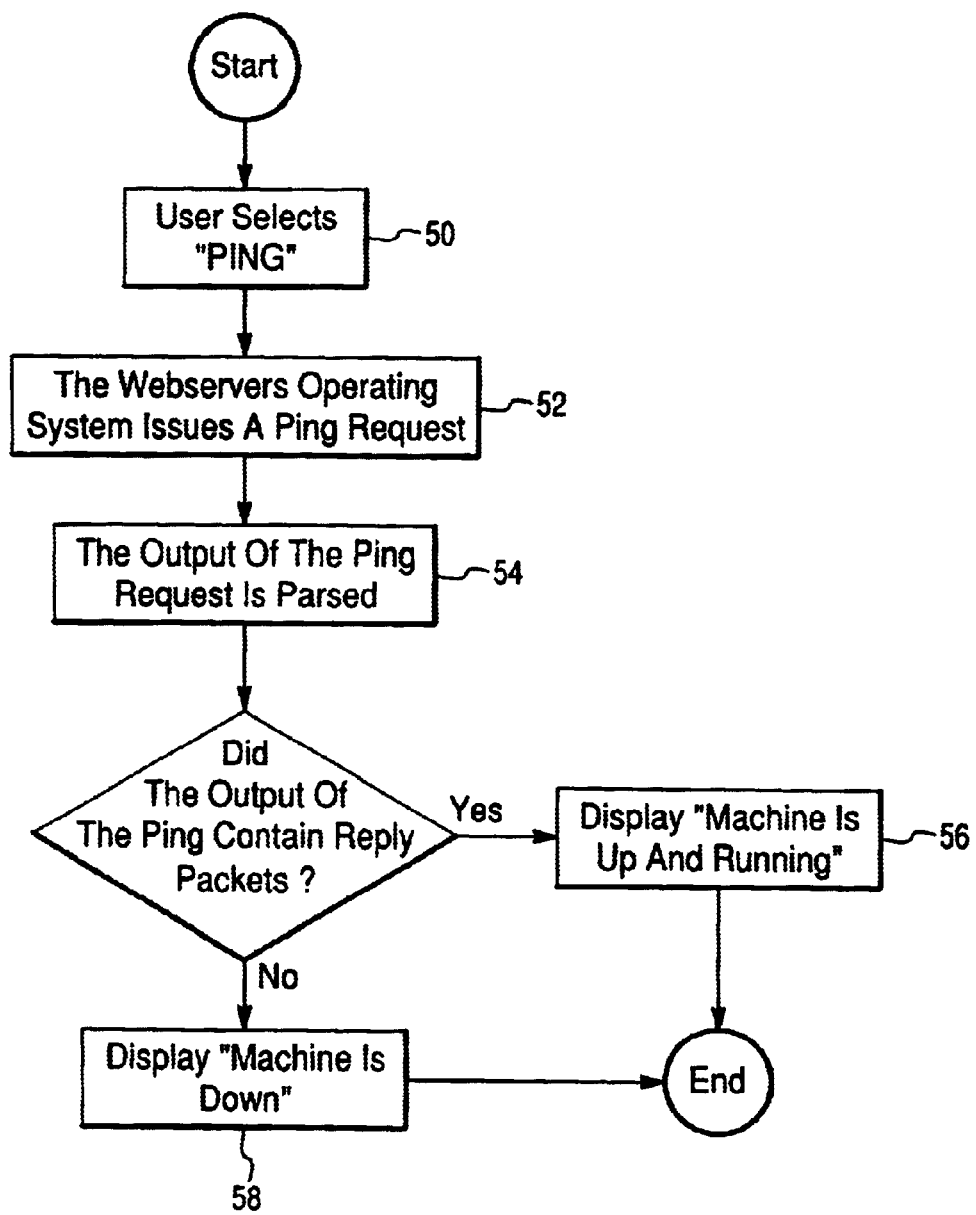
FIG. 2 is a flow chart illustrating a ping operation that can be performed according to a preferred implementation of the present invention.

With reference to the flow chart of FIG. 2, the additional information also can include a "PING" indication that can be selected by the user to determine whether a computer associated with an IP address is ON and connected to the network. Selection of the "PING" indication (Step 50 in FIG. 2) causes the webserver's operating system to issue a "PING" request (Step 52 in FIG. 2). The output of the "PING" request then is parsed (Step 54 in FIG. 2). If the output of the "PING" contains reply packets, a display is presented indicating that the "Machine is up and running" (Step 56 in FIG. 2). If the output of the "PING", however, contains no reply packets, a display is presented indicating that the "Machine is down" (Step 58 in FIG. 2).

FIG. 3 is an flow chart of an exemplary implementation of the preferred DHCP configuration method. Initially, a user is presented with the option of selecting a "Brim Config" function from a display. When the user selects that option (Step 60), a configuration menu is displayed. The configuration menu includes a "Site menu" option that can be selected by the user. When the user selects the "Site menu" option (Step 62), a database containing a list of all, if any, sites (i.e., subnetworks) on the network is searched (Step 64). If there are no sites on the network, only an "Add a new site" function is displayed (Step 66). If there are sites already configured on the network, a list of such sites is displayed along with the "Add a new site" function (Step 68).

If the user then selects the "Add a new site" function (Step 70), regardless of whether some existing sites also are listed, a site number is generated and a configuration screen is displayed (Step 72). The user then enters configuration-related information in response to displayed prompts, text fields, or inquiries (Step 74). When all of the information for that site has been entered, the user selects a "Save" function from the configuration screen. The configuration-related information then is verified to determine whether any entered subnet and netmask information is consistent with IP address ranges designated for use by the DHCP server program (Step 76). If inconsistencies are found, a message is displayed to that effect and no configuration file is generated (Step 78). An exemplary message that can be displayed is "Your network ranges are not located within your subnet."

If no inconsistencies are found, the entered configuration-related information is stored in portion of the DHCP configuration database associated with that site (Step 80), and the configuration file of the DHCP server program is created or modified accordingly (Step 82).

Had the user selected one of the identified sites, instead of the "Add a new site" function, the method would have displayed a "Modify a site" configuration screen would have been displayed. The "Modify a site" configuration screen is similar to that of the "Add a new site", except that it contains configuration-related information that was previously entered for that site, as well as certain functions (to be described hereinafter) that can be performed with respect to an existing site (e.g., delete the site, add the site to DNS, and/or enable dynamic DNS for that site).

The foregoing method provides a convenient and user-friendly way of generating a DHCP configuration file 12, a DHCP configuration database 22, and/or visual displays of information contained in the DHCP database 22 or elsewhere, regarding the IP addresses that have been assigned.

Preferably, the method further includes the step of tracking information collected by the proxy server 26 regarding internet URL addresses accessed by the proxy server 26 for each IP address. The additional information presented in the visual display for each IP address preferably includes an indication of whether any internet URL addresses were accessed by that IP address.

Each indication of whether any internet URL addresses were accessed can be provided with a selectable display element (e.g., a user-selectable hypertext link, a pop-up menu, a user-selectable icon, or the like) whenever at least one internet URL address was accessed. The selectable display element can be provided as the indication itself, or alternatively can be provided along with the indication.

The method also can include the step of responding to selection of the selectable display element. This step of responding preferably includes parsing through the information collected by the proxy server 26 for portions of that collected information that pertain to an IP address of interest, and then displaying in a user-readable format those portions of the information collected by the proxy server 26 that, in fact, pertain to the IP address of interest. The user-readable format can include a list of URL addresses accessed by the IP address of interest.

Alternatively, the step of responding to selection of the selectable display element can be simplified, by maintaining a readily accessible database of proxy tracking information. The proxy logs 40 of the proxy server 26 then can be periodically accessed and the information contained in the proxy logs 40 can be organized by IP address and stored in the database of proxy tracking information. This database therefore is keyed by IP address. Thus, all the proxy tracking information for a particular IP address can be retrieved quickly and conveniently by accessing the information pertaining to that IP address in the database of proxy tracking information.

The method also can include the step of selectively denying internet access through the proxy server 26. This step of selectively denying internet access preferably is performed via the aforementioned graphic user interface 16, and can be performed on the basis of IP addresses assigned by the DHCP server 14. One convenient way of effecting denials of internet access is by selectively modifying the configuration file 30 of the proxy server. In particular, the configuration file 30 can be augmented to include a command to "deny" internet access to each IP address for which no internet access is to be granted.

The foregoing method and/or its associated submethods preferably is (are) performed by a computer that is executing a computer-readable program code stored in a computer-usable medium.

The method preferably facilitates searching of e-mail text. In this regard, the method can include the steps of receiving from a user a text string to be searched and searching through e-mail archives 34 maintained by an e-mail server 36 for that text string.

The method also can include the step of providing an e-mail search results display via the graphic user interface 16. The e-mail search results display indicates which, if any, e-mail messages in the e-mail archives 34 includes a match for the entered text string. Preferably, a user-selectable portion is included for each match, in the e-mail search results display. The method, in this regard, can also include the step of displaying an entire e-mail message in which a match occurred when the user-selectable portion for that match is selected.

The step of presenting the aforementioned indications can be performed on a per-site basis, wherein each site corresponds to a subnetwork of the computer network. The step of generating the configuration file 12 of the DHCP server 14 also can be performed on a per-site basis.

The foregoing method also can include a method or submethod of searching URL information collected by a proxy server 26. In this regard, the foregoing method can include the steps of receiving a text string to be searched, and searching for the received text string through information collected by the proxy server 26 regarding internet URL addresses accessed by the IP addresses. A proxy search results display can be provided via the graphic user interface 16, indicating which, if any, URLs accessed via the proxy server 26 includes a match for the received text string.

Preferably, the proxy search results display includes a list of all URLs that include a match for the received text string along with the IP address that was used to access each such URL. The proxy search results display also, or alternatively, can include a user-selectable portion for each match. Preferably, the website identified by the URL in each match is automatically accessed when the corresponding user-selectable portion is selected.

Also provided by the present invention is a method for monitoring internet access in a computer network operating under a DHCP server 14. Though the monitoring method can be practiced with the above-described method of creating a configuration file 12 for a DHCP server 14, it also can be practiced independently. The monitoring method generally includes the steps of tracking information collected by the proxy server 26 regarding internet URL addresses accessed by the proxy server 26 for each of several IP addresses assigned by the DHCP server 14, and providing, via a graphic user interface 16, a visual display of each IP address along with an indication of whether any internet URL addresses were accessed by that IP address.

Each indication of whether any internet URL addresses were accessed can be provided with a selectable display element (e.g., a user-selectable hypertext link, a pop-up menu, a user-selectable icon, or the like) whenever at least one internet URL address was accessed. The selectable display element can be provided as the indication itself, or alternatively can be provided along with the indication.

The monitoring method also can include the step of responding to selection of the selectable display element. This step of responding preferably includes parsing through the information collected by the proxy server 26 for portions of that collected information that pertain to an IP address of interest, and then displaying in a user-readable format those portions of the information collected by the proxy server 26 that, in fact, pertain to the IP address of interest. The user-readable format can include a list of URL addresses accessed by the IP address of interest.

With reference to FIG. 4, the step of responding to selection of the selectable display element can be simplified by maintaining a readily accessible database of proxy tracking information. The proxy server 26, which acts as a central gateway for internet traffic, also maintains (Step 86 in FIG. 4) a log 40 of all websites (i.e., URLs) that are accessed via the proxy server 26 and the network IP address that was used to view each website. The proxy logs 40 of the proxy server 26 thus can be periodically accessed, and the information contained in the proxy logs 40 can be organized by IP address and stored in the database of proxy tracking information (Step 88 in FIG. 4). This database therefore is keyed by IP address. This, in turn, facilitates the rapid and convenient retrieval of all of the proxy tracking information for a particular IP address.

The monitoring method also can be performed along with a method of controlling internet access. In this regard, the monitoring method can include the step of selectively denying internet access through the proxy server 26. The step of selectively denying internet access preferably is performed via the graphic user interface 16. It preferably is performed on the basis of IP addresses assigned by the DHCP server 14, and can be performed by selectively modifying a configuration file 30 of the proxy server 26.

The monitoring method and/or the method of controlling internet access also can be performed on a per-site basis. That is, the visual display and indications described above and the denials of internet access, can be limited to a particular site (or subnet) of the network.

The method of monitoring internet usage can be performed by a computer that is executing a computer-readable program code stored in a computer-usable medium.

Preferably, the method of monitoring internet usage and/or controlling internet usage is implemented along with a method of searching e-mail text. The method of searching e-mail text preferably includes the steps of receiving at least a text string to be searched, and searching through e-mail archives 34 maintained by an e-mail server 36 for the received text string.

The method of searching e-mail text also can include the step of providing an e-mail search results display via the graphic user interface 16, indicating which, if any, e-mail messages in the e-mail archives 34 includes a match for the received text string. Preferably, the e-mail search results display includes a user-selectable portion for each match. When the user-selectable portion is selected, an entire e-mail message associated with that user-selectable portion is displayed.

Preferably, the graphic user interface 16 used in connection with the monitoring method is a web-based graphic user interface, and the visual display is provided via a web browser.

Figure 5:
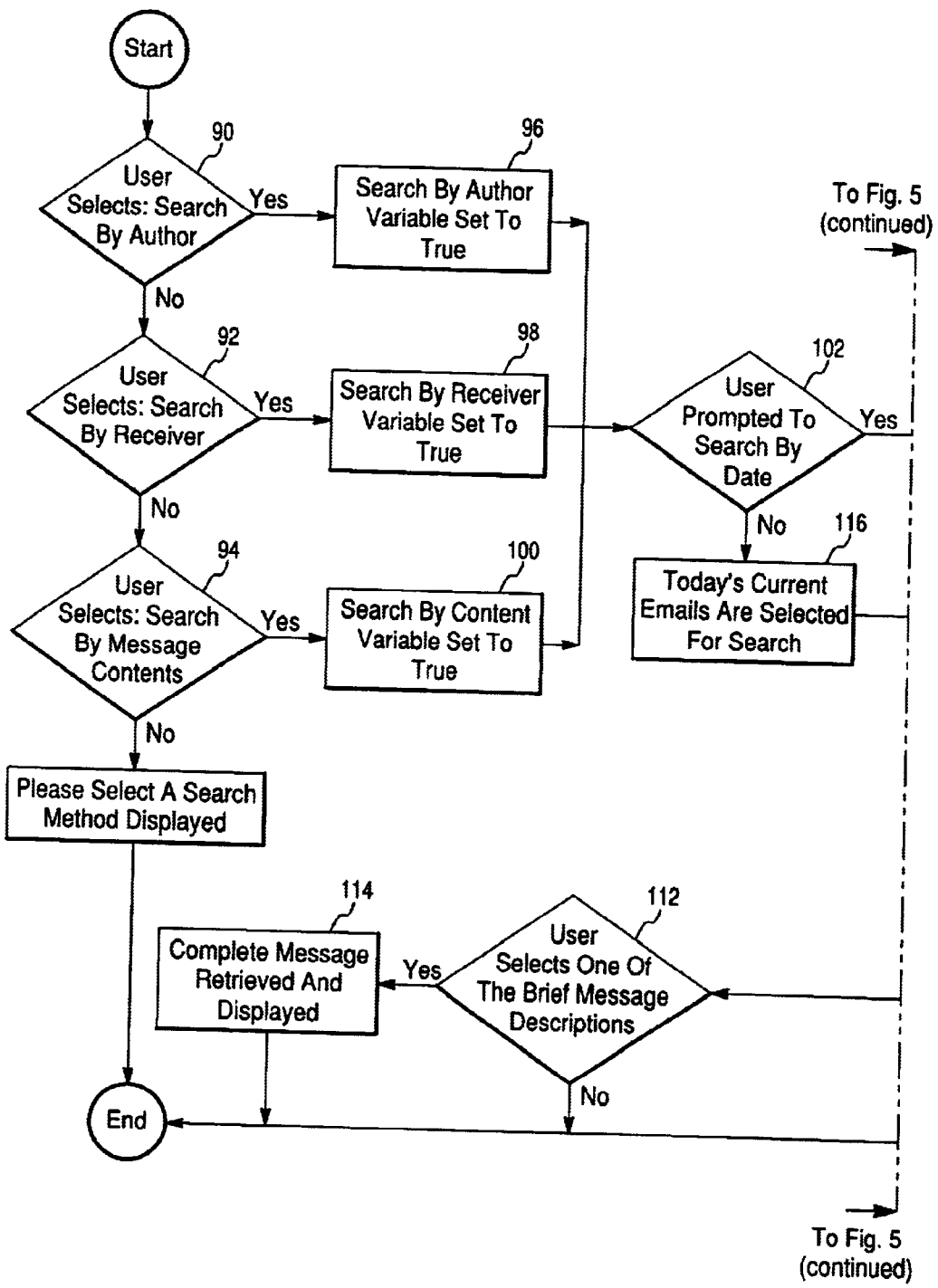
FIG. 5 is a flow chart illustrating a process for e-mail search and retrieval, according to a preferred implementation of the present invention.
Figure 5:
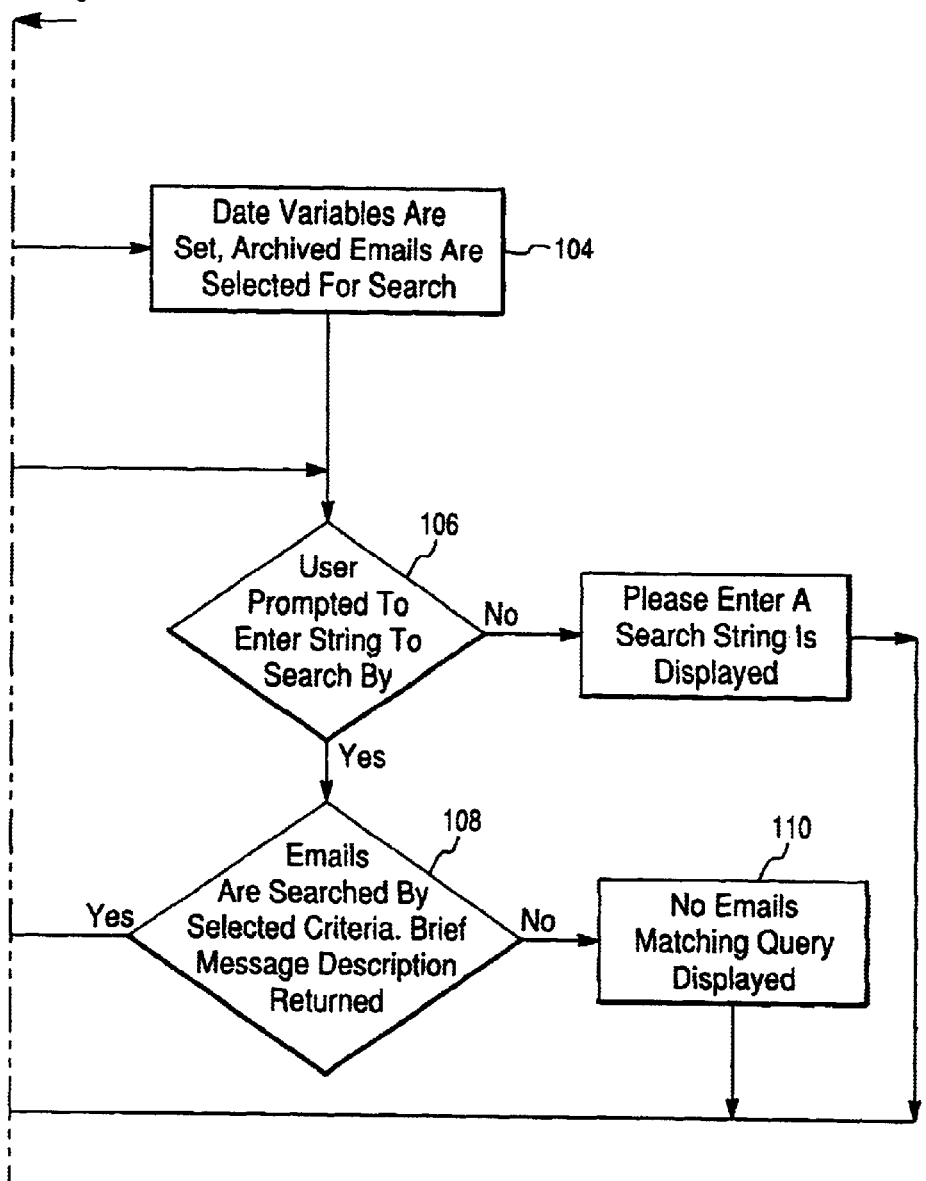

FIG. 5 is an exemplary flow chart of the e-mail searching method. Initially, a field selection is made. The user, in Steps 90,92,94, selects the author field, the recipient (or receiver) field, or the message body (or entire contents) field. A corresponding variable then is set in Steps 96,98,100. The user then has the option of entering limits on the period of time to be searched (Step 102). If any such temporal limits are entered, the date variables are set and the e-mail archives 34 are searched for e-mail messages that fall within the indicated temporal limits (Step 104). The user then is prompted to enter a text string to be searched (Step 106). When the text string is entered, the indicated fields of the e-mail archives 34 consistent with the entered temporal limits, if any, are searched for the-text string (Step 108). If no matches are found, a message to that effect or an error message can be displayed (Step 110). If a match is found, a display of excerpts from any matching e-mails is generated (Step 112). The user then can select any displayed excerpt to generate a display of the complete e-mail message (Step 114).

Since it may be faster to store e-mails in multiple databases, instead of a single, large database, the method can be implemented so that failure to specify a temporal limit has the effect of limiting the search to e-mail messages that were sent on the same day as the search (Step 116).

Any of the foregoing combinations of methods also can be performed along with a method of searching URL information collected by a proxy server 26. In this regard, the e-mail searching and control/monitoring of internet usage can be performed along with the steps of receiving a text string to be searched, and searching for the received text string through information collected by the proxy server 26 regarding internet URL addresses accessed by the IP addresses. A proxy search results display can be provided as indicated above. Preferably, as indicated above, the website identified by the URL in each match in the proxy search results display can be automatically accessed when the corresponding user-selectable portion is selected.

Figure 6:
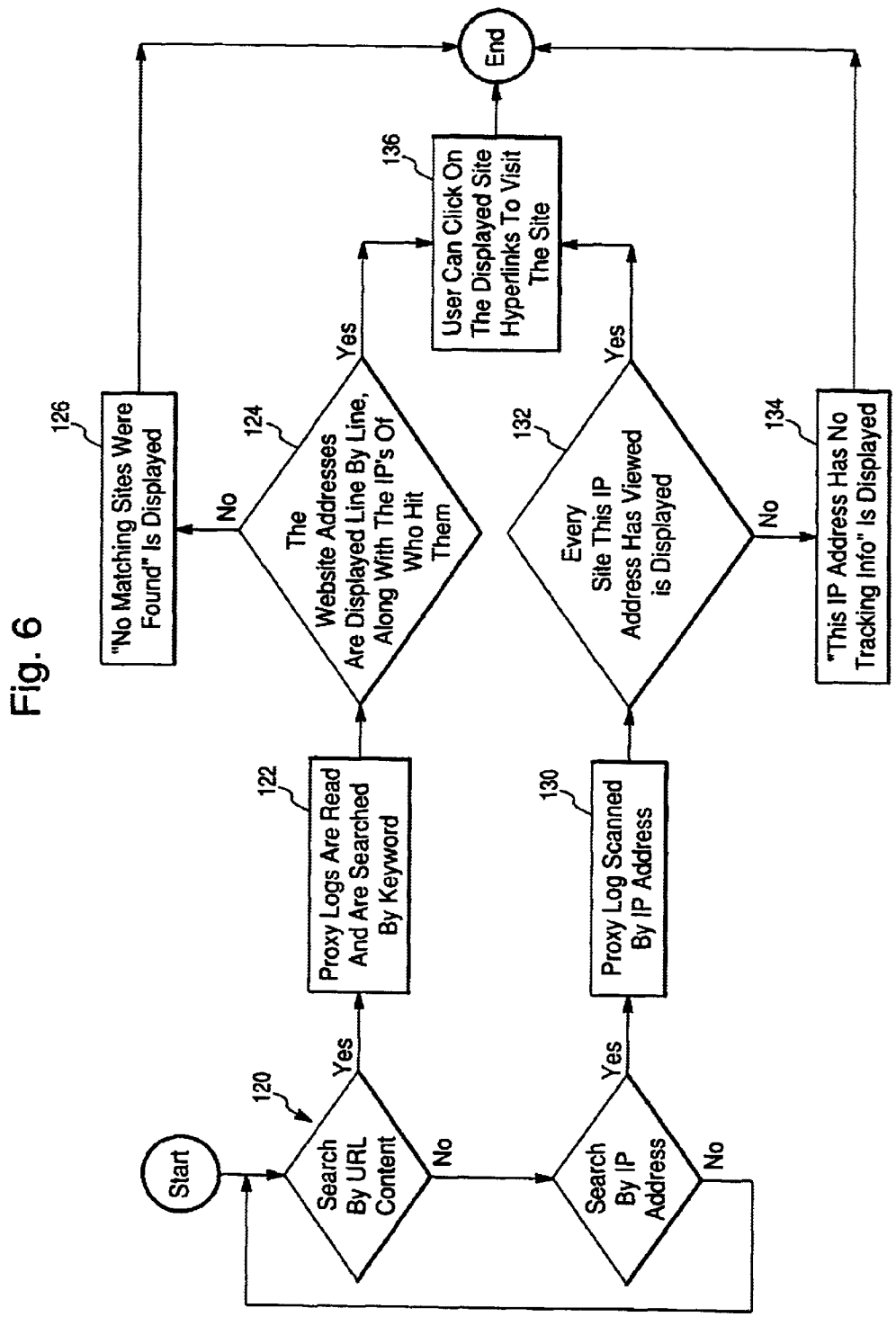
FIG. 6 is a flow chart illustrating a proxy log search and retrieval method, according to a preferred implementation of the present invention.

With reference to the flow chart of FIG. 6, search and retrieval of information contained in the proxy logs 40 begins with a determination of what type of search is desired (Step 120). If the search is to occur by URL content, the proxy logs 40 are read and are search for the received text string (Step 122 in FIG. 6). The website addresses (URLs) then are displayed, line-by-line, along with the IP addresses that were used to access each website address (Step 124 in FIG. 6). If no matching text strings are found in any URLs, then a message is displayed indicating that "no matching sites were found" (Step 126 in FIG. 6).

If, by contrast, the search is to occur by IP address, the proxy logs 40 (or a database containing the contents thereof) are searched for an indicated IP address (Step 130 of FIG. 6). A display then is generated of the URLs of every website accessed by the indicated IP address (Step 132 of FIG. 6). If no websites were accessed via the indicated IP address, a message is displayed indicating that "this IP address has no tracking info" (Step 134 in FIG. 6).

Regardless of whether the search was based on URL content or IP address, the displayed URLs can be mouse-clicked (or otherwise selected) to automatically access the website identified by that URL (Step 136 in FIG. 6).

The present invention also provides a method of selectively controlling internet access in a computer network operating under a DHCP server 14. This method can be practiced along with any one or more of the aforementioned other methods.

The method of selectively controlling internet access includes the steps of providing, via a graphic user interface 16, a visual display of IP addresses assigned by the DHCP server 14, selectively denying internet access through a proxy server 26, for at least one of the IP addresses, and providing along with the visual display an indication of which, if any, of the IP addresses has been denied internet access.

Figure 7:
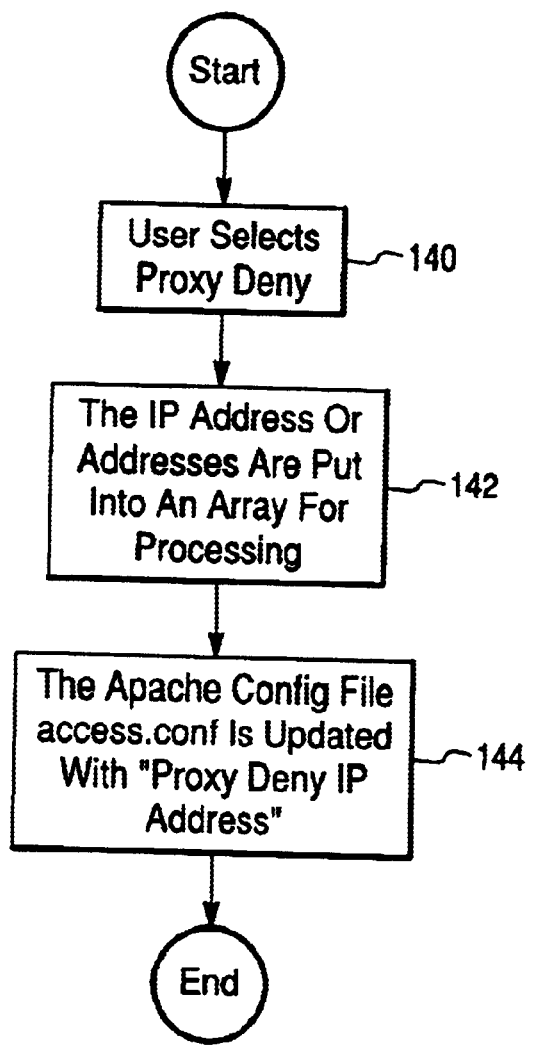
FIG. 7 is a flow chart illustrating a proxy denying method, according to a preferred implementation of the present invention.

With reference to the flow chart of FIG. 7, the method can begin when a user selects a "Proxy deny" symbol (Step 140 in FIG. 7). Any affected IP addresses then are placed into an array for processing (Step 142 in FIG. 7). The configuration file 30 (e.g., access.conf) of the proxy server 26 (e.g., an Apache web/proxy server) then is updated with a corresponding "Proxy Deny IP address" command (Step 144 in FIG. 7).

As indicated in the flow chart of FIG. 7, the step of selectively denying internet access through the proxy server 26 can be performed by selectively modifying a configuration file 30 of the proxy server 25. Preferably, the method of denying internet access is performed by a computer that is executing a computer-readable program code stored in a computer-usable medium.

The method of denying internet access also can be performed on a per-site basis. The visual display, for example, can be generated on a per-site basis, and the denials likewise can be implemented on a per-site basis, wherein each site corresponds to a subnetwork of the computer network.

Preferably, as indicated above, the graphic user interface 16 is a web-based graphic user interface and the step of providing the visual display is performed via a web browser.

Also provided by the present invention is a method of searching e-mail text. This method can be implemented with or without any one or a combination of the foregoing methods. The method of searching e-mail text includes the steps of presenting (via a graphic user interface 16) an e-mail search display that includes information indicating that a text string to be searched can be entered, receiving at least the text string to be searched when entered by a user, and searching for the text string through e-mail archives 34 maintained by an e-mail server 36.

The method preferably is performed by a computer that is executing a computer-readable program code stored in a computer-usable medium. Preferably, an e-mail search results display is provided via the graphic user interface 16, indicating which, if any, e-mail messages in the e-mail archives 34 includes a match for the entered text string. Preferably, the e-mail search results display includes a user-selectable portion for each match. When the user-selectable portion is selected for a particular match, an entire e-mail message in which the match occurred is displayed.

Preferably, the information indicating that a text string to be searched can be entered, further includes limit information indicating that at least one limit can be entered in connection with the scope of e-mail searching. In addition, the method includes the steps of receiving the limit(s) when entered by a user, and limiting the search for the entered text string in accordance with the entered limit(s). The limit(s) can correspond to a time period of interest such that searching is limited to e-mail messages that were sent or received within the time period of interest and/or at least one field of interest such that searching is limited to the field(s) of interest in each e-mail message. Exemplary fields of interest are an author field in each e-mail message, a recipient field in each e-mail message, and an entire content of each e-mail message.

Also provided by the present invention is a method of searching information collected by a proxy server 26 for URL content, which method can be practiced with none, any one, or any combination of the aforementioned methods. The method of searching for URL content includes the steps of receiving a text string to be searched, and searching for the received text string through information collected by the proxy server 26 regarding internet URL addresses accessed by at least one IP address. Preferably, a proxy search results display is provided indicating which, if any, URLs accessed via the proxy server 26 includes a match for the received text string.

The proxy search results display preferably includes a list of all URLs that include a match for received text string along with the IP address that was used to access each such URL. The proxy search results display can include a user-selectable portion for each match. When one of the user-selectable portions is selected, a web-site identified by the corresponding URL is automatically accessed. This enables a network manager to quickly and conveniently review the contents of any matching website.

The present invention also provides a method of integrating a DHCP server 14 of a computer network, an e-mail server 36, and a proxy server 26. The method includes the steps of:

presenting, via a graphic user interface 16, indications of information from which a configuration file 12 of a DHCP server 14 can be derived;

providing a visual display of IP addresses assigned by the DHCP server 14 and additional information associated with each IP address;

generating a DHCP server configuration file 12 in response to information entered by a user in response to the indications of information;

tracking information collected by the proxy server 26 regarding internet URL addresses accessed by the proxy server 26 for each IP address;

selectively denying internet access through the proxy server 26;

receiving at least a text string to be searched; and searching through e-mail archives 34 maintained by an e-mail server 36 for the received text string.

This method preferably is performed by a computer that is executing a computer-readable program code stored in a computer-usable medium. It also can be performed along with the aforementioned method of searching to information collected by a proxy server 26 for URL content.

The graphic user interface 16 preferably is a web-based graphic user interface, whereby the steps of presenting indications and providing the visual display, are performed by a web browser.

Figure 8:
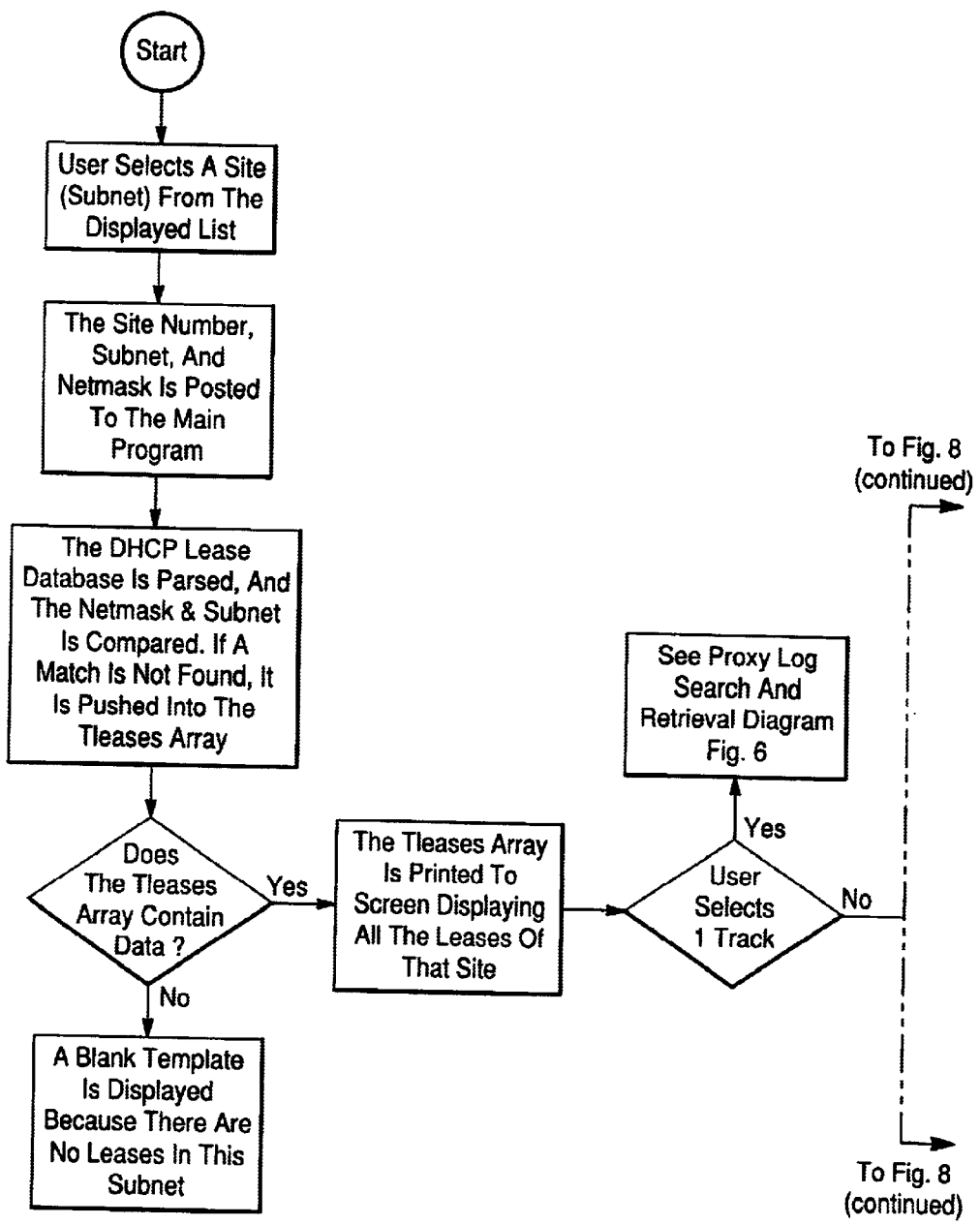
FIG. 8 is a flow chart illustrating a preferred processes of using a main graphic user interface, according to a preferred implementation of the present invention.
Figure 8:
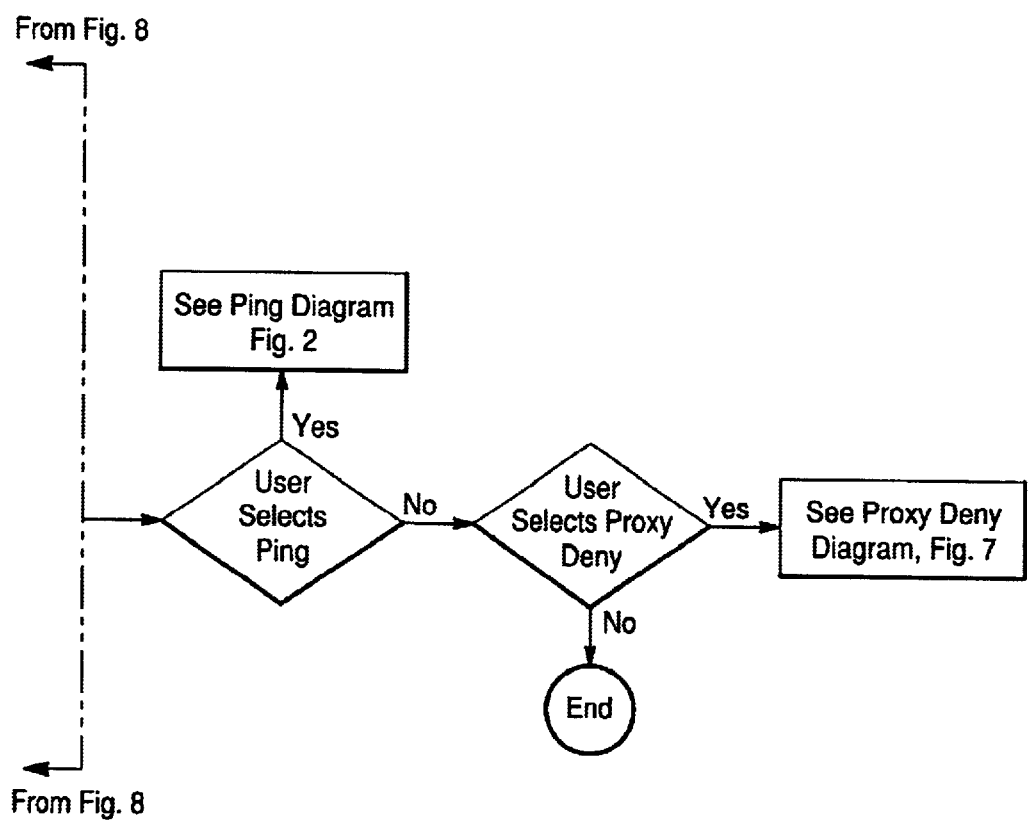

With reference to FIG. 8, a preferred implementation of the method of integrating a DHCP server 14 of a computer network, an e-mail server 36, and a proxy server 26, begins with the user selecting a site (or subnetwork) from a displayed list of all sites (Step main10). This list is derived from the configuration file 12 and/or configuration file database 22 of the DHCP server 14.

When the method is performed using a web-based CGI, the method includes the step of posting a site number, subnet, and netmask (Step main11) to the CGI application program whenever a site is selected. The information posted to the CGI application program then is used to read through a DHCP lease database 22. This database 22 not only contains information about the selected site, but about every other site as well. The DHCP lease database 22 is parsed, and the netmask and subnet are compared (Step main12). If a match is found, it is pushed into a tleases array. The subnet and the netmask are used to locate leases pertaining to the selected site. Since there can be multiple netmasks within a class C network, there is the chance that one network can contain multiple sites. If an IP address has been found to match the subnet and a netmask, the following steps are performed:

1) the start time of the lease (or IP address assignment) is stored (e.g., in GMT time);
2) the end time of the lease (or IP address assignment) is stored (e.g., in GMT time);
3) the hardware's MAC address is stored;
4) the client identifier name is stored;
5) the current time is accessed and stored;
6) the start and end times are converted to a configurable time zone;
7) the end time is compared to the current time to see if the lease (or IP address assignment) has expired;
8) A Tleases array is inputted with information indicating: start time, client identifier, IP address, end time, whether the lease (or IP address assignment) is active or expired, and the hardware MAC address.

Once scanning of the lease database is complete, the tleases array is full of data. This data is then placed into a readable format and displayed accordingly (Step main14). The user then can select whether a proxy log 40 will be searched and retrieved (as described herein and shown in the proxy log search and retrieval flow chart; FIG. 6), whether a computer will be "pinged" (as described herein and shown in the PING flow chart; FIG. 2), and whether internet access will be denied (as described herein and shown in the Proxy Deny flow chart; FIG. 7).

If the tleases array is empty, no matches are found in the lease database. An indication then is provided that no leases have been issued for this site. A blank template can be displayed (Step main14).

A more preferred embodiment of the present invention will now be described. Although elements of the preferred embodiment will be described hereinafter in terms of a software implementation, the invention may be implemented in software or hardware or firmware, or a combination of two or more of the three. For example, aspects of the invention may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input data and generating output data.

Suitable processors include, by way of example, both general and special purpose microprocessors. Generally, a processor receives instructions and data from a read-only memory and/or a random access memory. Storage devices suitable for tangibly embodying computer program instructions include, for example, all forms of non-volatile memory, such as semiconductor memory devices (e.g., including EPROM, EEPROM, and flash memory devices), magnetic disks (e.g., internal hard disks and removable disks), magneto-optical disks, and optical disks (e.g., CD-ROM disks). Any of the foregoing may be supplemented by, or incorporated into, specially-designed ASICs (application-specific integrated circuits). A computer generally also can receive programs and data from storage medium such as an internal disk or a removable disk. These elements also can be found in the conventional desktop or workstation computer as well as other computers suitable for executing computer programs implementing the methods, described here, which may be used in conjunction with any digital print engine or marking engine, display monitor, or other raster output device capable of producing color or gray scale pixels on a paper, a film, a display screen, or any other output medium.

A preferred software version of the present invention is expressed in the Microfiche Appendix using the well known PERL computer programming language. The preferred software can be conveniently stored on a disk or other machine-readable memory. The preferred software is adapted to operate on a conventional host computer that operates under the well known UNIX operating system, and that also has been equipped with the well known Apache web/proxy server program, the well known ISC DHCP server program, the well known SEND MAIL e-mail server program, and a dynamic DNS server program (e.g. the DNS program commercialized under the brand BIND by ISC).

While the preferred software is adapted for use with the foregoing web/proxy server program, DHCP server program, e-mail server program, and dynamic DNS program, it is understood that the preferred software can be modified to operate with other kinds of server programs and/or operating systems. The present invention, in this regard, is not limited to use on host computers that are equipped with the exemplary web/proxy server, DHCP, e-mail and dynamic DNS server programs.

In a network, such as a local area network (LAN) or a wide area network (WAN), a conventional computer equipped with the foregoing server software typically operates as a "network server." The network server can be connected (at least indirectly) to other computers, referred to generally as "client computers." The client computers are "served" by the network server in that data can be communicated (or "served) from the network server to one or more of the client computers and/or vice versa.

To install the preferred software, the code shown in Frames 21–62 of the Microfiche Appendix is copied from the machine-readable memory into the "documents" directory of the web/proxy server, preferably at the network server. The computer where the "documents" directory of the web/proxy server is located (and therefore where the code shown in Frames 21–62 is stored) is referred to as the "host computer."

A web browser then can be used to activate the preferred software of the present invention. Any commercially available web browser can be used, such as Internet Explorer, Netscape Navigator, and the like. To activate the preferred software, the following address is typed into the address field of the web browser:

http://__/dhcp.html

When typing the foregoing address, the network name of the host computer is inserted in the above blank space. An exemplary network name is "ns1.premdor.com". Thus, activation of the preferred software in a host computer (e.g., a network server) with the network name of "ns1.premdor.com" would include typing the following address into the address field of the web browser:

http://ns1.premdor.com/dhcp.html

Figure 9:
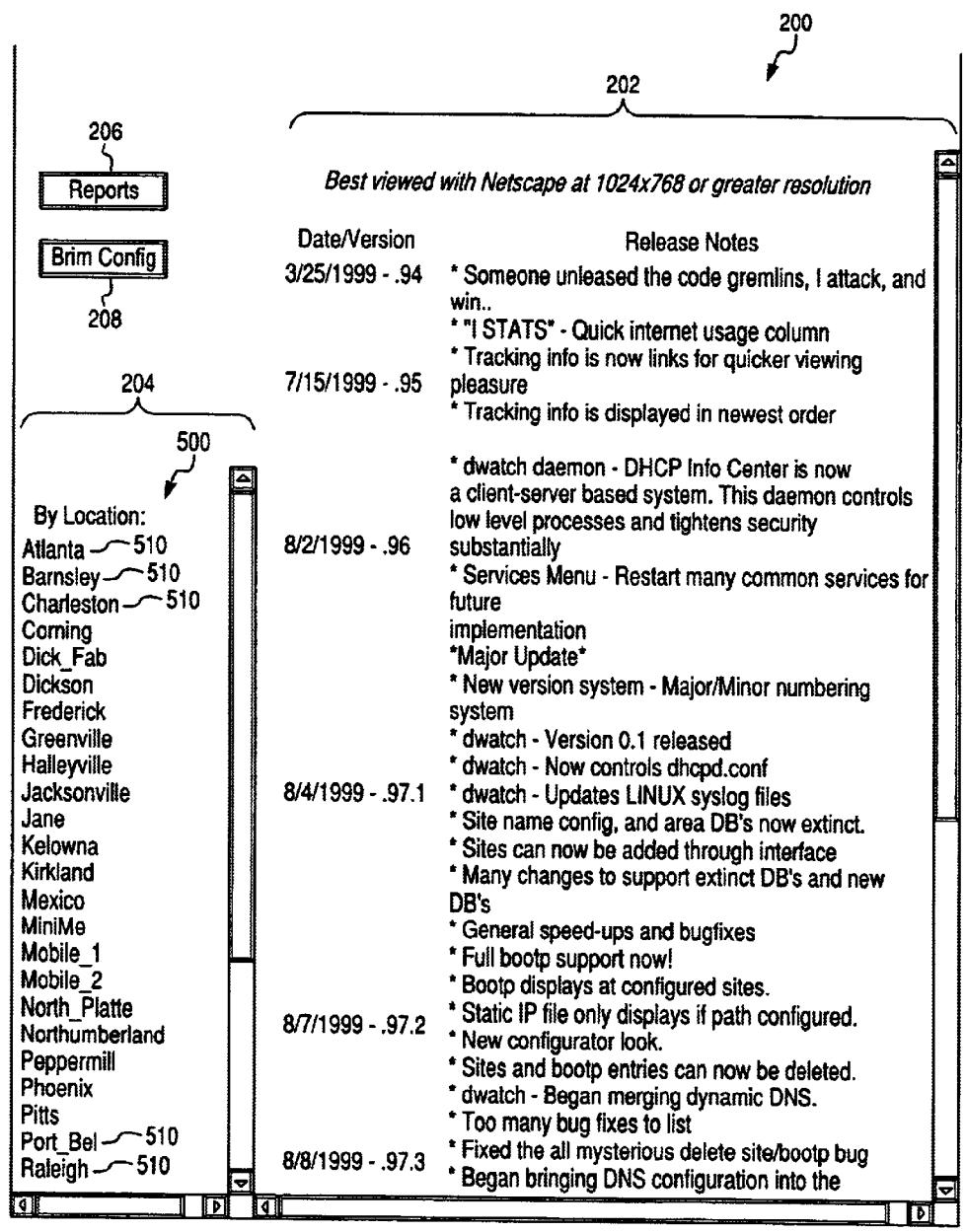
FIG. 9 illustrates a main menu display that is generated, according to a preferred implementation of the present invention.

The preferred software responds to such activation by causing a main menu display 200 to be generated on the screen of the computer where the web browser was accessed. FIG. 9 shows an exemplary main menu display 200. It has two scrollable fields 202,204 and two virtual buttons 206,208.

The first scrollable field 202 provides a convenient table of software updates or changes, with "Release Notes" indicating what changes were made to the preferred software and a date indicating when the changes were made.

The second scrollable field 204 includes a list of subnetworks in the overall network served by the network server. In the exemplary second field 204, the subnetworks are different locations (or sites) in a WAN. Each site has a site name. The site name can be the name of the city where the site is located. When two sites are located in the same city, designations such as "Mobile_1" and "Mobile_2" can be provided. Alternatively, the different sites in the same city can be designated using additional information such as the type of facility at the site. Two sites in Tampa, for example, can be designated "Tampa Corp" for the corporate offices in Tampa and "Tampa_Mnfg" for the manufacturing facility in Tampa.

Each site designation in the second field 204 preferably is a hypertext link. Each site designation, therefore, can be selected (e.g., using a "mouse click" or other selection mechanism) to open a display of information associated with that site. The information displayed can include information about IP addresses assigned at that site, as will be described hereinafter.

The term "virtual button", as used herein, refers to an image on a display screen that is selectable (e.g., using a mouse "click" or other selection mechanism) to cause an associated function to be performed (e.g., generating a corresponding display, opening a corresponding menu, and the like). The "Start" button at the bottom left corner of the typical Windows 95 screen is a well known example of a "virtual button." Mouse-clicking the "Start" button in Windows 95 causes a menu to open on the display screen.

Similarly, mouse-clicking either of the two virtual buttons 206,208 on the main menu display 200 causes a corresponding menu to open. One of the virtual buttons is a "Reports" button 206. The other virtual button is a "Brim Config" (browser remote IP management configuration) button 208.

Figure 10:
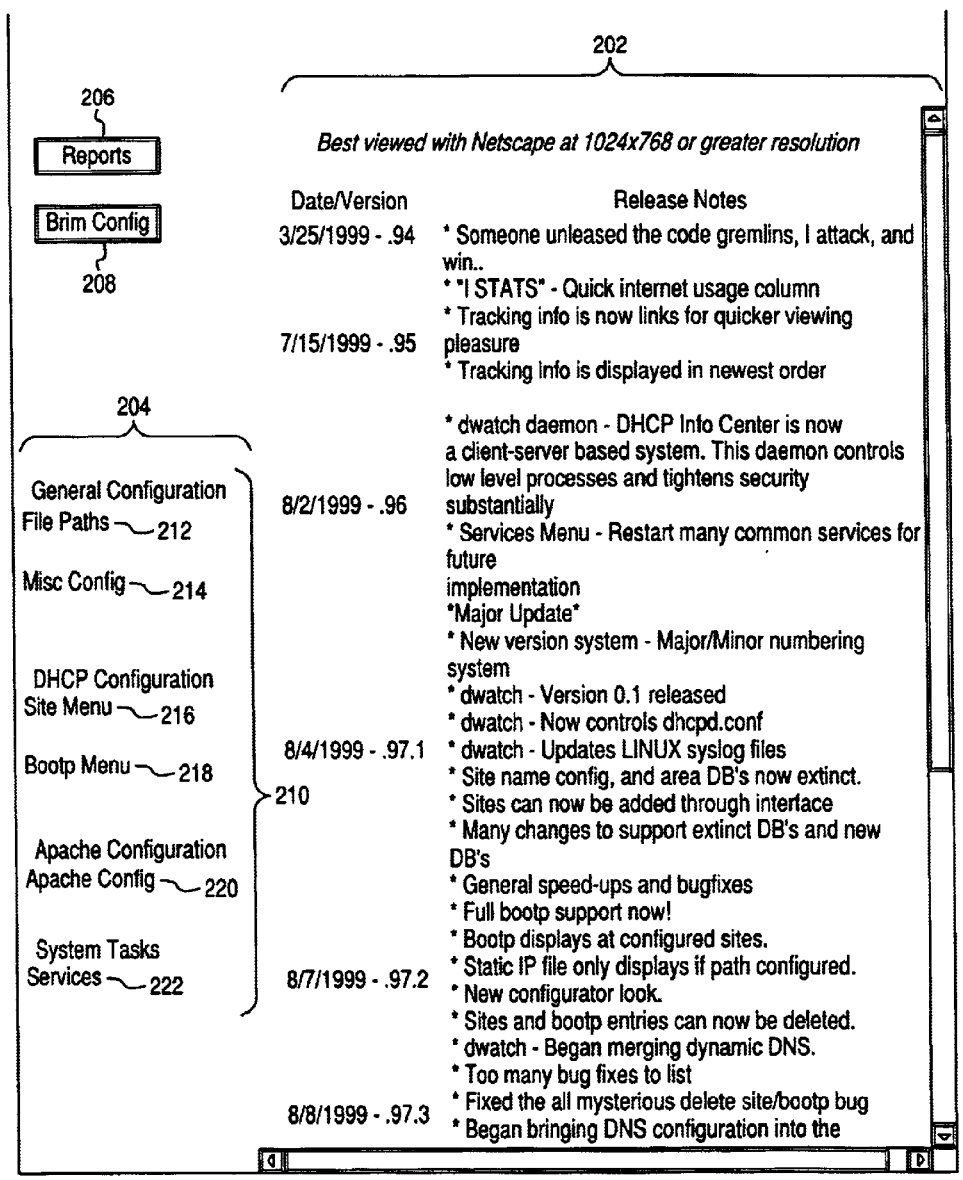
FIG. 10 illustrates a "Brim Config." menu that can be generated, according to a preferred implementation of the present invention.

As shown in FIG. 10, selecting the "Brim Config" button 208 (using a "mouse click" or other selection mechanism) causes a Brim Configuration menu 210 to be displayed in place of the second field 202. The Brim Configuration menu 210 provides a list of different configuration-related functions 212–222 that can be performed using the preferred software.

As indicated above, the configuration file of a newly loaded DHCP server program initially is empty. Without the present invention, the configuration file for that DHCP server program typically would have to be manually written by one highly skilled in the art of creating such files. The configuration-related functions 212–222 represented in the Brim Configuration menu 210, however, avoid the need for such highly skilled person by providing a convenient, user-friendly way of generating the DHCP server configuration file and modifying any other configuration files as needed. Completion of any configuration-related function with a "Save" selection (to be described hereinafter) causes the preferred software of the present invention to generate a suitable configuration file if no such configuration file already exists, or suitably modify the configuration file if it already exists. A DHCP database also is generated by the preferred software when the DHCP configuration file is generated.

There are four categories of configuration-related functions 212–222. These four categories include general configuration functions 212–214, DHCP configuration functions 216,218, Apache configuration functions 220, and system task functions 222. Each of the functions in each category is designated using a hypertext link. Thus, each function 212–222 can be selected using a "mouse click" or other selection mechanism.

Figure 11:
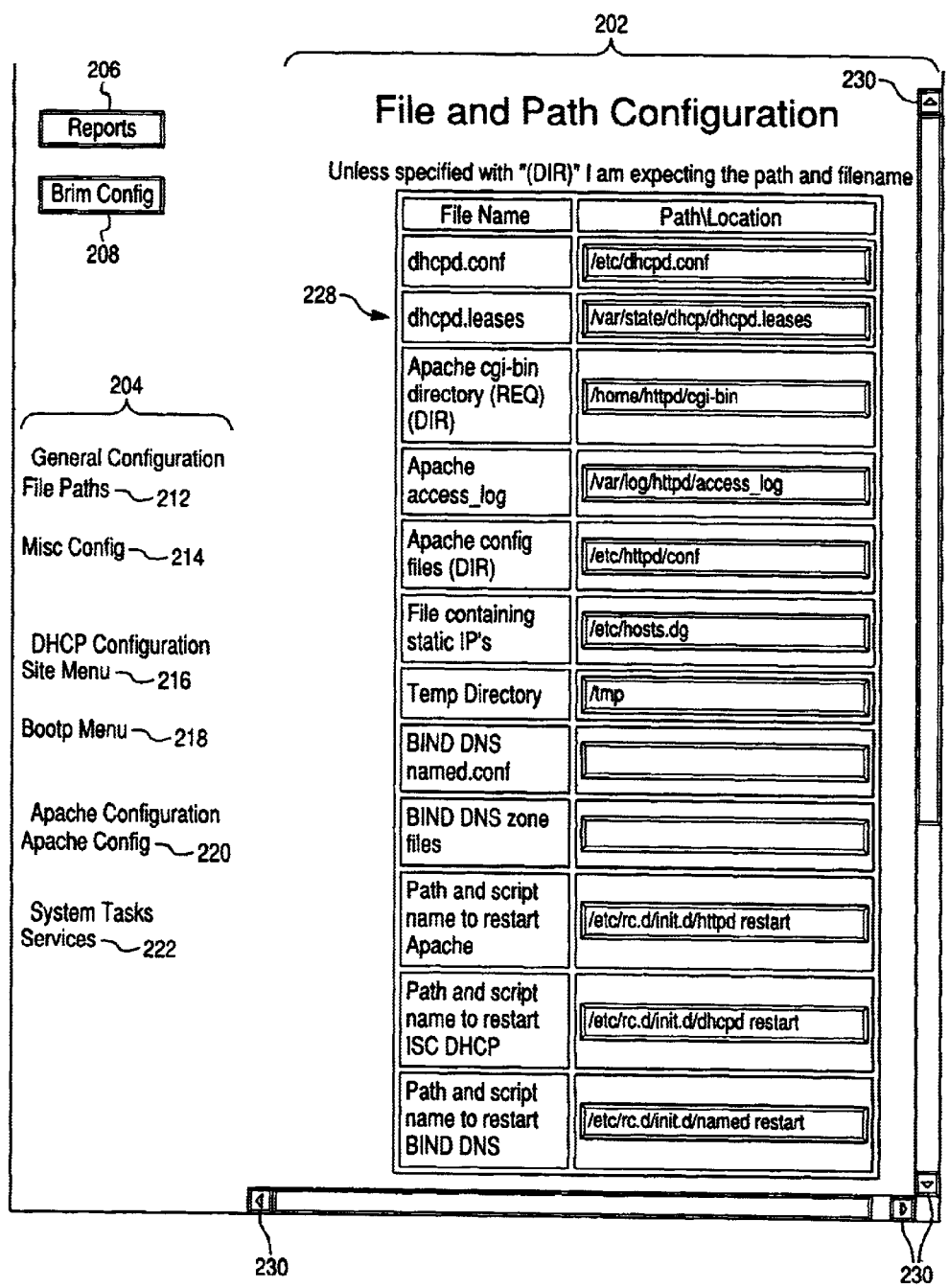
FIG. 11 illustrates a "File and Path Configuration" menu that can be generated, according to a preferred implementation of the present invention.

Included in the General Configuration functions is a "File Paths" function 212 and a "Misc Config" function 214, each of which is represented by a hypertext link. Selecting the "File Paths" hypertext link 212 causes the first field 204 to display a File and Path Configuration menu 228, as shown in FIG. 11. Scrolling of the File and Path Configuration menu 228 can be achieved by mouse-clicking a corresponding one of the scroll arrows 230. The complete File and Path Configuration menu 228 is shown in FIG. 12. The File and Path Configuration menu 228 includes a table of file names and a text field 229 for each named file. The named files are configuration files and log files for the various server programs. The default path/location, if any, of each named file is automatically inserted by the preferred software in each text field 229. The "dhcpd.conf" file, for example, is stored in the "etc/dhcpd.conf" path. This is the default path/location for that file. The paths/locations shown in FIG. 12 are consistent with the default settings for the exemplary Apache web/proxy server program and ISC DHCP server program. If the person who manages the network determines that the path/location of any indicated files should be changed, the preferred software can be made to operate in a manner consistent with such changes by entering the corresponding change in the text field 229 for the affected path/location. When all such changes are entered, the changes can be finalized by mouse-clicking a "Save" virtual button 232 at the bottom of the File and Path Configuration menu 228. The preferred software then will operate pursuant to such changes and modify (or generate) any affected configuration files and databases accordingly.

Figure 13:
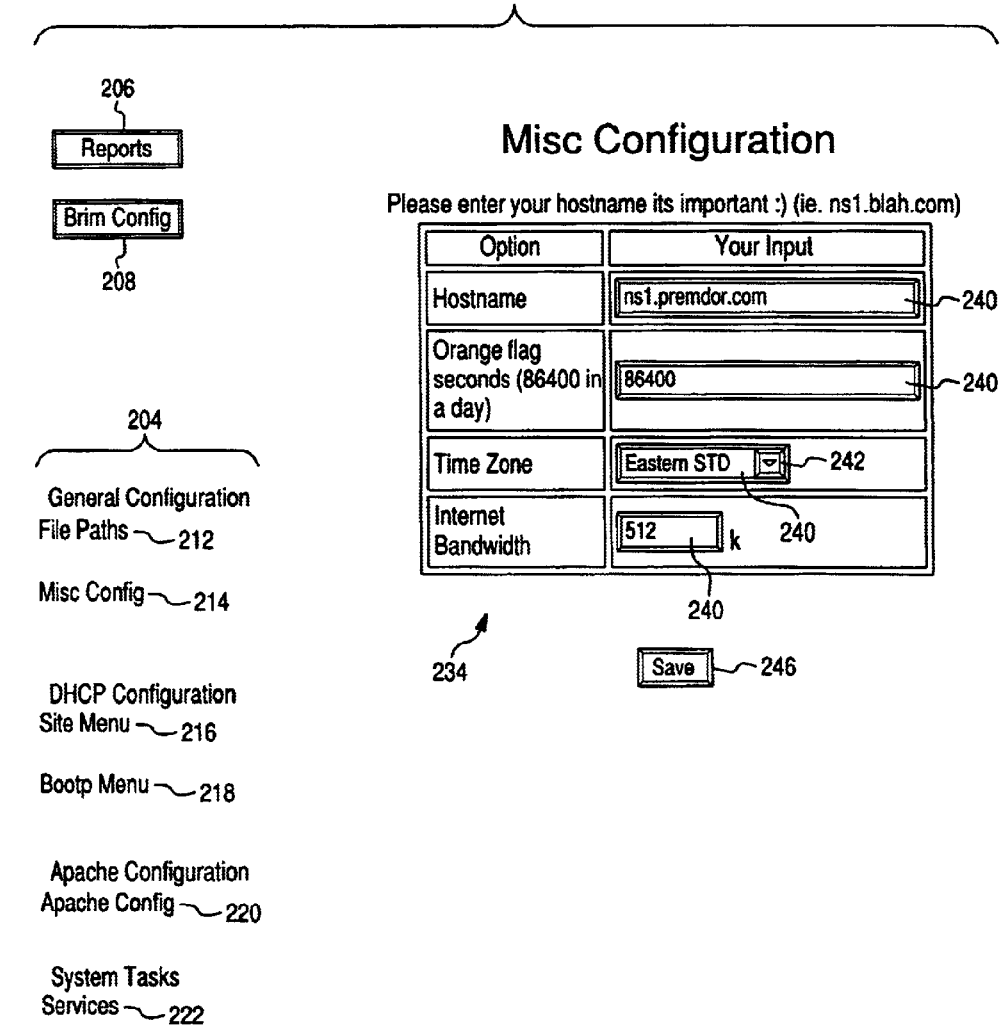
FIG. 13 illustrates a "Misc Configuration" menu that can be generated, according to a preferred implementation of the present invention.
Figure 14:
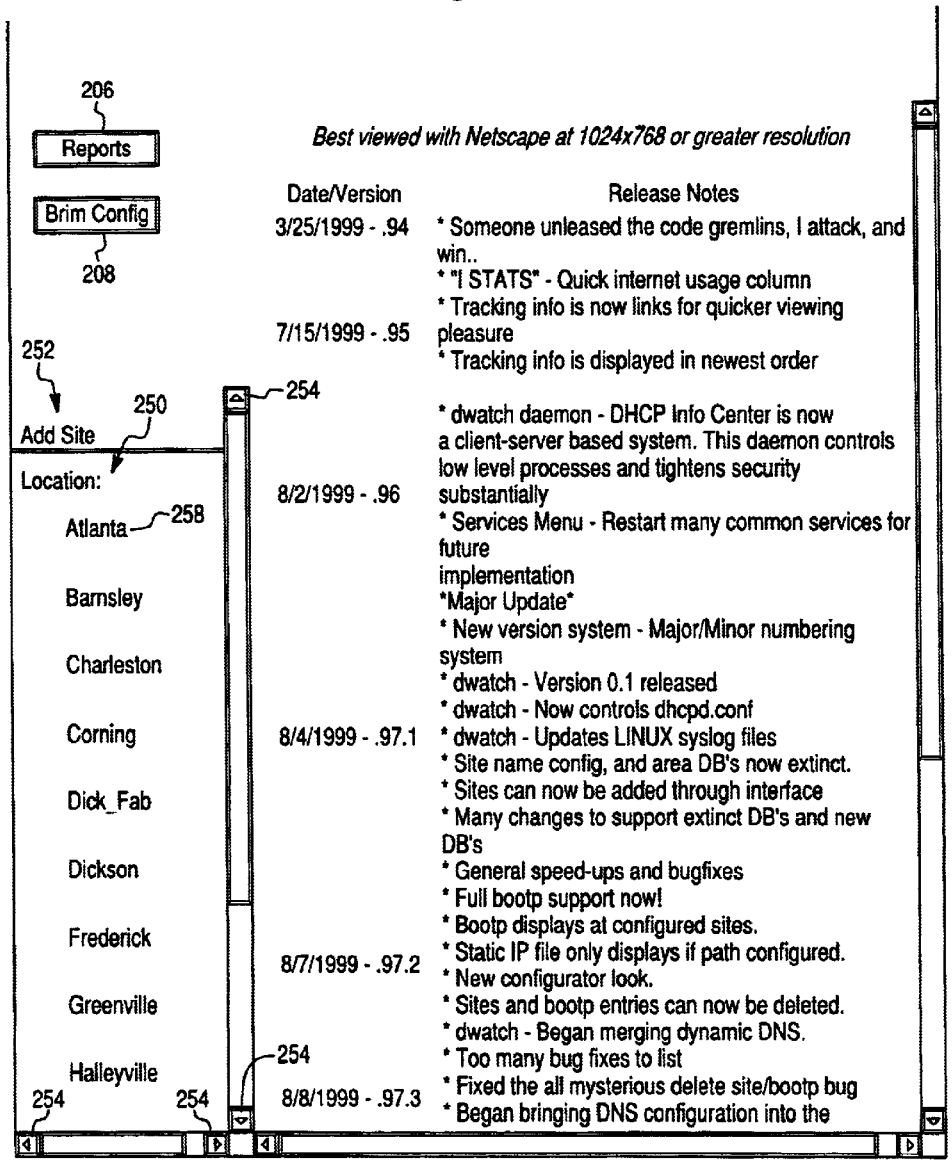
FIG. 14 illustrates a "Site" menu that can be generated, according to a preferred implementation of the present invention.

The other hypertext link 214 included in the general configuration category of functions is the "Misc Config" hypertext link 214. Selecting the "Misc Config" hypertext link 214 causes the first field 204 to display a Misc Configuration menu 234, as shown in FIG. 13. Scrolling of the Misc Configuration menu 234, if necessary, can be achieved by mouse-clicking on one or more scroll arrows. The Misc Configuration menu includes a table of options (or parameters that can be modified) and a text field 240 for each named option. The exemplary named options are the host name (i.e., the network name of the machine that is hosting the preferred software), the time zone, the internet bandwidth, and the duration (in seconds) of an "about to expire" indication.

As will be described hereinafter, the "about to expire" indication (e.g., an orange display or flag) can be provided by the preferred software on a list of IP addresses (to be described hereinafter) when an IP address assignment made by the DHCP server is about to expire. The internet bandwidth corresponds to the bandwidth of the internet connection served by the web/proxy server.

Preferably, as shown in FIG. 13, the time zone text box has a scroll arrow 242 that can be mouse-clicked to reveal a pop-up list of exemplary time zones. Each time zone then can be mouse-clicked to indicate that the host computer is located in that time zone. An exemplary list that is provided by the preferred software when the scroll arrow 242 is mouse-clicked includes Midway, Hawaii, Alaska, Mountain, Central, Mexico, Sask, Bogota, Eastern STD, Indiana, Atlantic, Newfoundland, Georgetown, Mid Atlantic, Azores, GMT, Berlin, Cairo, East Europe, Moscow, and Seoul. Additional or alternative time zones, of course, can be provided.

Based on the exemplary entries in the text fields 240 of FIG. 13, the preferred software was loaded onto a host computer with a network address of "ns1.premdor.com", the orange flag or other indication that an IP address is about to expire will last one day (or 86400 seconds), the host computer is located in the eastern STD time zone, and the web/proxy server is associated with a 512 KBPS internet connection.

If the person who manages the network determines that any of the indicated options should be changed, the preferred software can be made to operate in a manner consistent with such changes by entering the corresponding change(s) in the text field 240 for the option. When all such changes are entered, the changes can be finalized by mouse-clicking a "Save" virtual button 246 at the bottom of the Misc Configuration menu 234. The preferred software then will operate pursuant to such changes and modify (or create) any affected configuration files or databases accordingly.

Without the preferred software, such changes to the configuration file typically would require a person very familiar with the code in the configuration file of the affected server programs. The present invention, by providing a user-friendly graphic user interface, such as the File and Path Configuration menu 228, and by providing software capable of modifying (or creating) the affected configuration files according to changes made in the text field 229 of the File and Path Configuration menu 228, advantageously allows such changes to be implemented by less experienced personnel and those who are less familiar with the affected configuration files.

As indicated above, another category of functions in the Brim Config menu 210 is the DHCP Configuration category. Included in the DHCP Configuration category is a "Site Menu" function 216 and a "Bootp Menu" 218 function, each of which is represented by a hypertext link.

Selecting the "Site Menu" hypertext link 216 causes the second field 204 to display a Site menu 250 and an Add Site hypertext link 252. The Site menu 250 includes a list of the aforementioned locations or sites in the LAN, if any have already been added. Adding of such locations or sites will be described hereinafter. Each listed location or site (e.g., Atlanta, Barnsley, Charleston, and the like) is provided in hypertext form so that each can be selected using a mouse click or other selection mechanism, to cause information regarding that site to be displayed. Scrolling of the Site menu can be achieved by mouse-clicking a corresponding one of the scroll arrows 254.

Figure 15:
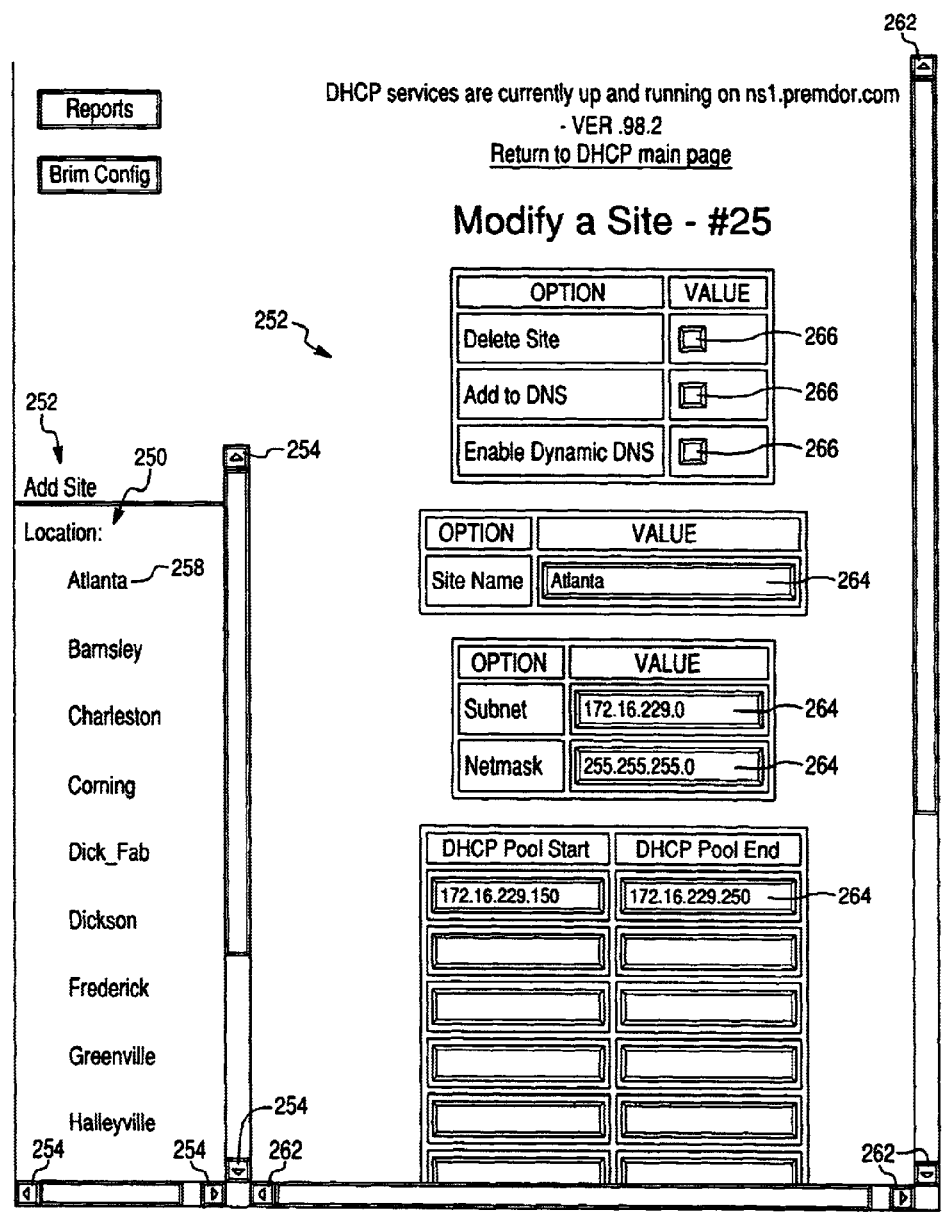
FIG. 15 illustrates a "Modify a Site" menu that can be generated, according to a preferred implementation of the present invention.
Figure 17:
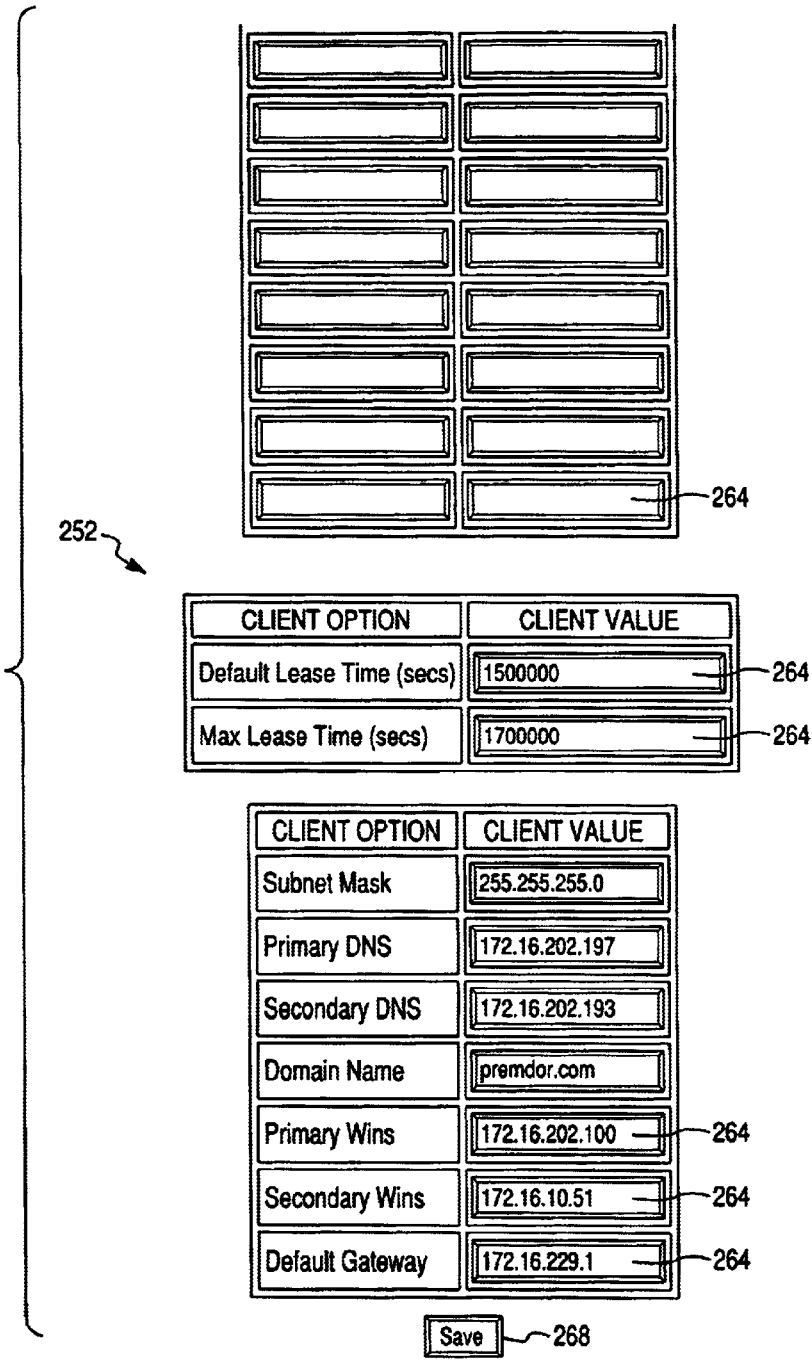

With reference to FIG. 15, when the hypertext link 258 for "Atlanta" is selected, information about that site is displayed in the first field 202. In particular, a "Modify a Site" menu 260 is generated in the first field 202. Scrolling of the "Modify a Site" menu 260 can be achieved by mouse-clicking a corresponding one of the scroll arrows 262. The complete "Modify a Site" menu 260 for the Atlanta site is shown in FIGS. 16 and 17 (FIG. 16 showing a top part of the menu 260 and claim 17 showing a bottom part of the menu 260). The "Modify a Site" menu 260 includes several tables of options (or parameters that can be modified) and a text field 264 or check box 266 for each named option. The "Modify a Site" menu 260 also includes tables of DHCP Pool Start and End addresses with associated address text fields 264, and tables of client options with client option text fields 264 associated therewith.

The exemplary named options with check boxes 266 are the Delete Site option, the Add to DNS option, and the Enable Dynamic DNS option. Each option can be executed by checking the box 266 adjacent to the desired option (using a mouse click or other selection mechanism to generate a check mark in the box 266) and by then selecting the "Save" virtual button 268 at the end of the Modify a Site menu 260.

Mouse-clicking the box 266 next to the Delete Site option (to create a check mark in that box) and then selecting the "Save" virtual button 268, for example, causes the selected location or site to be deleted from the Site menu 250 and causes any affected configuration files or databases to be modified accordingly by the preferred software.

Mouse-clicking the box 266 next to the Add to DNS option (to create a check mark in that box 266) and then selecting the "Save" virtual button 268 causes the selected site to be added to the DNS service provided by the DNS server. Similarly, mouse-clicking the box 266 next to the enable dynamic DNS option (to create a check mark in that box 266) and then selecting the "Save" virtual button 268 causes updating of dynamic DNS to be enabled in connection with the selected site. When dynamic DNS is enabled, the DHCP server program is configured to automatically update the DNS server when a new IP address assignment is made by the DHCP server program. This advantageously ensures that the DNS server program is automatically updated in accordance with addressing changes in the network.

Included in the exemplary options (with associated text fields 264 next to them) are the Site Name option, the Subnet option and the Netmask option. The Site Name option represents the name that appears in the Site menu for that particular site. Accordingly, the text field 264 next to the Site Name option in FIGS. 15–16 has the city name "Atlanta" typed into it. The fields 264 next to the Subnet option and Netmask option carry the IP addresses of the Atlanta subnet and of the Atlanta Netmask, respectively.

The table of DHCP Pool Start and DHCP Pool End addresses is used to specify the ranges of IP addresses that can be assigned by the DHCP server program to client computers at that site (e.g., Atlanta). In the example illustrated in FIG. 15–17, only one range is specified. The exemplary DHCP Pool Start address is "172.16.229.150" and the DHCP Pool End address is "172.16.229.250." The exemplary DHCP server program therefore can assign network addresses "172.16.229.150" through "172.16.229.250" to client computers at the Atlanta site. Other ranges can be specified by modifying or adding IP address entries to the relevant text boxes 264 in the DHCP Pool Start and DHCP Pool End address table, and by mouse-clicking the "Save" virtual button 268 at the bottom of the "Modify a Site" menu 250. When the "Save" virtual button 268 is mouse-clicked (or otherwise selected), the DHCP configuration file and/or its associated database are automatically modified by the preferred software to operate in a manner consistent with the new IP address ranges. This advantageously provides a convenient and user-friendly way of re-allocating addresses at the various sites of a network.

The two client option tables correspond to client time options and client address options. The client time options table is used to specify options such as default lease time (the duration of inactivity that it takes for an IP address assigned by the DHCP server to expire) and maximum lease time (for the few DHCP server programs that require one). The preferred software can insert the default client values shown in FIG. 17 for those options (e.g., 1500000 seconds and 1700000 seconds). A person who manages the network then can modify these values by typing other values into the client time options table and by mouse-clicking (or otherwise selecting) the "Save" virtual button 268 at the bottom of the "Modify a Site" menu 260. When the "Save" virtual button 268 is mouse-clicked, the preferred software automatically modifies the configuration file and database of the DHCP server program accordingly. The DHCP server program then operates in a manner consistent with the modified client time values.

The client address options table is used to specify IP addresses that are sent to the client computers on the named site (e.g., Atlanta). The exemplary IP addresses that can be specified are the IP addresses corresponding to a subnet mask, a primary DNS, a secondary DNS, a domain name, a primary wins, a secondary wins, and a default gateway. A person who manages the network can specify alternative IP addresses by typing other values into the client address options table and by mouse-clicking (or otherwise selecting) the "Save" virtual button 268 at the bottom of the "Modify a Site" menu 260. When the "Save" virtual button 268 is mouse-clicked, the preferred software automatically modifies the configuration file of the DHCP server program and its associated database accordingly. The DHCP server program then operates in a manner consistent with the modified IP addresses.

The preferred software and its associated "Modify a Site" menu 260 thus provide a convenient and user-friendly way of modifying a DHCP server configuration file and any other affected configuration files, databases, or logs, to accommodate desired changes in any option, client option (time option or address option), or DHCP addressing. Because the "Modify a Site" menu 260 is so intuitive and user-friendly, there is no need to have the desired changes implemented exclusively by people who are highly skilled in the art of writing configuration files from scratch.

Figure 18:
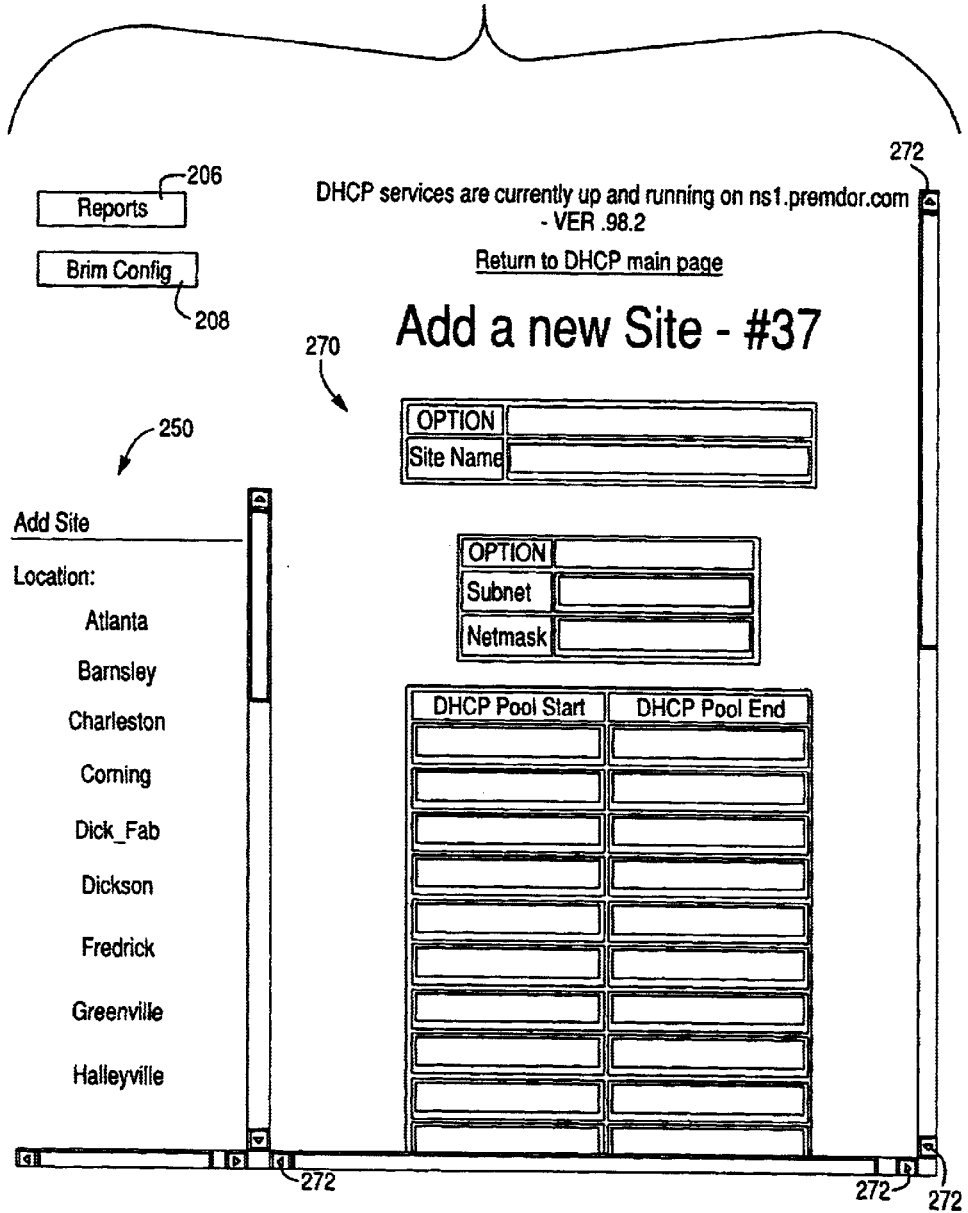
FIG. 18 illustrates an "Add a new Site" menu that can be generated, according to a preferred implementation of the present invention.

As indicated above, the other hypertext link in the Site menu 250 is the "Add Site" hypertext link 252. The "Add Site" hypertext link 252 facilitates the task of adding sites to the network. Selecting the "Add Site" hypertext link 252 causes the first field 202 to display an "Add a new Site" menu 270, as shown in FIG. 18. Scrolling of the "Add a new Site" menu 270 can be achieved by mouse-clicking on one of the scroll arrows 272. The complete "Add a new Site" menu 270 need not be shown, in as much as the rest of that menu 270 is substantially the same as the "Modify a Site" menu 260. The "Add a new Site" menu 270 preferably is identical to the "Modify a Site" menu 260 except that the "Add a new Site" menu 270 does not include the options table for deletion of a site, for addition of DNS, and/or for enabling dynamic DNS. Using techniques similar to those described above in connection with the "Modify a Site" menu 260, the "Add a new Site" menu 270 can be used to modify the DHCP configuration files and its associated database to accommodate a new network site (assuming other network sites already exist), or if this is the first site, to create a DHCP configuration file and its associated database. After the "Save" button at the bottom of the "Add a new Site" menu 270 is mouse-clicked (or otherwise selected), the site name entered in the site name text field is added automatically to the list of sites in the Site menu 250 and to the list of sites in the second field 204 of the main menu display 200. Because the "Add a new Site" menu 270 is so intuitive and user-friendly, there is no need to have the desired changes implemented exclusively by people who are highly skilled in the art of writing configuration files from scratch.

The other configuration-related function in the DHCP Configuration category is a "Bootp Menu" function 218 (shown in FIG. 1). "Bootp" is a well known network communication protocol. It is desirable in some instances to have certain devices, such as printers and routers, communicate on the network using the Bootp protocol. The "Bootp Menu" function 218 facilitates the task of configuring the network for compatibility with such "Bootp" communications.

Figure 19:
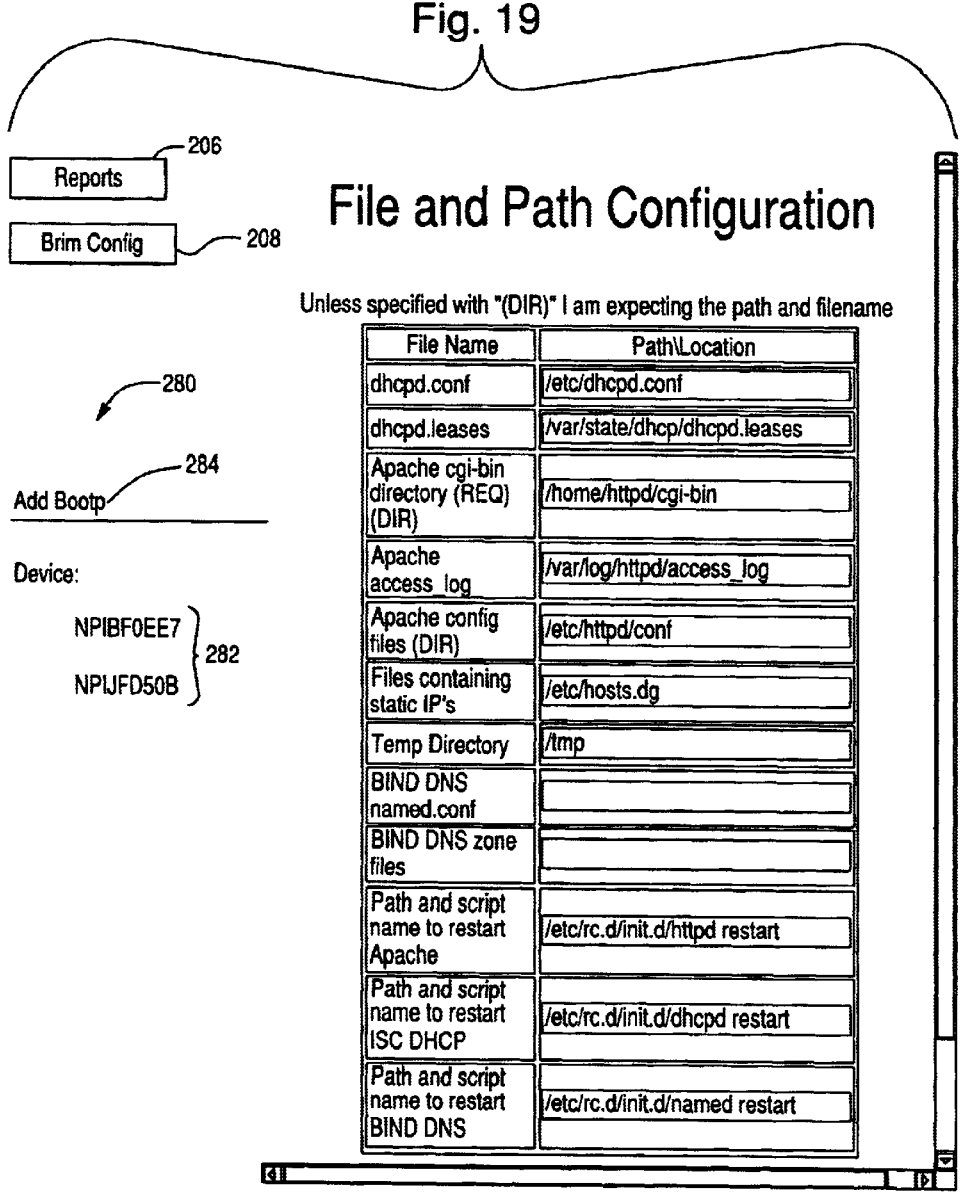
FIG. 19 illustrates a "Bootp" menu that can be generated, according to a preferred implementation of the present invention.

As indicated above, the "Bootp Menu" function 218 appears as a hypertext link in the "Brim Config" menu 210. Selecting the "Bootp Menu" hypertext link 218 (e.g., using a mouse-click or other selection mechanism) causes the second field 204 to display a "Bootp" menu 280, as shown in FIG. 19. The "Bootp" menu 280 includes a list 282 of device names in the form of hypertext links and an "Add Bootp" hypertext link 284. Each device name identifies a particular device operating under the Bootp protocol on the network (e.g., the LAN). The exemplary device names in FIG. 19 are "NPIBF0EE7" and "NPIJFD50B".

Figure 20:
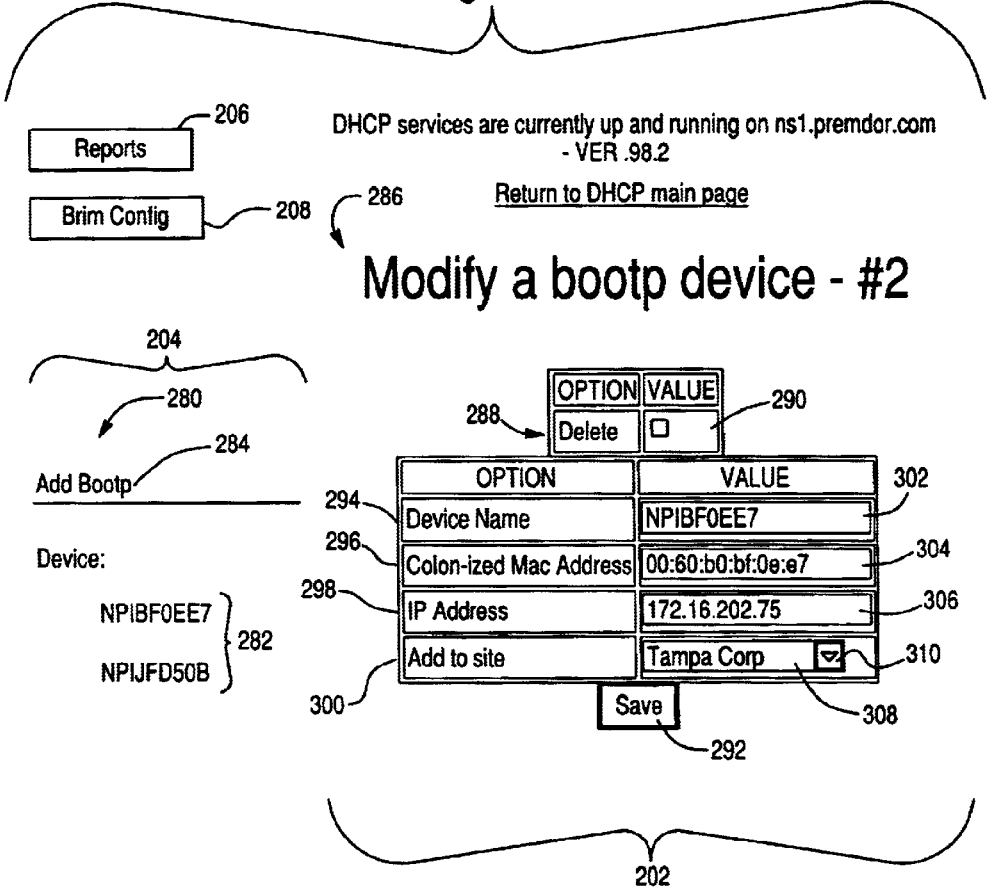
FIG. 20 illustrates a "Modify a bootp device" menu that can be generated, according to a preferred implementation of the present invention.

Each device name can be selected using a mouse-click or other selection mechanism, to cause a "Modify a bootp device" menu 286 to be displayed in the first field 202. FIG. 20 illustrates an exemplary "Modify a bootp device" menu 286 that is generated when the "NPIBF9EE7" device name is mouse-clicked or otherwise selected.

The exemplary "Modify a bootp device" menu 286 includes a delete option 288 with an associated checkable box 290 that can be mouse-clicked or otherwise selected to cause a check mark to appear in the box 290. Mouse-clicking the "Save" virtual button 292 on the bottom of the "Modify a bootp device" menu 286 while the check mark is present in the checkable box 290 causes the preferred software to delete the named device from the DHCP configuration file and its associated database. This provides a convenient and user-friendly way of eliminating devices operating under the Bootp protocol from the network, and modifying the configuration file accordingly.

The other options in the "Modify a bootp device" menu 286 are the device name 294, the colon-ized MAC address 296 of the device, the IP address 298 of the device on the network, and the site 300 where the device is located. Text boxes 302–308 appear next to each option. The device name, the colonized MAC address, the IP address and the site can be modified by typing the desired text into the text boxes 302–308. When the "Save" virtual button 292 is subsequently mouse-clicked (or otherwise selected), the preferred software automatically modifies the DHCP configuration file and any other affected configuration files, databases, or logs accordingly.

Preferably, as shown in FIG. 20, the text box 308 indicative of the site where the device is located includes a scroll arrow 310 that can be mouse-clicked to reveal a pop-up list of exemplary sites (e.g., the list of sites contained in the "Site" menu described above). Each exemplary site then can be mouse-clicked to indicate that the particular device operating under the bootp protocol is located at that site. When the "Save" virtual button 292 is subsequently mouse-clicked (or otherwise selected), the preferred software automatically modifies the DHCP configuration file and any other affected configuration files, databases, or logs accordingly.

Figure 21:
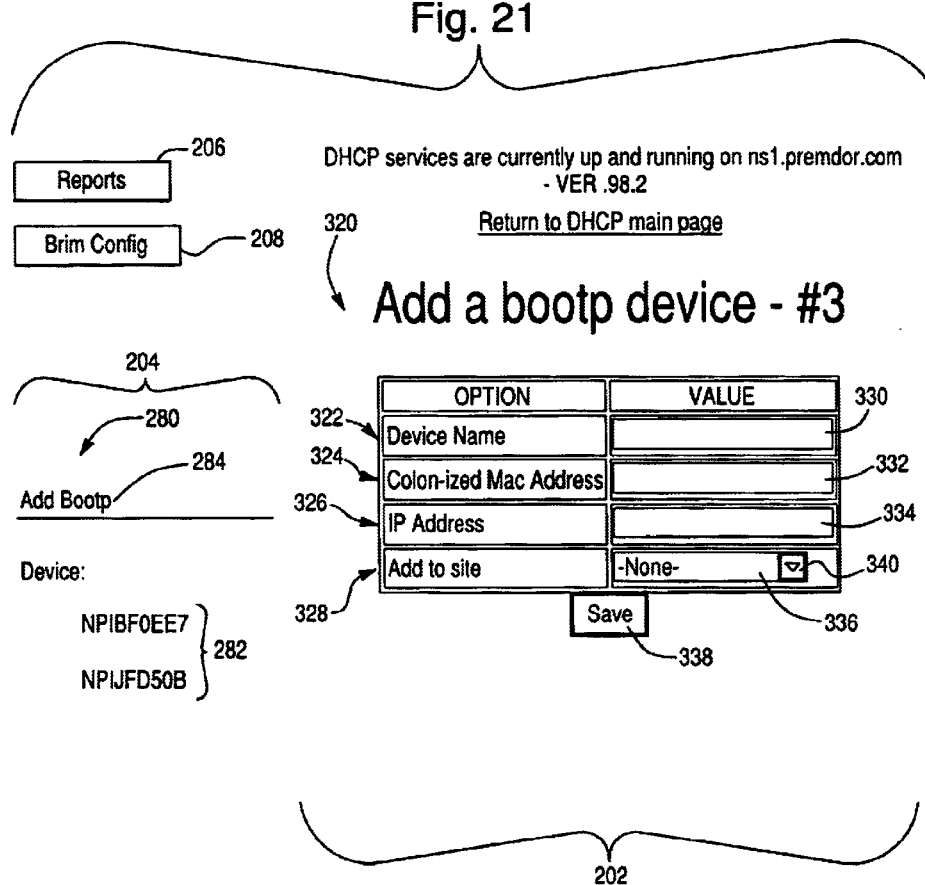
FIG. 21 illustrates an "Add a bootp device" menu that can be generated, according to a preferred implementation of the present invention.

Likewise, the "Add Bootp" hypertext link 284 can be selected from the "Bootp" menu 280 using a mouse-click or other selection mechanism, to cause an "Add a bootp device" menu 320 to be displayed in the first field 202. FIG. 21 illustrates an exemplary "Add a bootp device" menu 320 that is generated when the "Add Bootp" hypertext link 284 is mouse-clicked or otherwise selected.

The exemplary "Add a bootp device" menu 320 is very similar to the "Modify a bootp device" menu 286. The most significant difference is the absence of the delete option from the "Add a bootp device" menu 320.

The options in the "Add a bootp device" menu 320 are the device name 322, the colon-ized MAC address 324 of the device, the IP address 326 that will be assigned to the device on the network, and the site 328 where the device will be located. Text boxes 330–336 appear next to each option 322–328. The device name, the colon-ized MAC address, the IP address and the site can be entered by typing the desired text into the text boxes 330–336. When the "Save" virtual button 338 is subsequently mouse-clicked (or otherwise selected), the preferred software automatically modifies the DHCP configuration file and any other affected configuration files, databases, or log accordingly.

Figure 31:
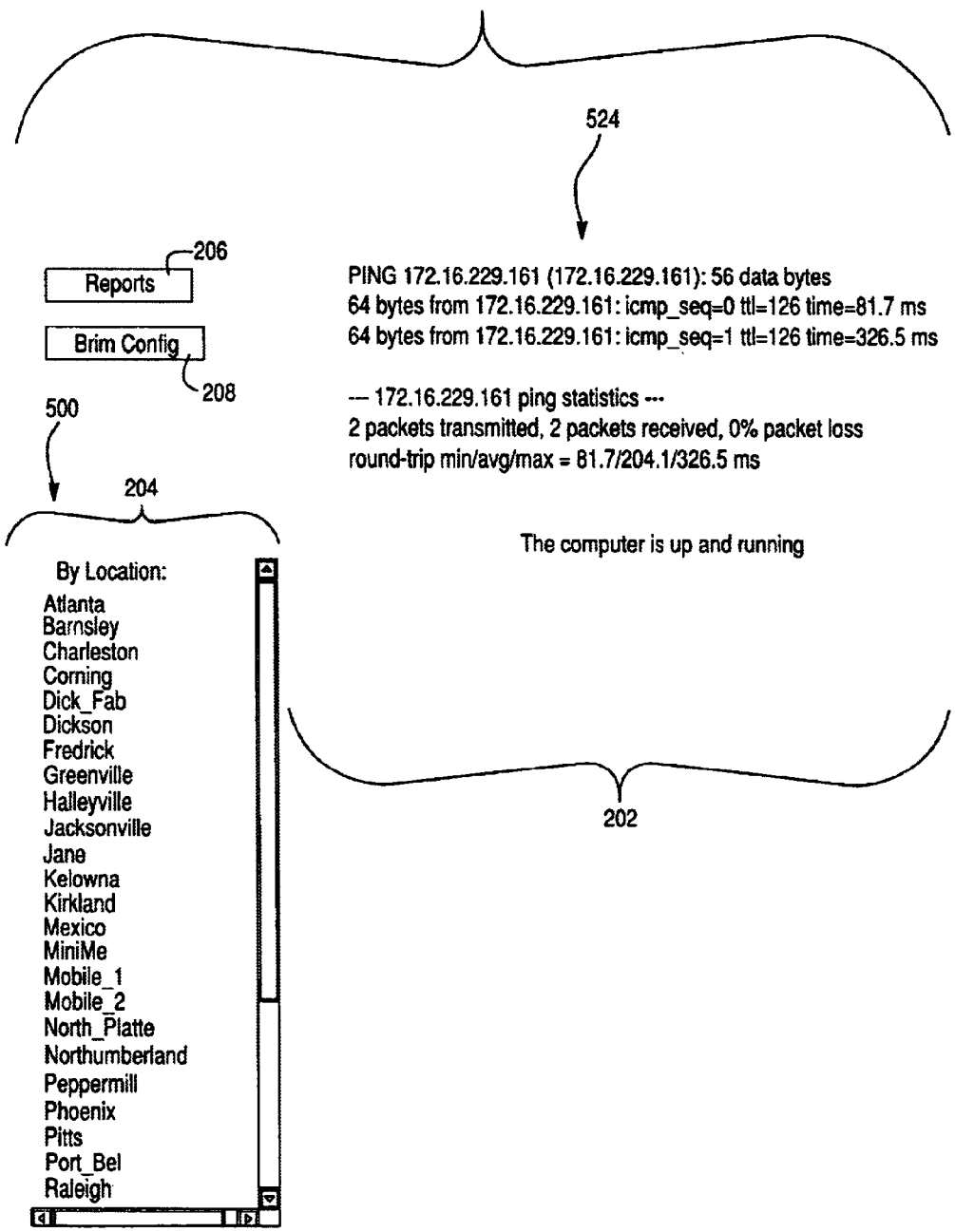
FIG. 31 illustrates a display that can be generated in response to a ping operation, according to a preferred implementation of the present invention.

Preferably, as shown in FIG. 31, the text box 336 indicative of the site where the device is located includes a scroll arrow 340 that can be mouse-clicked to reveal a pop-up list of exemplary sites (e.g., the list of sites contained in the "Site" menu). Each exemplary site then can be mouse-clicked to indicate that the particular device operating under the bootp protocol will be located at that site. When the "Save" virtual button 338 is subsequently mouse-clicked (or otherwise selected), the preferred software automatically modifies the DHCP configuration file and any other affected configuration files, databases, or log accordingly.

The "Bootp" menu 280 and its associated hypertext links therefore provide a convenient and user-friendly way of modifying DHCP configuration files and any other affected configuration files, databases, or logs, to accommodate changes to or additions of devices to the network when such device(s) operate according to the well known Bootp network communications protocol. The desired modifications advantageously are achieved without requiring someone who is highly skilled in the art of writing configuration files from scratch.

Figure 22:
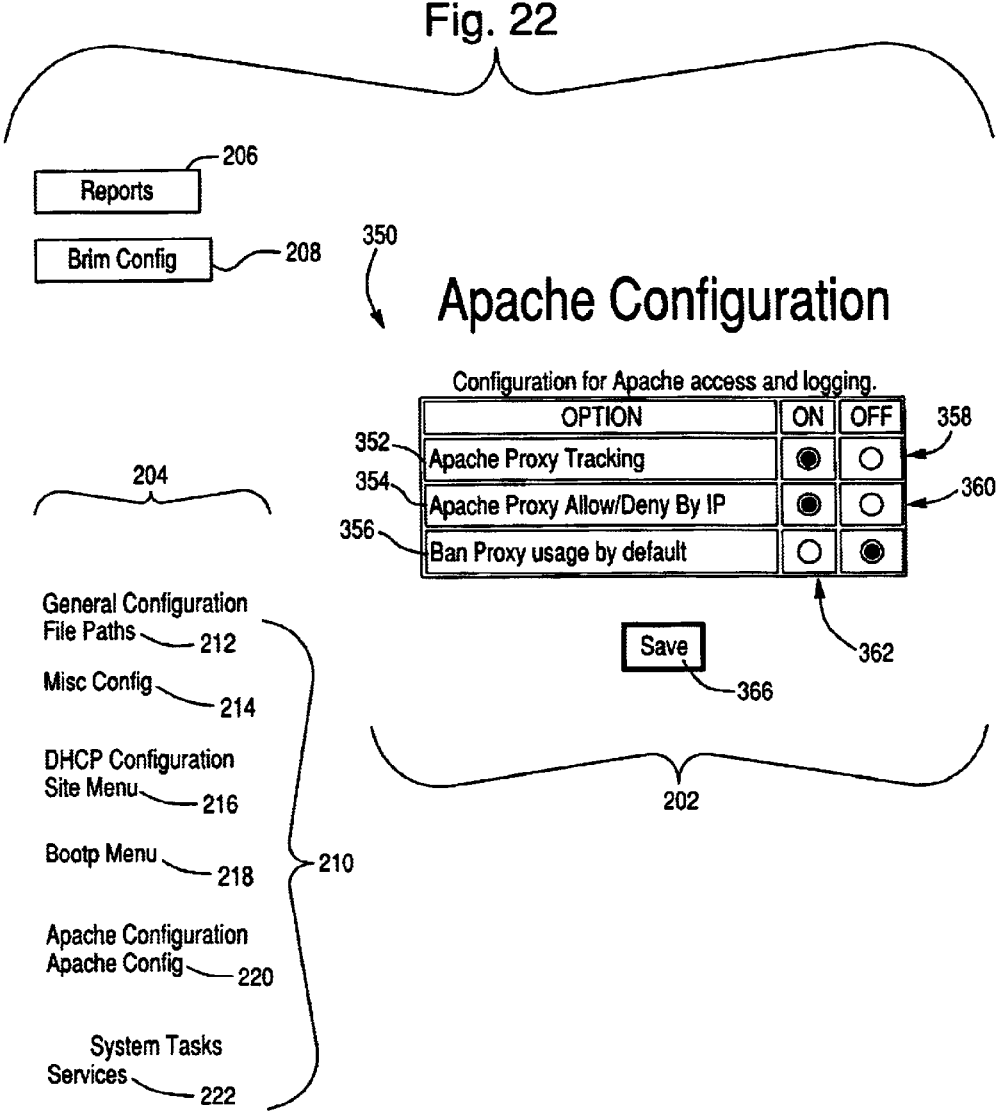
FIG. 22 illustrates an "Apache Configuration" menu that can be generated, according to a preferred implementation of the present invention.

The "Brim Config" menu 210 (shown in FIGS. 10, 11 and 13) also provides a submenu that facilitates implementation of certain functions that the preferred software can perform using the proxy server program (e.g., the exemplary Apache web/proxy server). In particular, the "Brim Config" menu 210 includes an "Apache Config" hypertext link 220. Selecting the "Apache Config" hypertext link 220 causes the first field 202 to display an "Apache Configuration" menu 350, as shown in FIG. 22. The "Apache Configuration" menu 350 includes a table of selectable proxy server-related functions 352–356 that the preferred software of the present invention can perform using the exemplary Apache web/proxy server program. These functions include proxy tracking 352, proxy allowance/denial 354 based on IP address, and default banning 356 of proxy service.

By mouse-clicking the ON or OFF virtual buttons 358 to generate a black mark on one of the virtual buttons 358 in the "Apache Proxy Tracking" line of the table, a person managing the network is able to selectively enable or disable, respectively, a proxy tracking function that can be carried out by the preferred software. When the proxy tracking function is ON, the preferred software maintains a user-viewable record (to be described hereinafter) of URL addresses accessed by a client computer and other proxy-related information.

Likewise, by mouse-clicking the ON or OFF virtual buttons 360 to generate a black mark on one of the virtual buttons 360 in the "Apache Allow/Deny By IP Address" line of the table, a person managing the network is able to selectively enable or disable, respectively, a proxy access control function that can be carried out by the preferred software. When this proxy access control function is ON, the preferred software selectively controls, as will be described hereinafter, which client computers (based on IP address) are able to access the internet or receive similar proxy-related services from the proxy server program.

The "Ban Proxy Usage by Default" line of the table in the Apache Configuration menu 350 is used to determine whether a denial (as opposed to allowance) is the default setting for any new client computer additions to the network. By mouse-clicking the ON virtual button 362 to generate a black mark on that virtual button 362 in the "Ban Proxy Usage by Default" line of the table, a person managing the network is able to selectively establish denials of access to the internet as the default setting for any new client computer added to the network. If allowance of access is a more desirable default setting, the OFF virtual button 362 can be mouse-clicked to generate a black mark on the OFF virtual button. The preferred software responds by setting the corresponding default condition.

Thus, the ON and OFF virtual buttons 358–362 in the "Apache Configuration" menu 350 can be used to selectively control how the preferred software implements certain proxy server-related functions 352–356. When the "Save" button 366 at the bottom of the "Apache Configuration" menu 350 is mouse-clicked (or otherwise selected), the preferred software of the present invention modifies the configuration file of the proxy server program accordingly. An exemplary configuration file of the proxy server (as modified to deny access to some IP addresses, as will be described hereinafter) is shown in Frames 3–8 of the attached Microfiche Appendix. It can be seen from the example in the Microfiche Appendix that this configuration file is rather complex. Since modifications performed using the preferred software of the present invention are achieved using the convenient and user-friendly graphic interface shown in FIG. 22, the present invention advantageously facilitates entry of such changes into the configuration file of the proxy server program by people who are not highly skilled in the art of writing proxy server configuration files from scratch.

Figure 23:
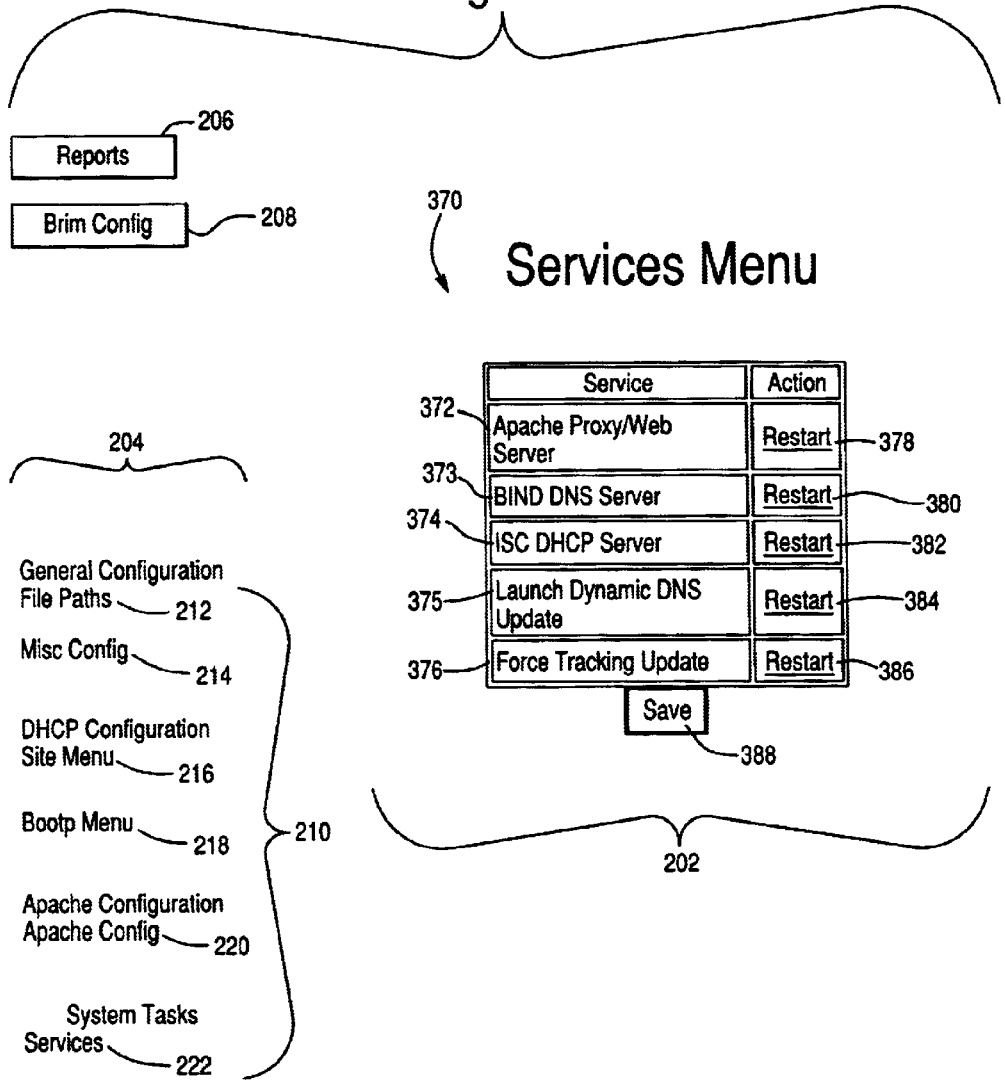
FIG. 23 illustrates a "Services" menu that can be generated, according to a preferred implementation of the present invention.

The "Brim Config" menu 210 also provides a submenu that facilitates implementation of certain system tasks that the preferred software can perform. In particular, the "Brim Config" menu 210 includes a "Services" hypertext link 222. Selecting the "Services" hypertext link 222 causes the first field 202 to display a "Services" menu 370, as shown in FIG. 23. The "Services" menu 370 includes a table of selectable system tasks 372–376 that the preferred software of the present invention can perform, and a "Restart" icon 378–386 for each system task 372–376 in the table. These system tasks 372–376 include restarting of the web/proxy server program, restarting of the DNS server program, restarting of the DHCP server program, launching of a dynamic DNS update, and forcing a tracking update.

By mouse-clicking the "Restart" icon 378 to change its appearance in the "Apache Proxy/Web Server" line of the table and then mouse-clicking (or otherwise selecting) the "Save" button 388 at the bottom of the "Services" menu 370, a person managing the network is able to selectively restart the proxy server program using the preferred software of the present invention.

By mouse-clicking the "Restart" icon 380 to change its appearance in the "BIND DNS Server" line of the table and then mouse-clicking (or otherwise selecting) the "Save" button 388 at the bottom of the "Services" menu 370, a person managing the network is able to selectively restart the DNS server program using the preferred software of the present invention.

Similarly, by mouse-clicking the "Restart" icon 382 to change its appearance in the "ISC DHCP Server" line of the table and then mouse-clicking (or otherwise selecting) the "Save" button 388 at the bottom of the "Services" menu 370, a person managing the network is able to selectively restart the DHCP server program using the preferred software.

With regard to updating the DNS server program, a person managing the network is able to update the DNS server program with the names of the client computers associated with each IP address, by mouse-clicking the "Restart" icon 384 to change its appearance in the "Launch Dynamic DNS Update" line of the table and then mouse-clicking (or otherwise selecting) the "Save" button 388 at the bottom of the "Services" menu 370. The preferred software then causes the update to occur by sending the IP address and name of each associated client computer to the DNS server program. This is much more convenient than having to manually update the DNS server program with the changing IP address assignments, as might otherwise be required. The efficiencies provided by such updating of the DNS server program become very significant when the network is used by an organization with many people traveling (e.g., sales people) and connecting remotely to the network. Under those circumstances, the network manager might have to manually update the DNS server program 30 to 40 times per day.

Similarly, by mouse-clicking the "Restart" icon 386 to change its appearance in the "Force Tracking Update" line of the table and then mouse-clicking (or otherwise selecting) the "Save" button 388 at the bottom of the "Services" menu 370, a person managing the network is able to selectively force an update of the proxy tracking function carried out by the preferred software in conjunction with the proxy server program. The proxy tracking function will be described hereinafter.

Thus, the "Restart" icons 378–386 in the "Services" menu 370 can be used to selectively indicate which system tasks are to be performed using the preferred software of the present invention. When the "Save" button 388 at the bottom of the "Services" menu 370 is then mouse-clicked (or otherwise selected), the preferred software of the present invention causes the indicated system tasks to be performed. Since these systems tasks are achieved using the convenient and user-friendly graphic interface shown in FIG. 23, the present invention advantageously facilitates implementation of such system tasks 372–376 by people who are not highly skilled in the art of network management.

The preferred software, by presenting the foregoing functions and/or menus when the "Brim Config" virtual button 208 is mouse-clicked, provides a convenient and user-friendly way of integrating a DHCP server program, a proxy server program, and a dynamic DNS server program in a seamless manner. In doing so, the preferred software provides a way for people that are not highly skilled in the art of network management to create the requisite configuration files and logs for the various server programs.

Figure 24:
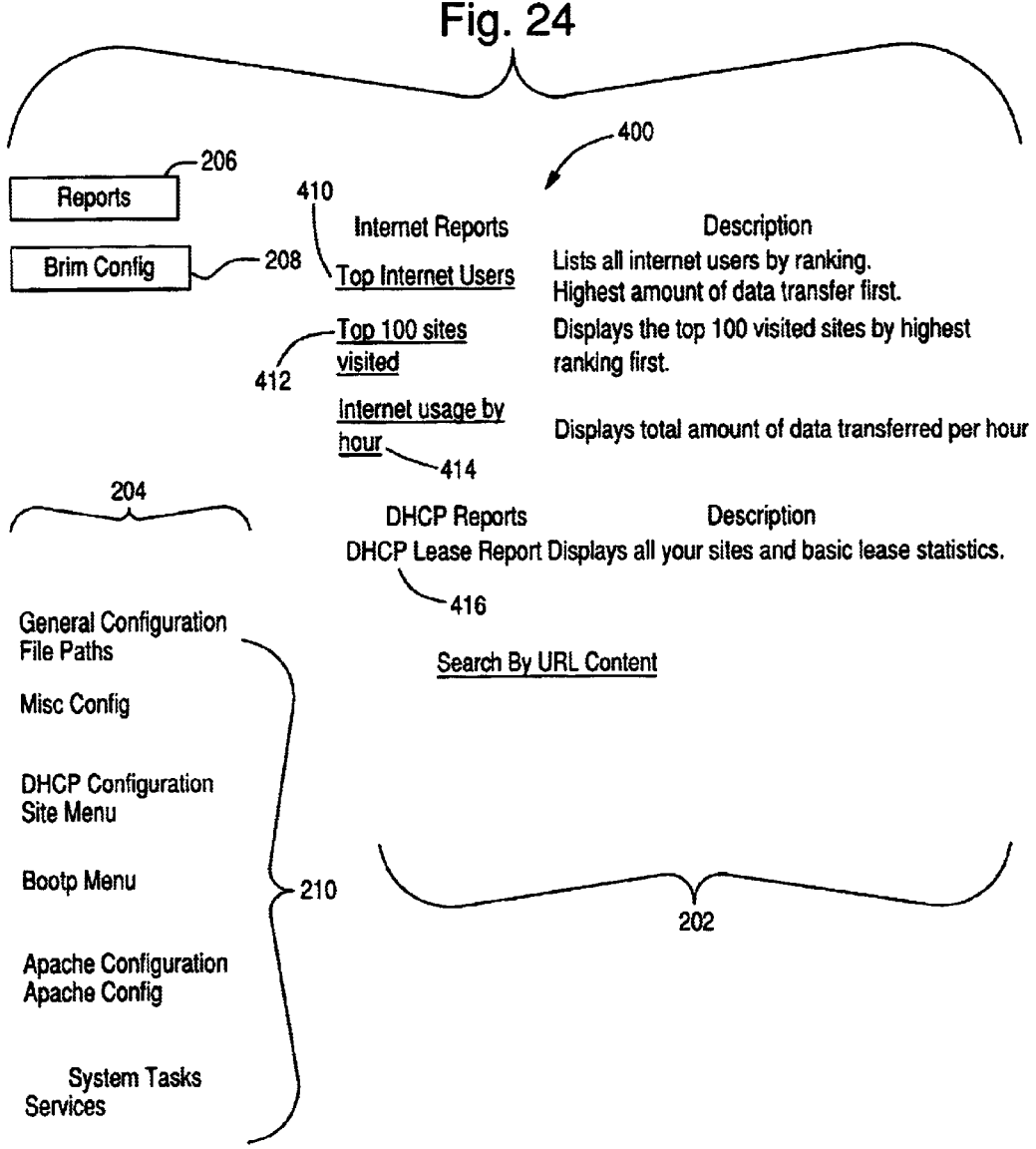
FIG. 24 illustrates a "Reports" menu that can be generated, according to a preferred implementation of the present invention.

The "Reports" virtual button 206 in the main menu display 200 provides yet another useful resource for network managers. When the "Reports" virtual button 206 is mouse-clicked (or otherwise selected), the preferred software causes a "Reports" menu 400 to be displayed in the first field 202, as shown in FIG. 24.

The "Reports" menu 400 includes a list of reports that can be generated by the preferred software. There are two exemplary types of reports, namely, internet reports and DHCP reports. The internet type of reports include, for example, a Top Internet Users report, a Top 100 Sites Visited report, and an Internet Usage by Hour report. An exemplary DHCP type of report is a DHCP Lease report. Each report is represented in the "Reports" menu by a title 410–416 in hypertext link form and by a description of the report's content.

Mouse-clicking (or otherwise selecting) the "Top Internet Users" hypertext link 410, for example, causes a list of all internet users to be generated in the first field 202 by the preferred software. Preferably, as demonstrated by the first 19 entries of an exemplary report shown in FIG. 25, the list is provided in table form with a first column indicating the rank of that user or client computer, the second column indicating the user's IP address, and the third column indicating the number of bytes of data transferred by that user or client computer. The rank can be determined based on the number of bytes of data transferred from the internet for that user, from highest to lowest. The Top Internet Users report therefore provides a convenient way of determining who on the network is using the internet the most.

Figure 26:
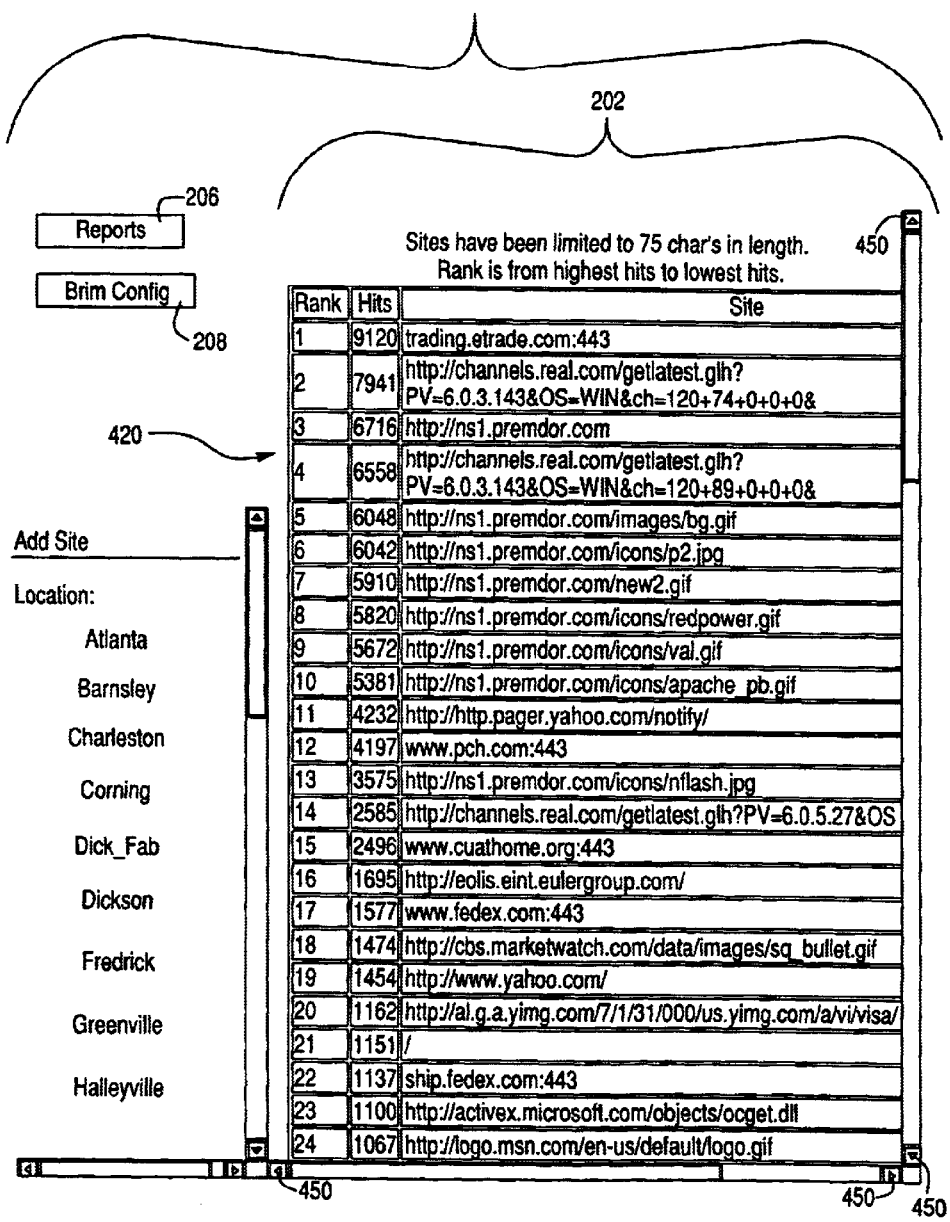
FIG. 26 illustrates a "Top 100 sites visited" report that can be generated, according to a preferred implementation of the present invention.

Mouse-clicking (or otherwise selecting) the "Top 100 Sites Visited" hypertext link 412, by contrast, causes a 420 list of the 100 most-visited internet sites to be generated in the first field 202 of the main menu display 200 by the preferred software. As shown in FIG. 26, the list preferably is provided in table form, with the first column indicating the rank of the internet site, the second column indicating the number of hits associated with that internet site, and the third column indicating the URL (e.g., www.yahoo.com, or http://ns1.premdor.com/, or the like) of that internet site. The rank can be determined based on the number of hits for that internet site. As described above, this information can be compiled by the preferred software using information contained in the proxy logs of the proxy server program. The "Top 100 Sites Visited" report thus provides a convenient way of determining what internet sites are being visited the most through the proxy server program.

Figure 27:
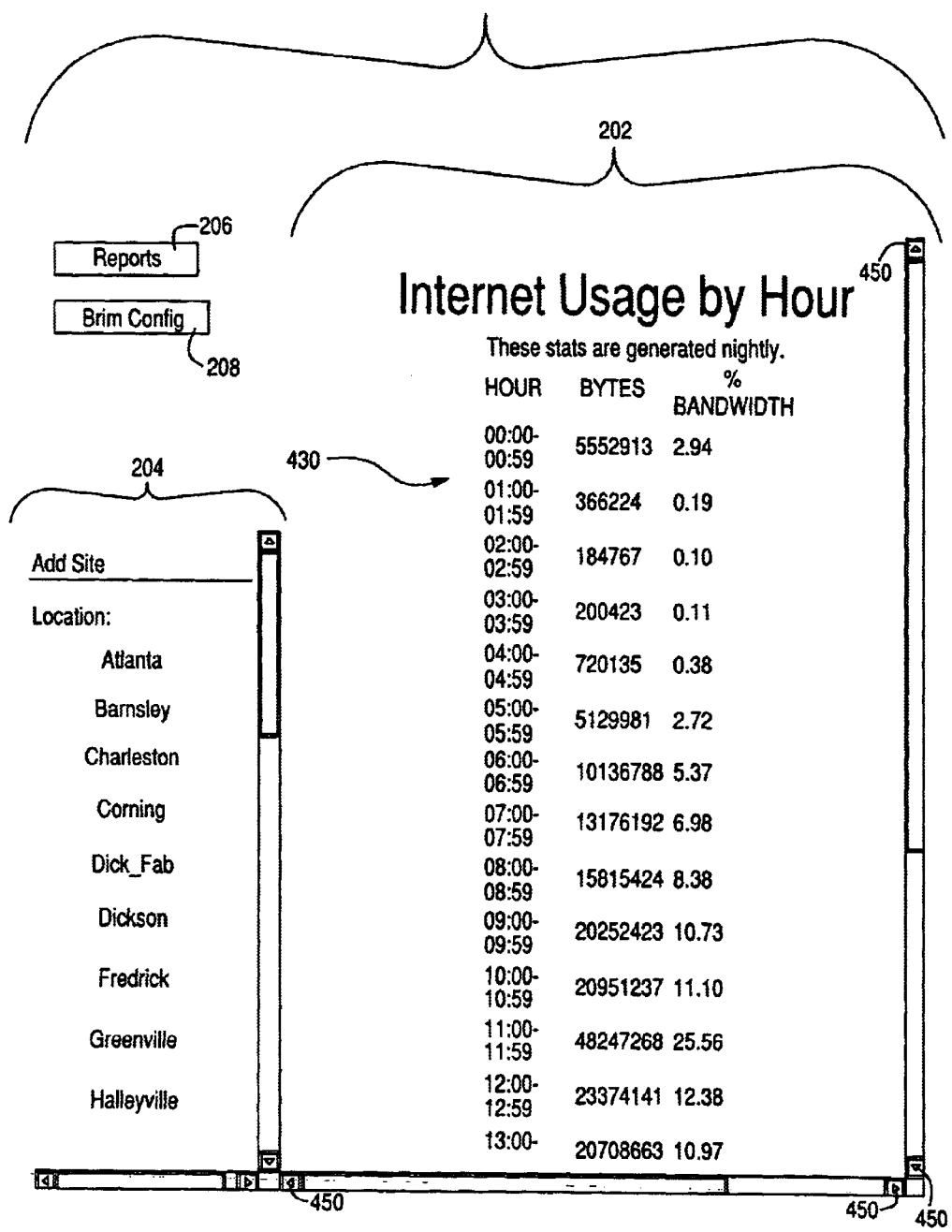
FIG. 27 illustrates an "Internet Usage by Hour" report that can be generated, according to a preferred implementation of the present invention.

Mouse-clicking (or otherwise selecting) the "Internet Usage by Hour" hypertext link 414, by contrast, causes a display 430 of internet usage by hour to be generated in the first field 202 of the main menu display 200 by the preferred software. As shown in FIG. 27, the list preferably is provided in table form, with the first column indicating an hour of the day in military time (e.g., 00:00 to 00:59, 01:00 to 01:59, 02:00 to 02:59 . . . 23:00 to 23:59), the second column indicating the number of bytes of data transferred from the internet during that hour, and the third column indicating the percentage of the internet connection's bandwidth that was used during that hour. This information can be compiled by the preferred software using information contained in the proxy logs of the proxy server program. The "Internet Usage by Hour" report thus provides a convenient way of determining how much of the available internet connections's bandwidth is being used during each hour of the day.

Figure 28:
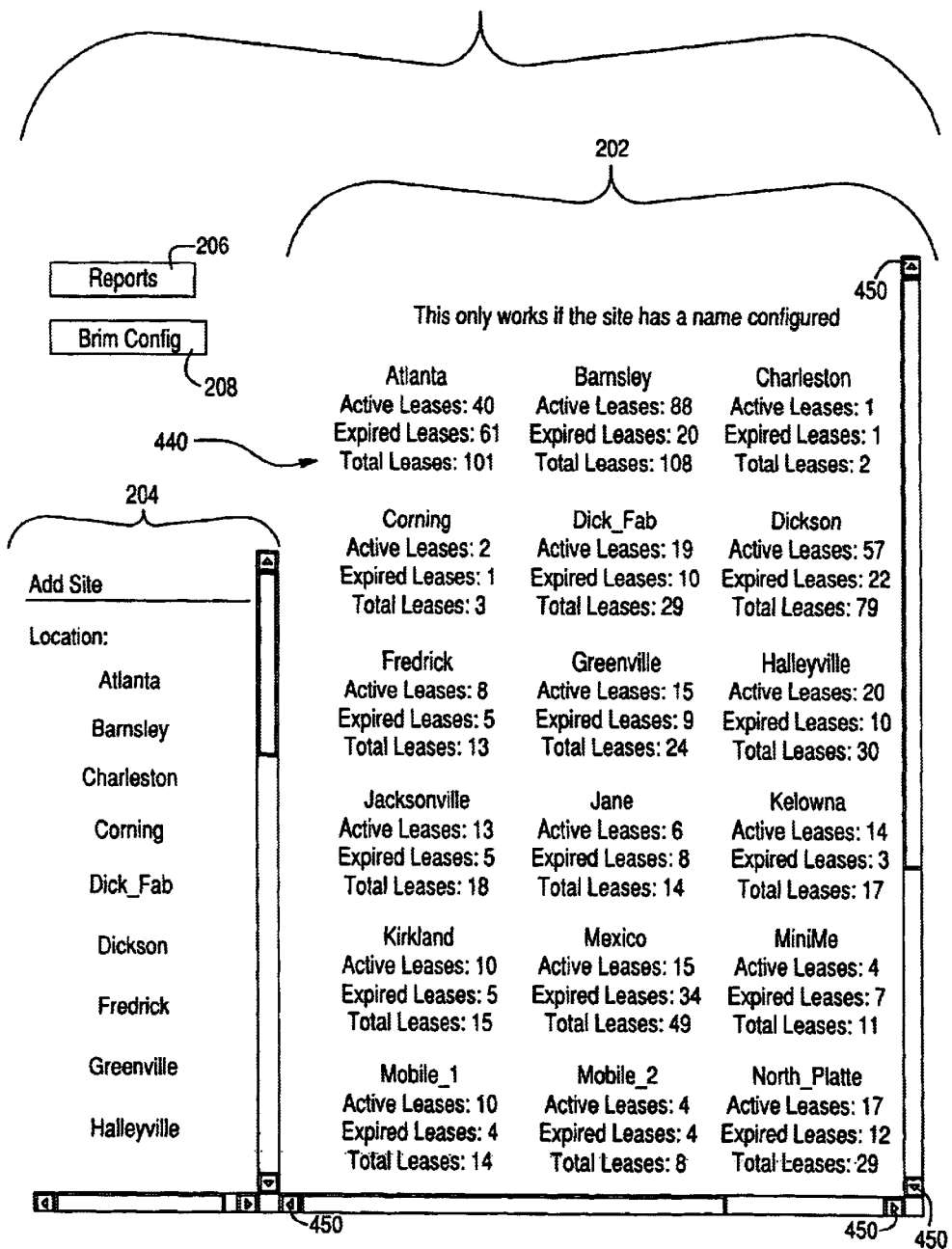
FIG. 28 illustrates a "DHCP Lease" report that can be generated, according to a preferred implementation of the present invention.

With regard to the DHCP Lease report, this report can be accessed by mouse-clicking (or otherwise selecting) the "DHCP Lease Report" hypertext link 416. When the "DHCP Lease Report" hypertext link 416 is mouse-clicked (or otherwise selected), the preferred software causes a report 440 to be generated in the first field 202 of the main menu display 200. As shown in FIG. 28, this report 440 includes a heading for each location or site on the network. Each heading preferably includes the name of the respective location or site (e.g., Atlanta, Barneselly, Charleston, and the like). Under each such heading are rows of DHCP lease information pertaining to that location or site. Preferably, these rows include a first row labeled "Active Leases:" and followed by the number of active leases (or IP addresses) that have been assigned by the DHCP server program at that location or site, a second row labeled "Expired Leases:" followed by the number of leases (or IP addresses) that had been assigned by the DHCP server program at that location or site and that subsequently expired, and a third row labeled "Total Leases:" followed by the total of the numbers in the first and second rows. This information can be compiled by the preferred software using information contained in the log files of the DHCP server program. The DHCP Lease report 440 thus provides a convenient way of determining how many active and expired leases (or IP addresses) are associated with each location or site.

If any of the foregoing reports occupies more space than the first field of the main menu display 200 can hold, then the preferred software can insert suitable scroll arrows 450 on one or more edges of the first field 202. Mouse-clicking on the scroll arrows 450 then causes the first field 202 to scroll through the report and/or horizontally shift the report. Alternative scrolling techniques, of course, can be used.

The preferred software also can generate a "Search by URL Content" hypertext link 460 in the "Reports" menu 400, as shown in FIG. 24. When that hypertext link 460 is mouse-clicked (or otherwise selected), the preferred software causes a "Search by URL Content" display to be generated in the first field 202 of the main menu display 200. In particular, the "Search by URL Content" display generated by the preferred software includes the following:

Enter search string:

When the text box after the colon in the above display is mouse-clicked or otherwise selected, a string of text can be typed into the text box. Striking of the return key (or enter key) of the computer where the browser is running, then causes the preferred software to search through the log files of the proxy server program for occurrences of the typed text string in URL addresses. The preferred software then causes a display to be generated of all matching internet URL addresses that have been accessed via the proxy server program that contain that particular text string. The preferred software includes in the display an indication of which IP address(es) was (were) used to access each matching URL addresses.

Each matching internet URL address is displayed by the preferred software using a hypertext link. Mouse-clicking (or otherwise selecting) one of the hypertext links causes the proxy server program to automatically gain access to the web site identified by the subject URL address. In this manner, a network manager can readily search the various URL addresses that were accessed via the proxy server program for a text string of interest, and can conveniently and quickly review the web-sites that were accessed using the matching URL addresses.

In addition to the functions and menus that are provided by mouse-clicking (or otherwise selecting) the "Reports" and "Brim Config" virtual buttons 206,208, the preferred software of the present invention, as indicated above, also provides a list 500 of subnetworks (e.g., the locations or sites in the network or WAN) in the second scrollable field 204 of the main menu display 200. This is perhaps best illustrated in the aforementioned FIG. 9.

Each site designation 510 in the second field 204 preferably is a hypertext link. Each site designation 510, therefore, can be selected (e.g., using a "mouse click" or other selection mechanism) to open a display of information associated with that site. Preferably, the information associated with that site appears in the first field 202.

Figure 29:
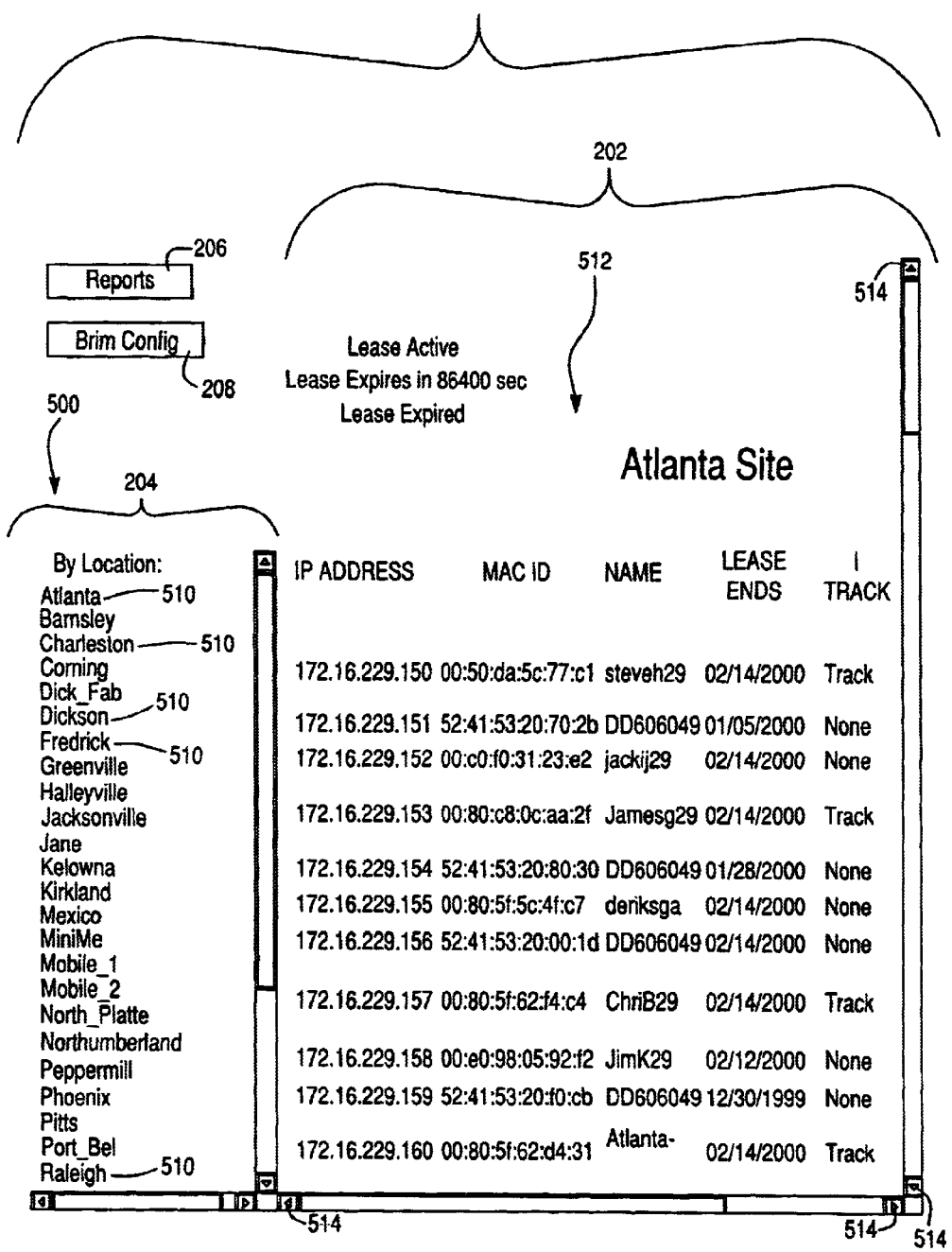
FIG. 29 illustrates an exemplary display that can be generated for a site (labeled Atlanta), according to a preferred implementation of the present invention.

FIG. 29 illustrates an exemplary display arrangement 512 that appears when the hypertext link 510 corresponding to the "Atlanta" site is mouse-clicked (or otherwise selected). This exemplary display was generated on Jan. 28, 2000. Mouse-clicking on the hypertext links 510 for the other sites causes similar informational displays to be generated.

The information displayed includes information about IP addresses assigned at that site. If this information does not fit conveniently within the dimensions of the first field 202, it can be provided with scroll arrows 514 that, in turn, can be mouse-clicked, or otherwise selected, to scroll through the information (vertically or horizontally).

Figure 30:
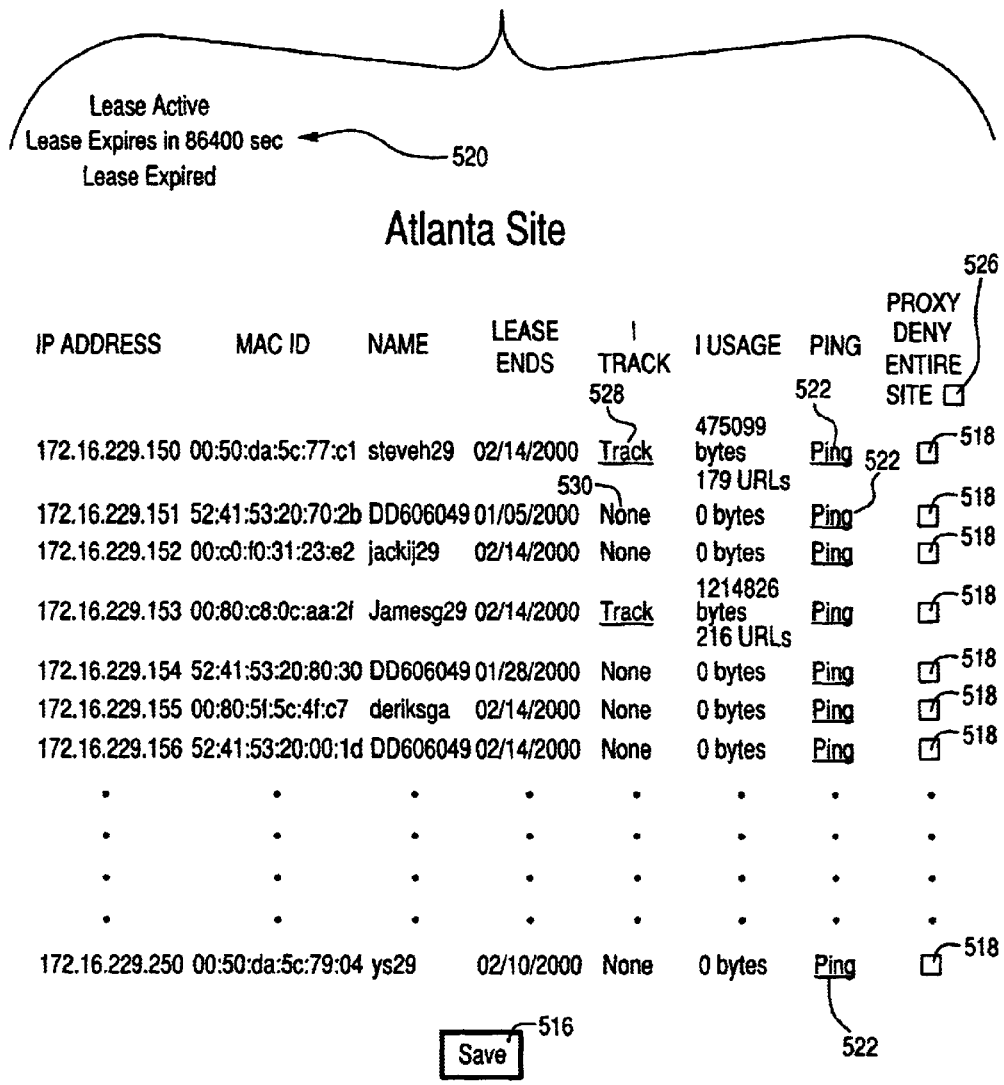
FIG. 30 is a widthwise more complete view of the display shown in FIG. 29 for the Atlanta site, according to a preferred implementation of the present invention.

FIG. 30 illustrates a width-wise more complete view of the information for the Atlanta site. Preferably, the information is provided in table form. It includes columns and rows. In FIG. 30, several rows have been eliminated from the drawing to enable that drawing to fit onto one sheet. At the bottom of the information, a "Save" virtual button 516 can be provided. Each table preferably has eight columns and a number of rows corresponding to the number of IP addresses at that site being managed by the DHCP server program. Each column has a heading. The exemplary headings provided by the preferred software of the present invention are "IP ADDRESS", "MAC ID", "NAME", "LEASE ENDS", "I TRACK", "I USAGE", "PING", AND "PROXY DENY".

Below each heading are rows of information about the IP addresses assigned by the DHCP server program. The first row, for example, provides information about IP address No. "172.16.229.150." That particular IP address has been assigned by the DHCP server program to a device having a machine ID (i.e., a MAC ID) of "00:50:da:5c:77:cl" (as determined by the MAC ID associated with the network card in that device). The device may be used by a network user identified as "steveh29". The name "steveh29" is provided by the user name that is entered by a Windows operating system on that device. The assignment of that IP address by the DHCP server is scheduled to expire on Feb. 14, 2000 if it is not used by the device at that IP address before that date. All of this information can be gleaned conveniently and easily from the displayed table of information.

Notably, none of the checkable boxes 518 in the "PROXY DENY" column contains a check mark. This indicates that access to the internet is not being denied to any of the devices at the IP addresses shown in FIG. 30. If internet access is to be denied to one or more of the IP addresses on this site, the checkable box(es) 518 in the "PROXY DENY" column can be mouse-clicked (or otherwise selected) to generate a check mark in the corresponding boxes 518. Each row associated with an IP address that is to be denied internet access therefore will have a check mark in its "PROXY DENY" column. If the "Save" virtual button 516 is then mouse-clicked (or otherwise selected) while a check mark appears in one or more of the rows' checkable box(es) 518, the IP addresses associated with those rows will be denied access to the internet through the proxy server program. The preferred software is able to accomplish this by inserting a deny command (as shown in Frames 5–8 of the Microfiche Appendix) for each affected IP address into the configuration file of the exemplary Apache proxy/web server program. In this manner, a person who is not highly skilled in the art of writing or modifying configuration files can conveniently and selectively deny internet access to IP addresses at this site.

Preferably, each line of the foregoing table is displayed in a particular color. Blue, for example, can be used to designate rows containing IP addresses that are active and/or that will not expire within the next day. Orange can be used to designate rows containing IP addresses that will expire within twenty-four hours. Red can be used to designate rows containing IP addresses that have already expired. This provides a convenient way of determining, at a quick glance, which assignments (or leases) of IP addresses by the DHCP server are active, about to expire, or expired.

Preferably, a color key 520 is provided at the top of each site's IP address information display. In FIG. 30, for example, the color key 520 can include the expressions "Lease Active" in a blue text field, "Lease Expires in 86400 sec" in an orange text field, and "Lease Expired" in a red text field.

Each row also contains a "Ping" icon 522. The "Ping" icon 522 can be mouse-clicked or otherwise selected to effect a pinging operation. Pinging is known in the art as a diagnostic technique for determining whether a device is ON and connected to a network. The pinging operation is performed by requesting a response from the device, via the network. If a response is received from that device, it is determined that the device is ON and that it is connected to the network. Thus, mouse-clicking on the "Ping" icon 522 in the first row of FIG. 30, for example, causes a request for a response to be sent to the device located at IP address No. "172.16.229.150". If a response is received, then a display 524 can be generated, as shown in FIG. 31, to indicate that the "pinged" device is ON and that it is connected to the network, and/or to also indicate how long it took for a response to be received (e.g., in seconds) from that device.

Preferably, as shown in FIG. 30, there is a checkable box 526 immediately below the "PROXY DENY" heading and labeled "ENTIRE SITE". This checkable box 526 can be mouse-clicked (or otherwise selected) to generate a check mark in the box. If the "Save" virtual button 516 is mouse-clicked (or otherwise selected) while a check mark appears in this checkable box 516, then all of the IP addresses at this particular site will be unable to access the internet through the proxy server program. The preferred software is able to accomplish this by inserting a deny command for each IP address in this site into the configuration file of the exemplary Apache proxy/web server program. In this manner, a person who is not highly skilled in the art of writing configuration files can conveniently deny internet access to all of the IP addresses in that site.

Notably, the word "Track" 528 appears in the "I TRACK" column. This indicates that the internet has been accessed by the device at IP address No. "172.16.229.150" and that such usage has been tracked as will be described herein. According to the "I USAGE" column, the device associated with the IP address in the first row has accessed 4,705.099 bytes of data from the internet and has recorded hits on 179 URLs.

In the second row, by contrast, the word "None" 530 appears in the "I TRACK" column. The device at IP address No. "172.16.229.151" therefore has not accessed the internet via the proxy server program. This is further evident from the "0 bytes" indication in the "I USAGE" column of the same row. The preferred software gathers this tracking information by suitably accessing the log files of the proxy server program.

Figure 32:
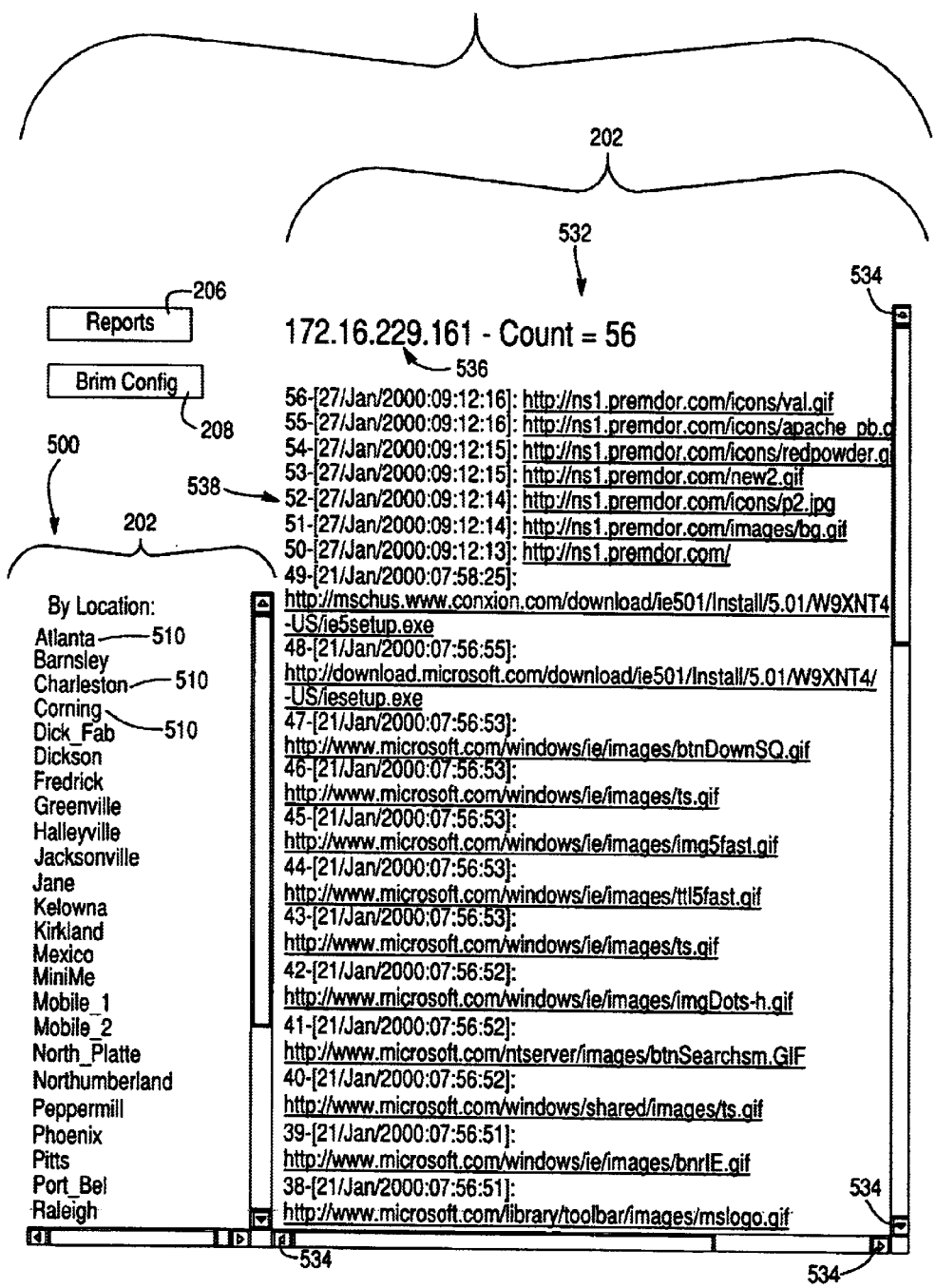
FIG. 32 illustrates an exemplary URL display for an IP address No. "172.16.229.161", according to a preferred implementation of the present invention.

As shown in FIGS. 29 and 30, the word "Track" can be provided by the preferred software in the form of a hypertext link 528. When the "Track" hypertext link 528 in a particular row is mouse-clicked (or otherwise selected), the preferred software causes a URL display 532 to be generated in the first field 202. An exemplary URL display 532 for IP address No. "172.16.229.161" is shown in FIG. 32.

If the URL display 532 occupies more space than the first field 202 of the main menu display 200 can hold, then the preferred software can insert suitable scroll arrows 534 on one or more edges of the first field 202. Mouse-clicking on the scroll arrows 534 then causes the first field 202 to scroll through the display 532 and/or horizontally shift the display 532. Alternative scrolling techniques, of course, can be used.

The URL display 532 preferably includes a heading 536 with the IP address and a count of the number of URL hits that were recorded for that particular IP address (56 in the exemplary URL display), as well as a list 538 of internet URLs that were accessed via that IP address. The URLs preferably are listed in order of access, starting from the most recently accessed URL. A date and time of access preferably are provided adjacent to each URL in the URL display. The preferred software of the present invention gathers this URL-related information by suitably accessing log files of the proxy server program.

Some devices at a subnetwork (i.e., a location or site), however, may not require internet access and may have static IP addresses. Examples of such devices are dedicated servers and routers in the network. Therefore, as shown in FIG. 33, the information displayed for a particular site (e.g., Tampa) may also include information 539 about static IP addresses. Preferably, as shown in FIG. 33, this static IP address information 539 appears after the "Save" button 540 (similar to button 516 in FIG. 30).

Likewise, some devices may be operating under the Bootp protocol, as indicated above. A network printer is one example of such devices. Therefore, as shown in FIG. 33, the information displayed for a particular site (e.g. Tampa) may also include information 542 about the IP addresses assigned to Bootp device at that site.

The preferred software also facilitates searching of e-mail archives for text strings in the author fields of e-mail messages, in the recipient fields of the e-mail messages, and in the bodies of the e-mail messages. To access this capability of the preferred software, the following is typed into the address field in the web browser:

http://__/bb2000.pl

When typing the foregoing address into the address field, the network name of the host computer is inserted in the above blank space. An exemplary network name is "ns1.premdor.com". Thus, activation of the e-mail searching capabilities of the preferred software in a host computer (e.g., a network server) with the network name of "ns1.premdor.com" would include typing the following address into the address field of the web browser:

http://ns1.premdor.com/bb2000.pl

The preferred software responds to such activation by causing an e-mail search display 550 to be generated on the screen of the computer where the web browser was accessed. In the exemplary e-mail searching display shown in FIG. 34, the e-mail searching display 550 is entitled "Big Brother 2000". It includes a "Search type" field, a "Search params" field, and a "Search info" field.

The "Search info" field includes a text box 552 where a string of text can be entered whenever e-mail messages are to be searched for that string. The string of text can be entered by mouse-clicking (or otherwise selecting) the text box 552 and typing the text string into the text box 552.

The "Search params" field includes a similar text box 554. The word "Stuff" appears in the text box 554 of the "Search params" field as a default setting. When the search is submitted to the preferred software by mouse-clicking (or otherwise selecting) the "Submit" virtual button 556, while the "Stuff" default setting remains in the text box 554 associated with the "Search params" field, the preferred software responds by searching all e-mail archives for the string of text specified in the "Search info" field, without any limits on time. Alternative parameters can be selected to limit the search by mouse-clicking (or otherwise selecting) a scroll arrow 558 adjacent to this text box 554 to generate a pop-up menu of alternative parameters and then selecting one or more of the alternative parameters. Alternative parameters can include date ranges, for example.

The "Search type" field also has a text box 560 and scroll arrow 562. The word "Author" appears as the default setting in the text box 560 of the "Search type" field. When the search is submitted to the preferred software by mouse-clicking (or otherwise selecting) the "Submit" virtual button 556, while word "Author" default setting remains in the text box 560 associated with the "Search params" field, the preferred software responds by searching the author field of all e-mail archives for the string of text specified in the "Search info" field. Alternative search types can be selected by mouse-clicking (or otherwise selecting) a scroll arrow 562 adjacent to the text box 560 of the "Search type" field. This causes a pop-up menu of alternative search types to be displayed. Alternative search types include searches through the recipient fields of all e-mail messages (designated in the pop-up menu by the word "Receiver") and searches through the entire contents of all e-mail messages (designated by the word "Contents".

After a desired "Search type" is specified, along with desired search parameters and a desired text string, the "Submit" virtual button 556 can be mouse-clicked (or otherwise selected) to complete the search. The preferred software responds by searching the e-mail archives of the e-mail server for the desired string of text, through the specified fields (author, recipient, or entire contents) of the e-mail messages, and in accordance with the specified search parameters (e.g., temporal limits). When the e-mail search is completed the results (i.e., excerpts from the matching e-mail messages) are displayed below the "Search type", "Search params", and "Search info" fields, as shown in FIG.

Figure 35:
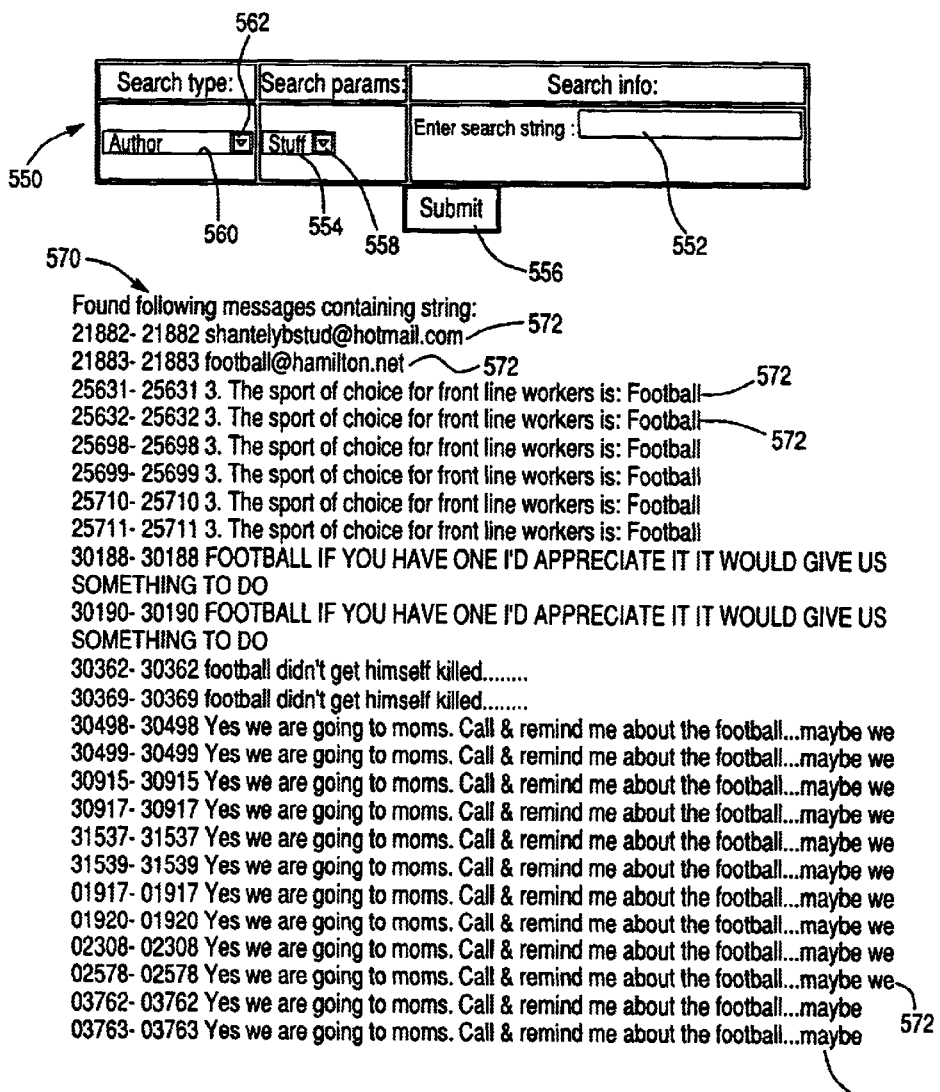
FIG. 35 illustrates a display of results generated by an exemplary e-mail text search, according to a preferred implementation of the present invention.

35. The results 570 shown in FIG. 35 are derived from a search for the term "football". Each item in the listing of results is provided in the form of a hypertext link 572. Mouse-clicking (or otherwise selecting) one of the hypertext links 572 causes the preferred software to generate a display of the complete e-mail message associated with that hypertext link. This information can be retrieved by the preferred software from the e-mail archives typically created by an e-mail server program (e.g., the SENDMAIL e-mail server program that can be downloaded from the web-site "www.sendmail.com").

The preferred software advantageously can be programmed to automatically search for certain text strings (e.g., bomb, sex, and the like) on a periodic basis (e.g., daily, weekly, or the like). When matches are found, e-mail messages to appropriate officials (e.g., a manager, security director, or the like) can be generated automatically to prompt those officials to investigate the corresponding e-mail message.

Since the graphic user interface represented by the foregoing menus is implemented in the environment of a web-browser, movement through the various menus can be achieved easily, conveniently, and in a user-friendly manner by mouse-clicking or otherwise selecting the virtual buttons or pop-up menus provided by the user's browser (e.g., Internet Explorer, Netscape Navigator, and the like). The "BACK" virtual button displayed by Internet Explorer, for example, can be used to return to a previously displayed menu. The "Forward" virtual button likewise can be used to move to a previously "closed" menu.

Likewise, if any of the foregoing reports, menus, search results, or displays occupies more space than the first field 202 of the main menu display 200 or any other field can hold, then the preferred software can insert suitable scroll arrows on one or more edges of that field. Mouse-clicking on the scroll arrows then causes the first field 202 (or other field) to scroll through the report, menu, search results, or displays, and/or horizontally shift that report, menu, search result, or display. Alternative scrolling (or shifting) techniques, of course, can be used.

Such intuitive movement through the various menus provides a significant advance in the art. It enables monitoring and management of the DHCP server program, proxy server program, DNS server program, and e-mail server program to be performed seamlessly and in a user-friendly manner by people who are not highly skilled in the art of network management.

While a portion of the preferred software notifies the DNS server program when an IP address is assigned, it is understood that this portion of the preferred software need not be used when the latest ISC DHCP server program is used as the DHCP server. In particular, the lastest ISC DHCP server program (believed to have been released after reduction to practice of the present invention) has been modifed to support the BIND dynamic DNS server program. The portion of the preferred software that provides the address assignment notification, however, can be retained for instances where other (possibly older) DHCP server programs are used.

While the preferred software is implemented with all of the foregoing aspects, it is understood that portions of the preferred software can be implemented without other portions. The e-mail searching aspects of the preferred software, for example, can be implemented without some or all of the other aspects. Similarly, the URL searching aspects of the preferred software can be implemented without some or all of the other aspects of the preferred software. The DHCP configuring and/or monitoring aspects of the preferred software likewise can be implemented without some or all of the other aspects (e.g., without the URL searching aspects, e-mail searching aspects, and/or the like). The ultimate combination of features provided according to the present invention therefore can be tailored to the needs of different networks and network managers.

Notably, the preferred software described above provides the following advantages, among others:

1) internet usage tracking is interfaced with the DHCP-related display screens;
2) computers are identified by name (not only IP address);
3) if a computer's IP address changes, the name and internet tracking information moves with it;
4) the software is Perl CGI-based, making it fast and web-viewable;
5) the software is platform independent;
6) internet access can be denied on a per-user basis; and
7) e-mail can be tracked and searched by author, recipient, and/or message body or entire content.

While this invention has been described as having a preferred design, it is understood that the invention is not limited to the illustrated and described features. To the contrary, the invention is capable of further modifications, usages, and/or adaptations following the general principles of the invention and therefore includes such departures from the present disclosure as come within known or customary practice in the art to which the invention pertains, and as may be applied to the central features set forth above, and which fall within the scope of the appended claims.

What is claimed is:

1. A system for facilitating creation of a configuration file for a DHCP server of a computer network, comprising:
   a graphic user interface adapted to present indications of information from which a configuration file of a DHCP server can be derived;
   a configuration file generator adapted to generate a DHCP server configuration file in response to information entered by a user in response to said indications of information;
   a proxy server searcher accessible via said graphic user interface, said proxy server searcher adapted to receive a text string to be searched and also adapted to search for the text string through information collected by a proxy server regarding internet URL addresses accessed by the IP addresses, said proxy server searcher adapted to provide a proxy search results display via said graphic user interface, indicating which, if any, URLs accessed via the proxy server includes a match for said text string and wherein the proxy search results display includes a list of all URLs that include a match for the text string along with the IP address that was used to access each such URL, said proxy search results display includes a user-selectable portion for each match, said system being adapted to automatically access a website identified by the URL in each match when the corresponding user-selectable portion is selected.

2. The system of claim 1, wherein said graphic user interface includes at least one menu generator adapted to generate a menu of configuration-related options and text fields associated with each option, into which values for such options can be inserted; and
   wherein said configuration file generator is adapted to generate said DHCP server configuration file in accordance with said options.

3. The system of claim 1, wherein said graphic user interface is a web-based graphic user interface that is accessible via a web browser.

4. The system of claim 1, wherein said configuration file generator also is adapted to generate a configuration file database where IP addressing information is stored by the DHCP server when the DHCP server operates in accordance with the configuration file generated by the configuration file generator.

5. The system of claim 1, wherein said graphic user interface is further adapted to provide a visual display of IP addresses assigned by the DHCP server and additional information associated with each IP address.

6. The system of claim 5, wherein said additional information for each IP address includes at least one of:

a machine identification that identifies a network card at the IP address;

a network name that identifies a user of the IP address; and a date when assignment of the IP address will expire if the IP address is not utilized before that date.

7. The system of claim 6, further comprising a proxy server tracker adapted to track information collected by a proxy server regarding internet URL addresses accessed by the proxy server for each IP address.

8. The system of claim 7, wherein said additional information for each IP address includes an indication of whether any internet URL addresses were accessed by that IP address.

9. The system of claim 8, wherein each indication of whether any internet URL addresses were accessed is provided with a selectable display element whenever at least one internet URL address was accessed, said system being adapted to respond to selection of said selectable display element by:

parsing through said information collected by the proxy server for portions of said information collected by the proxy server that pertain to an IP address of interest, and then displaying said portions of said information collected by the proxy server in a user-readable format.

10. The system of claim 9, wherein said user-readable format includes a list of URL addresses accessed by the IP address of interest.

11. The system of claim 1, further comprising an internet access control element adapted selectively deny internet access through a proxy server.

12. The system of claim 11, wherein said internet access control element is accessible via said graphic user interface.

13. The system of claim 11, wherein said internet access control element is adapted to selectively deny internet access through the proxy server, for each IP address assigned by said DHCP server.

14. The system of claim 11, wherein said internet access control element is adapted to selectively deny internet access through the proxy server by selectively modifying a configuration file of the proxy server.

15. The system of claim 1, wherein said system is provided in the form of a computer program product comprising a computer-usable medium having computer-readable program code embodied thereon.

16. The system of claim 1, further comprising an e-mail text searcher accessible via said graphic user interface, said e-mail text searcher being adapted to receive at least a text string to be searched and also being adapted to search through e-mail archives maintained by an e-mail server for said text string.

17. The system of claim 16, wherein said e-mail text searcher is adapted to provide an e-mail search results display via said graphic user interface, indicating which, if any, e-mail messages in said e-mail archives includes a match for said text string.

18. The system of claim 17, wherein said e-mail search results display includes a user-selectable portion for each match, said graphic user interface being adapted to display an entire e-mail message in which a match occurred when the user-selectable portion for that match is selected.

19. The system of claim 1, wherein said graphic user interface is adapted to present said indications of information on a per-site basis, wherein each site corresponds to a subnetwork of the computer network; and wherein said configuration file generator is adapted to generate said DHCP server configuration file on a per-site basis.

* * * * *